US012731203B2

(12) United States Patent
Kapoor et al.

(10) Patent No.: US 12,731,203 B2
(45) Date of Patent: Sep. 8, 2026

(54) TECHNIQUES TO OBTAIN METRICS DATA

(71) Applicant: NVIDIA Corporation, Santa Clara, CA (US)

(72) Inventors: Neeraj Kapoor, Bareilly (IN); Dileep Ranganathan, San Jose, CA (US); Srivatsan Kasturi, Saratoga, CA (US); Sukesh Roy, San Ramon, CA (US)

(73) Assignee: NVIDIA Corporation, Santa Clara, CA (US)

( * ) Notice: Subject to any disclaimer, the term of this patent is extended or adjusted under 35 U.S.C. 154(b) by 243 days.

(21) Appl. No.: 18/208,128

(22) Filed: Jun. 9, 2023

(65) Prior Publication Data

US 2024/0070798 A1 Feb. 29, 2024

(30) Foreign Application Priority Data

Aug. 24, 2022 (IN) ............................ 202211048358

(51) Int. Cl.
*G06T 1/20* (2006.01)
*G06F 3/06* (2006.01)

(52) U.S. Cl.
CPC .............. *G06T 1/20* (2013.01); *G06F 3/0604* (2013.01); *G06F 3/0644* (2013.01); *G06F 3/067* (2013.01)

(58) Field of Classification Search
CPC . G06T 1/20; G06T 1/60; G06F 3/0604; G06F 3/0644; G06F 3/067; G06F 11/3024
See application file for complete search history.

(56) References Cited

U.S. PATENT DOCUMENTS 10,521,876 B2 * 12/2019 Feng ....................... G06F 9/505
2010/0036895 A1 * 2/2010 Boyd .................. G06F 16/1873 707/E17.007
2020/0367821 A1 * 11/2020 Redshaw ............ A61B 5/0002

OTHER PUBLICATIONS

Biewald, Lukas. "Monitor and Improve GPU Usage for Training Deep Learning Model", Medium. Published Mar. 27, 2019 ttps://medium.com/data-science/measuring-actual-gpu-usage-for-deep-learning-training-e2bf3654bcfd (Year: 2019).*
Google. "Cloud Bucket Locations", Google Cloud Documentation, Aug. 17, 2022 Snapshot from Wayback Machine (Year: 2022).*
Google."Cloud Data Analytics", Google Cloud Documentation, Aug. 18, 2022 Snapshot from Wayback Machine (Year: 2022).*
Google. "Cloud Reading Metric Data", Google Cloud Documentation, Aug. 14, 2022 Snapshot from Wayback Machine (Year: 2022).*
Google. "Cloud Storage authentication", Google Cloud Documentation, Aug. 2, 2022 Snapshot from Wayback Machine (Year: 2022).*
Compart, David. "Creating Detailed Afterburner Logs", Uploaded to YouTube on Apr. 14, 2016 https://www.youtube.com/watch?v=CNVWvNMtow0&t=63s (Year: 2016).*

(Continued)

*Primary Examiner* — Kee M Tung
*Assistant Examiner* — Thang Gia Huynh
(74) *Attorney, Agent, or Firm* — S. Scott Foster; Kowert, Hood, Munyon, Rankin & Goetzel, P.C.

(57) ABSTRACT

Apparatuses, systems, and techniques to obtain metric data of a computing resource service provider. In at least one embodiment, a backlog of metrics data of one or more graphics processing unit (GPUs) that failed to be obtained is identified. A portion of the metrics identified as real-time metrics is prioritized over obtaining the backlog of metrics data when obtaining the metrics data of the one or more GPUs in an order from newest to oldest.

20 Claims, 50 Drawing Sheets

(56) References Cited

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
IEEE, "IEEE Standard for 802.3," IEEE Standard for Ethernetn, IEEE Computer Society, Dec. 28, 2012, 634 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikepedia the Free Encyclopedia, https://en.wikipedia.org/wiki/Token_Ring, Jan. 14, 2020, 12 pages.

* cited by examiner

SOFTWARE LAYER 930

SOFTWARE 952

TECHNIQUES TO OBTAIN METRICS DATA

CLAIM OF PRIORITY

This application claims the benefit of Indian Provisional Application No. 202211048358 titled "METRICS TRANSPORTER," filed Aug. 24, 2022, the entire contents of which is incorporated herein by reference.

FIELD

At least one embodiment pertains to one or more processors or computing systems used to collect metrics related to computing workloads according to various novel techniques described herein.

BACKGROUND

Existing techniques to collect metrics related to computing workloads for the purpose of better understanding and optimizing computing workloads suffer shortcomings. Techniques for collecting metrics can be improved.

DETAILED DESCRIPTION

Figure 1:
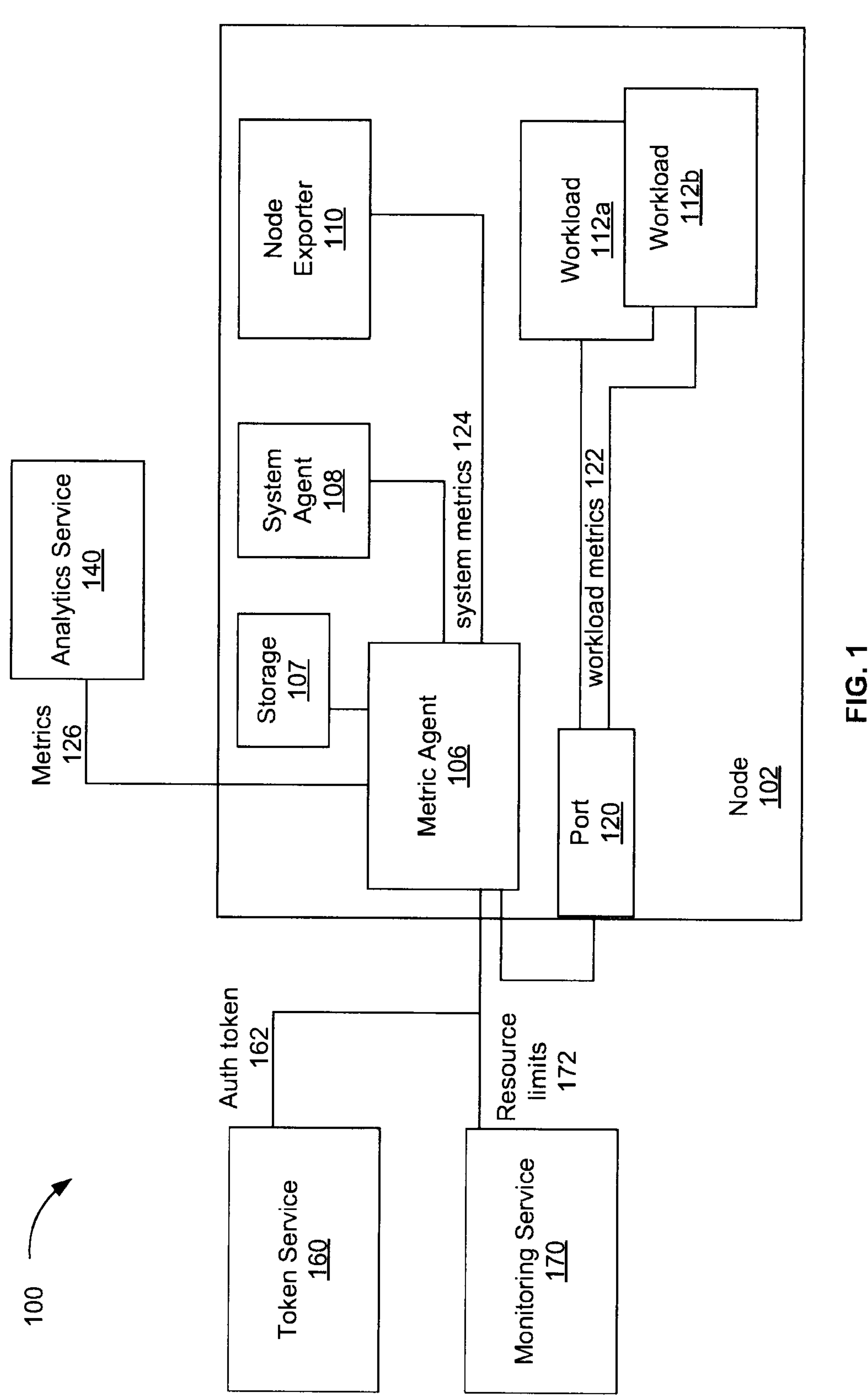
FIG. 1 illustrates an example framework to obtain metrics at a node, in accordance with at least one embodiment.

In the following description, numerous specific details are set forth to provide a more thorough understanding of at least one embodiment. However, it will be apparent to one skilled in the art that the inventive concepts may be practiced without one or more of these specific details.

In at least one embodiment, a computing resource service provider allows users to perform workloads using computing resources that are managed, at least in part, by computing resource service provider. In at least one embodiment, users may be customers of computing resource service provider. In at least one embodiment, computing resources service provider may be a cloud-based computing resource service provider. In at least one embodiment, computing resource service provider includes an orchestration system to assist with deploying applications and workloads, implementing changes to applications, scaling groups of nodes up or down, or monitoring applications or workloads. In at least one embodiment, orchestration system includes one or more components that implement Kubernetes. In at least one embodiment, orchestration system allows users to schedule workloads that utilize one or more processors of computing resources that are managed, at least in part, by orchestration system. In at least one embodiment, workloads may be to perform a simulation, train a neural network, or train a machine learning model. In at least one embodiment, other types of workloads may be performed using computing resources of computing resources service provider.

In at least one embodiment, real-time collection of metrics may be useful to track resource utilization or workload performance. In at least one embodiment, real-time metrics collection may help operators of computer services assess resource allocation. In at least one embodiment, metrics may be useful to help optimize one or more computing applications being performed on one or more processors. In at least one embodiment, metrics may provide information about applications that are utilizing computing resources. In at least one embodiment, metrics that indicate an amount of utilization of GPU cores may be useful to understand the extent to which computing resources are being utilized. For example, if a neural network training application uses only 10% of allocated GPUs cores, it may be beneficial to analyze neural network training application and potentially modify code of training application to utilize more available GPU cores. In at least one embodiment, an amount of utilization of computing resources can provide insights on a performance of a computer program that utilizes computer resources. In at least one embodiment, metrics may indicate a learning rate, which may correspond to a rate that a neural network updates parameters. In at least one embodiment, metrics may be used to increase utilization of designated computing resource to allow for applications to be performed more efficiently. In at least one embodiment, metrics may be used to determine code sections of an application that are underutilizing resources. In at least one embodiment, there are advantages to troubleshooting application performance using metrics while minimizing delay in providing metrics. In at least one embodiment, metrics from nodes that has been delayed is less useful in in troubleshooting code.

FIG. 1 illustrates a framework, at least in part, that uses a metric agent to collect metrics from a node and provide metrics to a remote analytics service, in accordance with at least one embodiment. One or more aspects of at least one embodiment described in conjunction with FIG. 1 can be combined with one or more aspects of embodiments described herein, including embodiments described at least in conjunction with FIGS. 2-7. In at least one embodiment, a plurality of metric agents at nodes may be used by a monitoring service to collect metrics. In at least one embodiment, monitoring service may be a computer system with one or more processors that may be running a Prometheus computer program running on one or more processors of a computer system. In at least one embodiment, monitoring service may collect metrics from multiple endpoints. In at least one embodiment, monitoring service may export collected metrics to a storage such as a cloud storage or database. In at least one embodiment, monitoring service includes an analytics service. In at least one embodiment, metrics obtained by monitoring service may be used by a dashboard of an analytics service to provide information about obtained metrics to customers of GPU service. According to at least an embodiment, framework 100 includes a node 102 that may be connected to an analytics service 140, a token service 160, or a monitoring service 170. In at least one embodiment, node 102 is part of a container orchestration system for automating deployment, scaling and management. In at least one embodiment node includes a plurality of graphics processing units (GPUs) that may usable to perform workloads for different users or customers. In at least one embodiment, token service 160 is computer system with one or more processors to issue, validate, renew, or cancel security tokens. In at least one embodiment, tokens issued by token service can be used to identify a holder of token to services as a result of holder providing token. In at least one embodiment, metric agent 106 is to request a token from token service. In at least one embodiment, metric agent 106 obtains token from token service 160. In at least one embodiment, metric agent 106 is to provide authentication token 162 to analytics service 140. In at least one embodiment, metric agent 106 is to provide authentication token 162 to analytics service 140 to authenticate metric agent 106. As a result of metric agent 106 providing authentication token 162 to analytics service 140, metric agent 106 may provide metrics data to analytics service 140.

In at least one embodiment, analytics service 140 is a computer system with one or more processors to perform analytics operations at least in part using metrics 126. Analytics service 140 may include a storage that may receive and store metrics 126 from metrics agent 106. In at least one embodiment, storage of analytics service 140 may be remote with respect to node 102. In at least one embodiment, analytics service 140 is remote with respect to node 102. In at least one embodiment, analytics service 140 is remote at least in part by being located at a different physical location such as a different datacenter or a different geographic area such as different city. In at least one embodiment, analytics service 140 is a destination at which metrics data is obtained. In at least one embodiment, analytics service 140 is external with respect one or more processors of node 102 by being in a different server or a different physical location. In at least one embodiment, analytics service 140 is external with respect one or more processors of node 102 by being in a different cluster or group of nodes. In at least one embodiment, analytics service 140 includes a database. In at least one embodiment, analytics service 140 includes a cloud storage such as a cloud database. In at least one embodiment, analytics service 140 includes analytics to be provided to customers or operators of computing resources service provider. In at least one embodiment, storage 107 includes a first remote storage and a second remote storage that may be used by different analytics services. In at least one embodiment, different analytics services may be used by administrative users of a computing resources service provider and users that access computing resources of computing resource service provider to perform workloads. In at least one embodiment, token service 160 may provide tokens to allow metric agent 106 to write metric information to analytics service 140. In at least one embodiment, token service 160 is a source of one or more tokens. In at least one embodiment, token service 160 is external with respect to elements of node 102 by being located at a different location, such as a different datacenter, or a different server or cluster of servers. In at least one embodiment, monitoring service 170 may communicate resource limits with metric agent 106. In at least one embodiment, monitoring service 170 may provide resource limit information as to resources at node 102. In at least one embodiment, resource limit information may indicate limits on memory or processors that may be used at node 102 or that may be used by a group of nodes to which node 102 is assigned. In at least one embodiment, resource limit information is an amount of bandwidth that is available to a group of nodes. In at least one embodiment, resource limit information is an amount of graphics processing units (GPUs), memory, or storage that is available at a node or group of nodes.

In at least one embodiment, node 102 includes one or more processors to perform workloads **112*a* and 112*b*. In at least one embodiment, node 102 includes a metric agent 106, a storage 107, a system agent 108, and a node exporter 110. In at least one embodiment, node 102 is connected to a token service 160, a monitoring service state exporter 170, and an analytics service 140. In at least one embodiment, metric agent 106 obtains workload metrics 122 related to workloads at a port 120. In at least one embodiment, metric agent 106 obtains system metrics 124 from system agent 108 or node exporter 110. In at least one embodiment, metric agent 106 stores system metrics 124 or workload metrics 122 in storage 107. In at least one embodiment, metric agent 106 provides metrics 126 to analytics service 140. In at least one embodiment, metric agent 106 obtains an authentication token 162 from token service to allow metric agent 106 to access analytics service 140. In at least one embodiment, authentication token 162 is to allow metric agent 106 to write metrics 126 to analytics service 140. In at least one embodiment, authorization token is information that may verify to analytics service 140 that metric agent 106 is authorized to provide metrics 126 to analytics service 140. In at least one embodiment, analytics service 140 allows metric agent to write metrics to a storage of analytics service 140 after authentication token 162 is provided to analytics service 140 by metric agent 106. In at least one embodiment, authentication token 162 may have an expiration, such as 15 minutes. In at least one embodiment, an updated authentication token 162 may be obtained by metric agent 106 and provided to authentication service 140 to allow metric agent 106 to continue to access analytics service 140. In at least one embodiment, metric agent 106 obtains resource limits 172 from monitoring service 170. In at least one embodiment, monitoring service is a computer program running on one or more processors of a computer system. In at least one embodiment, monitoring service 170, includes a state exporter application. In at least one embodiment, resource limits 172 may be information that indicates a restriction on an amount metrics that are to be provided to analytics service 140. In at least one embodiment, resource limits 172 may information that indicates restrictions on types of metrics that may be provided to different users. In at least one embodiment, resource limits 172 may be used to set a limit on bandwidth that is used by metric agents of nodes in a group to provide metrics to analytics service 140. In at least one embodiment, resource limits 172 may be provided by a user or customer of node 102. In at least one embodiment, analytics service 140 services multiple nodes. In at least one embodiment, In at least one embodiment, resource limits 172 may limit individual nodes from utilizing a disproportionate amount of resources, such as bandwidth, that would cause a degradation to overall system performance. In at least one embodiment, node 102 is managed by an orchestration service. In at least one embodiment, monitoring service 170 is provided at least in part by an orchestration service. In at least one embodiment, orchestration service is computer program that is performed, at least in part, by a different computer system with respect to node 102. In at least one embodiment, orchestration service may be a Kubernetes implementation. In at least one embodiment, node 102 is included in a Kubernetes pod. In at least one embodiment, node 102 is included in a cluster of a plurality of nodes that is managed by orchestration service. In at least one embodiment, a cluster of nodes is a group of nodes. In at least one embodiment, node 102 is a server. In at least one embodiment, cluster includes a plurality of nodes. In at least one embodiment, nodes can be added to, or removed from, cluster. In at least one embodiment, cluster includes up to 1000 nodes. In at least one embodiment, node 102 includes a plurality of processors that perform workloads 112*a* and 112*b*. In at least one embodiment, plurality of processors include a plurality of graphics processing units (GPUs). In at least one embodiment, node 102 includes up to 56 GPUs. In at least one embodiment, metric agent 106 is a software program that is performed using one or more processors of node 102. In at least one embodiment, a metric agent is implemented on each node of a plurality of nodes in a group. In at least one embodiment, analytics service 140** obtains metrics of each node from a corresponding metric agent at node.

In at least one embodiment, workloads **112*a* and 112*b* are computing tasks. In at least one embodiment, workloads 112*a* and 112*b* are performed using distinct computing resources of node 102. In at least one embodiment, workloads 112*a* and 112*b* are associated with different users. In at least one embodiment, workloads 112*a* and 112*b* are separate computing tasks. In at least one embodiment, workloads 112*a* and 112*b*** are different jobs. In at least one embodiment, a workload is to perform a computer program. In at least one embodiment, workload is to train a neural network, to build a model, or to perform a simulation. In at least one embodiment, a workload is to solve a computational problem.

In at least one embodiment, a metric agent 106 is running on one or more processors of node 102. In at least one embodiment, metric agent 106 is to export metrics data directly to monitoring service 170 or analytics service 140. In at least one embodiment, metrics may be made available by an application programming interface (API) Server at metric agent 106. In at least one embodiment, monitoring service 170 may obtain metrics from metric agent by submitting API requests to metric agent 106. In at least one embodiment, metric agent 106 is to export data to a database, such as an influx-db, of analytics service 140. In at least one embodiment, analytics service 140 is a computer system with one or more processors to use metrics in local storage to perform reports and provide information to users regarding metrics. In at least one embodiment, analytics service 140 is to provide information to administrative users of node 102 or customers of computing services provided by node 102. In at least one embodiment, metric agent 106 may obtain workload metrics 122 or system metrics 124 from one or more endpoints. In at least one embodiment, metric agent 106 may store metrics in storage 107. In at least one embodiment, metrics is metrics data. In at least one embodiment, metric agent 106 may convert metrics from a first format obtained from endpoints to a second format that is compatible with analytics service 140. In at least one embodiment, converting format by metric agent 106 may allow metric agent 106 to write metrics 126 directly to a storage of analytics service 140 that is remote with respect to node 102. In at least one embodiment, a metric agent may be implemented in each node of a cluster of nodes.

In at least one embodiment, metric agent 106 collects metrics for each of a node-exporter, system agent, or one or more endpoints of one or more workloads 112*a-b*. In at least one embodiment, metric agent 106 is software implemented on one or more processors of node 102. In at least one embodiment, metric agent 106 detects metric endpoints. In at least one embodiment, metric endpoints may include a port 120 that may be detected by an application program interface (API) server. In at least one embodiment, endpoints of workloads 112*a* and 112*b* may be accessible by addresses, such as IP addresses. In at least one embodiment metrics that include metrics data are obtained at addresses. In at least one embodiment, implementing a metric agent in each node in cluster allows improved scaling as nodes are added to cluster. In addition, implementing a metric agent in each node in a cluster allows for blast radius to be limited to a node if a metric agent fails.

In at least one embodiment, node 102 includes a system agent 108. In at least one embodiment, system agent 108 runs on each node in a cluster of nodes. In at least one embodiment, system agent 108 may apply, create, update, or destroy containers on node. In at least one embodiment, system agent 108 may communicate with other nodes (e.g., master nodes). In at least one embodiment, system agent 108 may provide system metrics 124 to metric agent 106. In at least one embodiment, system agent 108 is compatible with orchestration service to automate software deployment, scaling, and management. In at least one embodiment, system agent 108 is implemented as a Kubelet and orchestration service is implemented as a Kubernetes container orchestration service.

In at least one embodiment, metrics agent 106 may obtain metrics. In at least one embodiment, metrics may be metric data. In at least one embodiment, a metric may be information that indicates a standard of measure of a degree. In at least one embodiment, a metric may be information that indicates a standard of measure of a degree to which a system or process has a property. In at least one embodiment, metrics agent 106 stores metrics at storage 107. In at least one embodiment, storage 107 is local storage with respect to node 102. In at least one embodiment, storage 107 is local with respect to node 102 by being incorporated into a same device, a same circuit, a same motherboard, a same baseboard. In at least one embodiment, storage 107 includes a memory, a cache, or a disk storage at node 102 to store one or more metrics. In at least one embodiment, metrics agent 106 has access to a storage 107 at node 102 to store one or more metrics. In at least one embodiment, metrics obtained by metric agent 106 may be stored in storage 107 prior to being provided to analytics service 130. In at least one embodiment, storage 107 may be persistent storage. In at least one embodiment, storing metrics at storage 107 may help to prevent lost metrics. In at least one embodiment, metrics may include workload metrics 122 or system metrics 124. In at least one embodiment, workload metrics 122 include metrics that are emitted by a workload 112*a-b*. In at least one embodiment, workload metrics 122 may only be emitted by an application related to workload 112*a*-112*b*. In at least one embodiment, workload metrics 122 include learning rate data that indicates a rate of converting a neural network model or machine learning model. In at least one embodiment, workload metrics 122 include learning rate data that indicates a rate at which an algorithm updates or learns a value of a parameter estimate. In at least one embodiment, workload metrics 122 may be associated with lines of code of an application that is used by workload 112*a* or 112*b* and stored in storage 107. In at least one embodiment, data that shows a connection with lines of code of an application and learning rate may be helpful to identify where an application may be improved. In at least one embodiment, a learning rate may be useful in identifying bottlenecks in an application. In at least one embodiment, a learning rate may be obtained from an endpoint implemented via a computer program to train a neural network.

In at least one embodiment, metric agent 106 may obtain system metrics 124. In at least one embodiment, system metrics 124 include information corresponding to GPU, memory, bandwidth, or CPU usage, e.g., at node 102 or other nodes in a cluster of nodes. In at least one embodiment, system metrics 124 includes storage IO information. In at least one embodiment, system metrics 124 may be obtained from system agent 108 or node exporter 110. In at least one embodiment, system metrics 124 may include GPU usage, GPU core usage, memory usage, or an amount of parallelization. In at least one embodiment, system agent 108 or node exporter 110 may be elements of an orchestration system such as a Kubernetes system. In at least one embodiment, system metrics 124 may be obtained from a Kubelet or node-exporter application that may run on individual nodes, such as node 102. In at least one embodiment, endpoints may be discovered by running an API server at node 102 to detect addresses from which metrics may be obtained at node 102. In at least one embodiment, metrics in storage 107 may be available from API server at node 102. In at least one embodiment, metrics from storage 107 may be obtained by submitting requests to API server.

In at least one embodiment, metrics may be associated with timestamps. In at least one embodiment, metrics may be timestamped to correspond to a time obtained by metric agent 106 or when provided to analytics service 130. In at least one embodiment, timestamps may be used to identify a presence of a backlog or a current status of a backlog. In at least one embodiment, timestamps may be stored for metrics in storage 107. In at least one embodiment, timestamps may be used to select a newest metric to provide to an external source. In at least one embodiment, a plurality of metrics are analyzed to determine a metric with a corresponding timestamp that indicates metric is newest. In at least one embodiment, metric is selected to be provided to an external destination. In at least one embodiment, metrics data may be sequenced from storage 107 in an order from newest to oldest based on corresponding timestamps, and provided to destination in order. In at least one embodiment, metric agent 106 may implement one or more functions. In at least one embodiment, an administrative application programming interface may be used to retrieve metric information from storage 107. In at least one embodiment, one or more functions may be implemented at metric agent 106, including functions to get last timestamp read by a collector from each endpoint, to get a last timestamp written to one or more endpoints, or to get a last timestamp handled by a backfill process. In at least one embodiment, functions may be accessed by an external system with respect to node. In at least one embodiment, metrics data may include metrics and timestamp information. In at least one embodiment, a system that is external with respect to node 102 is at a different physical location than node. In at least one embodiment, a system that is external with respect to node 102 is at a different server or group of servers. In at least one embodiment, an external destination or system may be provided with metrics data by one or more processors of node over a network.

Figure 2:
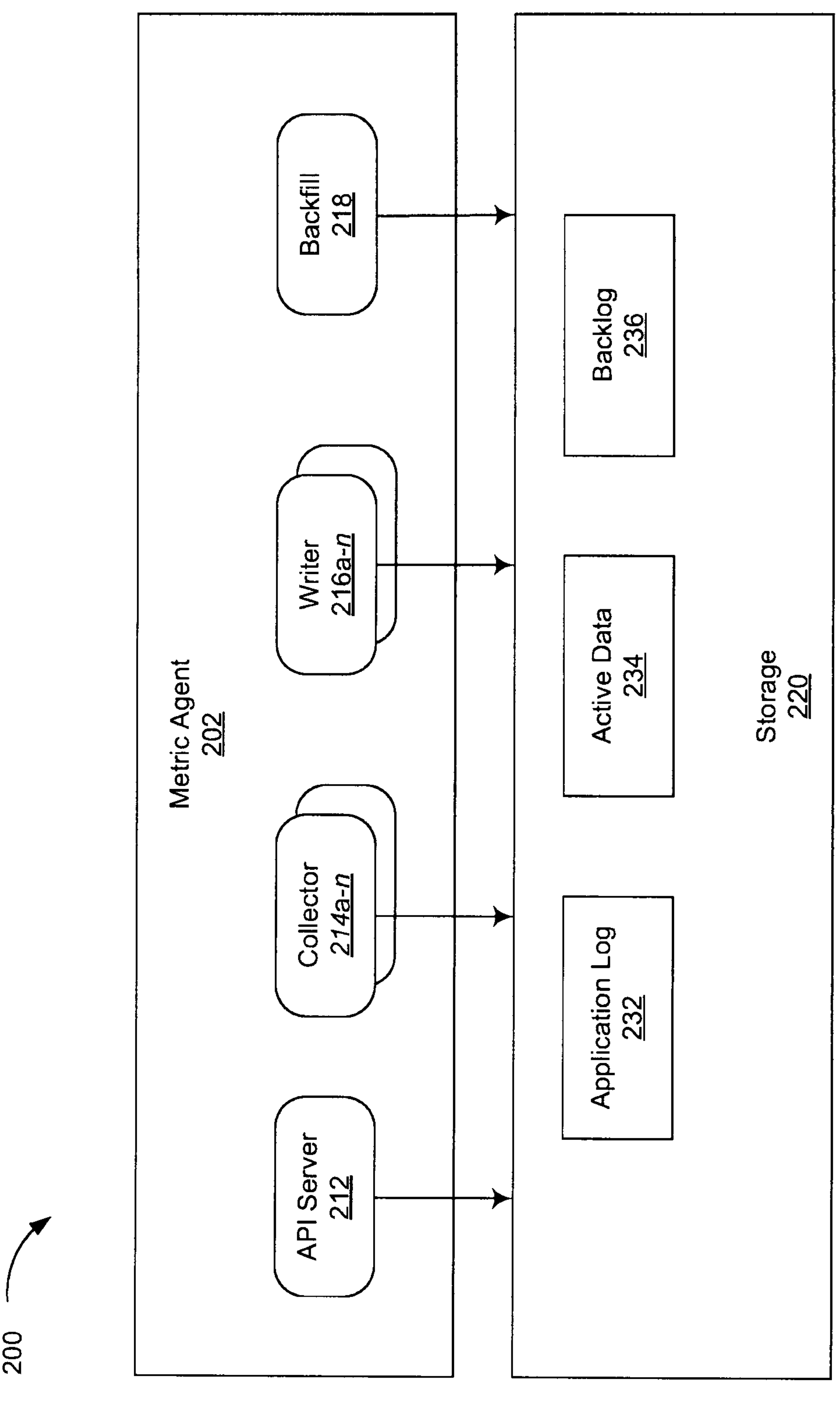
FIG. 2 illustrates a diagram showing a metric agent and storage at a node, in accordance with at least one embodiment.

FIG. 2 illustrates a diagram 200 that includes metric agent and a storage that may be implemented at a node to collect metrics and provide metrics to a remote service, in accordance with at least one embodiment. One or more aspects of at least one embodiment described in conjunction with FIG. 2 can be combined with one or more aspects of embodiments described herein, including embodiments described at least in conjunction with FIGS. 1 and 3-7. According to at least one embodiment, a metric agent 202 is communicatively connected to a storage 220. In at least one embodiment, storage 220 may be storage 107 in FIG. 1. In at least one embodiment, storage 220 may be a persistent storage. In at least one embodiment, storage 220 may be located at node. In at least one embodiment, metric agent 202 includes an API server module 212, one or more collector modules 214*a-n*, one or more writer modules 216*a-n*, or a backfill module 218. In at least one embodiment, API server module 212, one or more collector modules 214*a-n*, one or more writer modules 216*a-n*, or backfill module 218 are software applications implemented using one or more circuits, such as one or more processors running on a node. In at least one embodiment, storage 220 may be accessed by metric agent 202. In at least one embodiment, storage 220 includes application log 232, active data 234, and a backlog 236. In at least one embodiment, one or more collector modules 214*a-n* are to collect metrics from one or more endpoints, such as static endpoints. In at least one embodiment, one or more collector modules 214*a-n* collect system metrics or workload metrics from endpoints. In at least one embodiment, one or more collector modules 214*a-n* write metrics to active data 234 in storage 220. In at least one embodiment, one or more collector modules 214*a-n* write to active data 234 in an interval. In at least one embodiment, active data 234 is a directory. In at least one embodiment, interval corresponds to a time period, such as 30 seconds. In at least one embodiment, a metrics log file of active data 234 is rotated every 30 minutes.

In at least one embodiment, one or more writer modules 216*a-n* may convert a format of active data 234 into a different format that is compatible with a storage of a remote endpoint. In at least one embodiment, one or more writer modules 216*a-n* write metrics to a remote endpoint. In at least one embodiment, remote endpoint is a storage or service that is remote with respect to a node. In at least one embodiment, remote endpoint is an analytics service or a storage of an analytics service. In at least one embodiment, if a writer module 216 fails to write data, it may copy data to a backlog directory. In at least one embodiment, writer module 216 may include context information, such as data-format and last metrics successfully uploaded, to backlog directory. In at least one embodiment, metrics data in backlog directory may be deleted if successfully transferred to an external destination. In at least one embodiment, the presence of metrics data in backlog directory indicates that a backlog is present. In at least one embodiment, metrics data may be deleted if metrics data is older than a threshold time. In at least one embodiment, metrics data in backlog directory may be deleted if older than 10 minutes. In at least one embodiment, each writer module 216 may upload metrics to a remote endpoint at an interval, such as 30 seconds. In at least one embodiment, uploads may be retried in case of a transient error. In at least one embodiment, checkpoint information can be in a form of byte position in file so that any change in local time does not affect writer process. In at least one embodiment, node includes one or more GPUs. In at least one embodiment, metrics data of one or more GPUs is caused to be obtained by collector modules 214*a-n* by reading metrics from endpoints or a port. In at least one embodiment, metrics data of one or more GPUs is caused to be obtained by collector modules 214*a-n* writing metrics to storage 220. In at least one embodiment, collector modules 214*a-n* writes metrics data to storage 220 by writing metrics data to application log 232, active data 234, or backlog 236. In at least one embodiment, metrics data of one or more GPUs is caused to be obtained by analytics service by writer module 216 writing metrics from storage to analytics service. In at least one embodiment, metrics data of one or more GPUs is caused to be obtained by analytics service by writer modules 216*a-n* writing metrics from storage 220 to a storage of analytics service. In at least one embodiment, storage of analytics service is local with respect to analytics service. In at least one embodiment, writer modules 216*a-n* writes to cloud storage. In at least one embodiment, cloud storage is located at a different physical location with respect to one or more GPUs of node. In at least one embodiment, cloud storage is located at a different physical location with respect to one or more GPUs of node. In at least one embodiment, metrics data of one or more GPUs is caused to be obtained by analytics service by API server module 212 making metrics data from storage 220 available from storage 220 to a storage of analytics service.

In at least one embodiment, metric agent 202 includes an application program interface (API) server module 212. In at least one embodiment, API server module 212 may provide an endpoint from which metrics may be obtained. In at least one embodiment, a monitoring service may obtain metrics or other information from API server module 212. In at least one embodiment, other types of servers may be provided. In at least one embodiment, application log 232 that track processes of metric agent 202 may be stored in storage 220. In at least one embodiment, application log 232 may be maintained by metric agent 202. In at least one embodiment, application log 232 may be provided to an object storage system such as SwiftStack. In at least one embodiment, application log 232 may indicate lines of code or events that occurred at a node. In at least one embodiment, application log 232 may be helpful in providing context as to an application or workload that was executing at a time of metrics.

In at least one embodiment, backfill module 218 is to cause data from backlog 236 to be provided to an external destination, such as a storage or analytics system. In at least one embodiment, backlog 236 includes data that has not been provided to an external destination. In at least one embodiment, backlog 236 includes data that did not transfer successfully to external destination. In at least one embodiment, backlog 236 is data that failed to transfer. In at least one embodiment, writer modules 216*a-n* may write metrics data to backlog if a failure to write to external destination is detected. In at least one embodiment, backfill module 218 may provide metrics data from backlog 236 to external destination. In at least one embodiment, metrics data is provided to external destination by backfill module in an order of newest to oldest. In at least one embodiment, recent metrics data is more useful to users than older metrics. In at least one embodiment, one or more writer modules 216*a-n* are prioritized over backfill module 218 to prioritize data from writer modules 216*a-n* over data from backlog 236 being provided to external destination. In at least one embodiment, timestamps included in, or associated with metrics data may be used to provide metrics to external destination in an order from newest to oldest. In at least one embodiment, metrics may be stored in storage in an order from newest to oldest. In at least one embodiment, metrics may be provided to external destination in an order from newest to oldest at least in part by providing metrics from active data 234 before providing metrics from backlog 236. In at least one embodiment, metrics may be provided in an order from newest to oldest at least in part by providing metrics data in a sequence that prioritizes metrics data associated with newer times over metrics data associated with older times. In at least one embodiment, using a metric agent 202 at each node to store metrics data in storage 220 at each node allows for metrics to be provided to a destination based on times that metrics were obtained. In at least one embodiment, metric agent 202 checks that active data 234 is confirmed to have been provided to external destination before providing backlog 236 to external destination. In at least one embodiment, metrics may be filtered by metric agent 202. In at least one embodiment, a user may specify types of metrics or parameters related to metrics that are to be provided to analytics service. In at least one embodiment, metric agent 202 copies metrics to a destination that meet criteria provided by user. In at least one embodiment, metrics data may be filtered at least in part by metric agent 202 to allow metrics that match criteria specified by user to be provided to destination. In at least one embodiment, metrics that are not specified by a user may not be copied to destination. In at least one embodiment, metrics that are not specified by user may be accessible via API server module 212.

Figure 3:
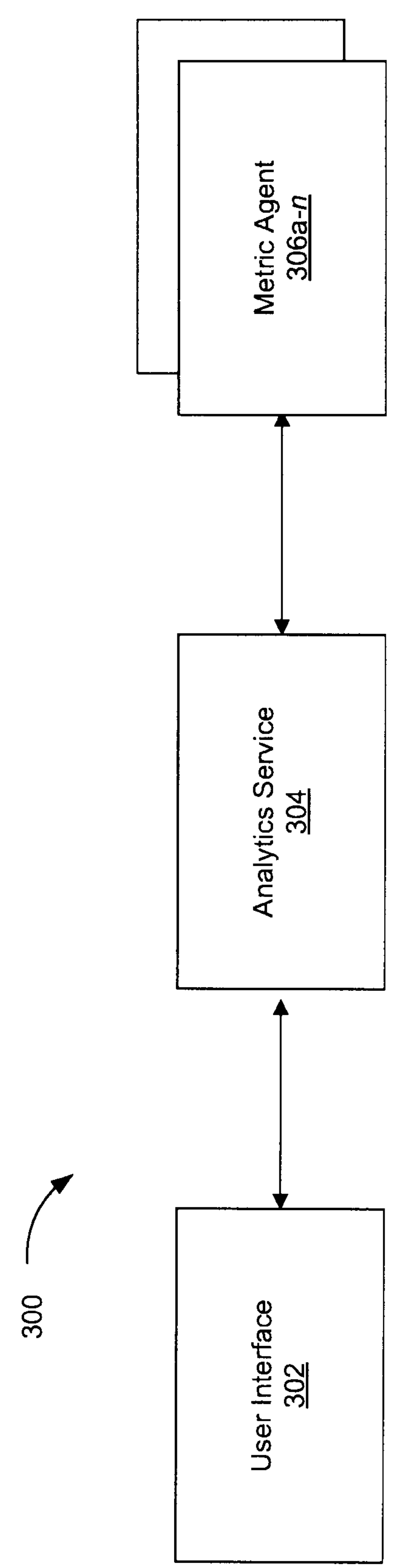
FIG. 3 illustrates an example block diagram showing relationship between a plurality of metric agents and an analytic service, in accordance with at least one embodiment.

FIG. 3 illustrates a framework 300, at least in part, between users, an analytics service, and metric agents on different nodes, in accordance with one or more embodiments. One or more aspects of at least one embodiment described in conjunction with FIG. 3 can be combined with one or more aspects of embodiments described herein, including embodiments described at least in conjunction with FIGS. 1, 2, and 4-7. According to an embodiment, framework 300 includes a user interface 302, an analytics service 304, and one or more metric agents 306*a-n*. In at least one embodiment, metric agents 306*a-n* may be implemented in each of a plurality of nodes. In at least one embodiment, user interface 302, analytics service 304, and one or more metric agents 306*a-n* may be connected to one another.

In at least one embodiment, a user interface 302 may be implemented as part of an orchestration service or service to manage analytics related to workloads or computing systems that may be related to workloads. In at least one embodiment, a user of an orchestration service may specify, at least in part, via user interface 302 metrics that are to be provided to analytics service 304. In at least one embodiment, a user may be an administrative user of a computing resource service provider or a customer of a computing resource service provider. In at least one embodiment, users may select metrics preferences that may indicate types of metrics to be provided to analytics service 304 or management service. In at least one embodiment, metrics preferences of users via may be provided to metric agents 306*a-n*. In at least one embodiment, metrics preferences may specify timeout periods, backlog periods or limits, types of metrics, frequency of data transfers between system components. In at least one embodiment, metrics preferences that are specified by users via user interface 302 may be provided to analytics service 304 or a monitoring service. In at least one embodiment, metrics preferences may be provided to individual metric agents 306*a-n* on respective nodes. In at least one embodiment, metrics preferences of customers may be provided to metric agents 306*a-n* corresponding to one or more processors that are used to perform workloads of customer. In at least one embodiment, metrics specified by customers may be implemented only at nodes or system components that are performing a workload of customer.

In at least one embodiment, metrics preferences may be used by metric agents 306*a-n* to filter metrics collected at metric agents 306*a-n* that are provided to analytics service 304 or related endpoints. In at least one embodiment, metrics collected by one or more metric agents 306*a-n* are filtered at metric agents 306*a-n*. In at least one embodiment, metrics collected at metric agents 306*a-n* may be filtered such that metrics information provided to analytics service 304 complies with metrics preferences. In at least one embodiment, filtering metrics may improve system performance at least in part by providing metrics that satisfy metrics preferences. In at least one embodiment, metrics preferences may limit an amount of metrics information that is provided to analytics service. In at least one embodiment, limiting metrics information that is provided to analytics service may reduce network bandwidth that is used to transfer metrics to analytics service 304. In at least one embodiment, analytics service 304 may process metrics information from metric agents 306*a-n*. In at least one embodiment, analytics service 304 may provide metrics information to one or more users. In at least one embodiment, analytics service 304 may utilize obtained metrics data to run reports or present metrics to users graphically. In at least one embodiment, metrics information that depicts metrics information for particular portions of an application of a workload may be provided by analytics service. In at least one embodiment, metrics information for specific processes of a workload may be provided to users as one or more graphical representations. In at least one embodiment, implementing metric agents 306*a-n* at each node may provide advantages over an application that reads metrics from multiple nodes. In at least one embodiment, if a metric agents 306*a-n* fails, a blast radius is limited to failed metric agent.

Figure 4:
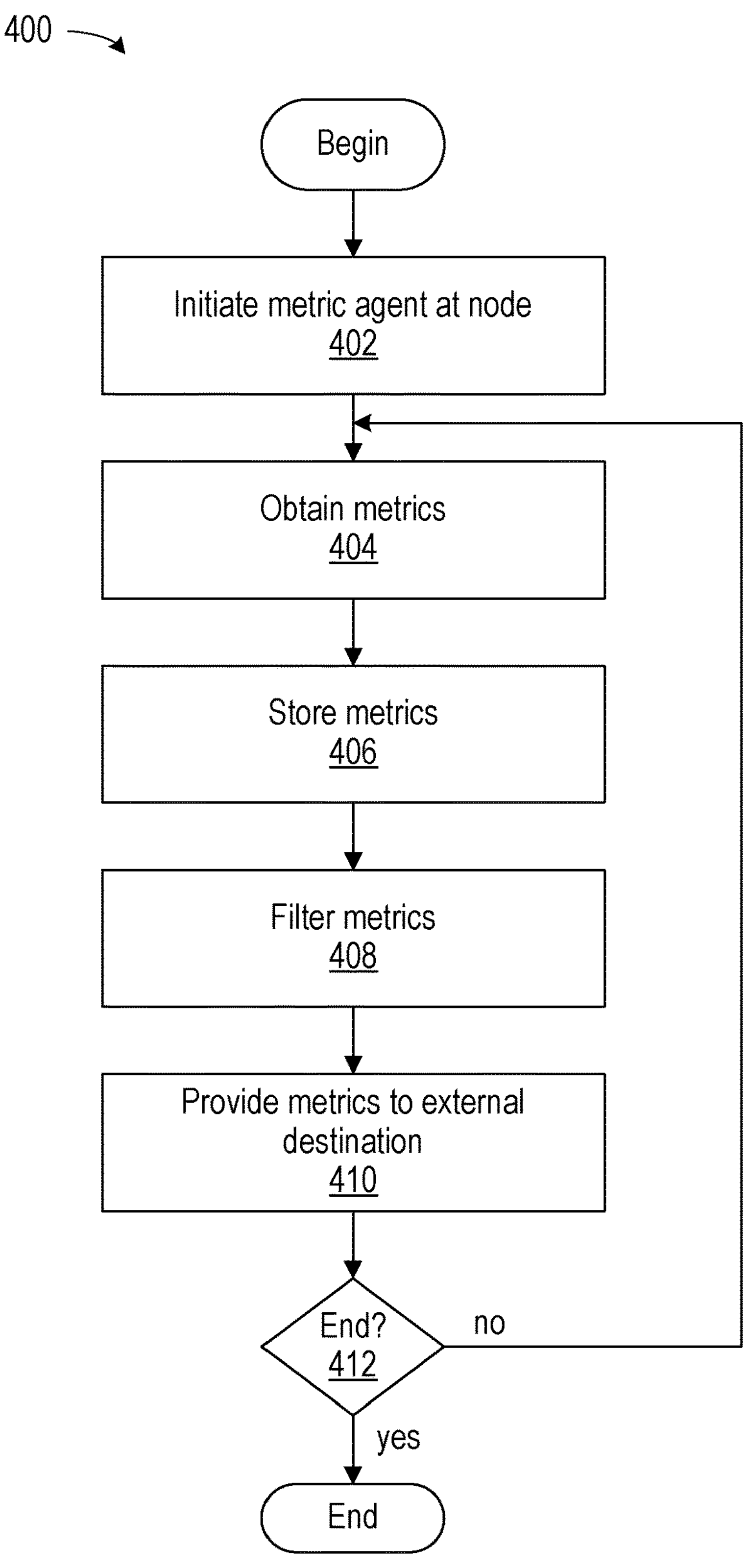
FIG. 4 illustrates an example method to obtain metrics, in accordance with at least one embodiment.

FIG. 4 illustrates a process 400 to collect metrics at a node, according to at least one embodiment. One or more aspects of at least one embodiment described in conjunction with FIG. 4 can be combined with one or more aspects of at least one embodiment described herein, including embodiments described at least in conjunction with FIGS. 1-3 and 5-7. In at least one embodiment, process 400 is implemented, in part, as a computer program that utilizes one or more processors of node. In at least one embodiment, process 400 is implemented as daemon application that is running on node. In at least one embodiment, process 400 starts with an operation 402 to initiate a metric agent at node. In at least one embodiment, metric agent is initiated when a computing device of node is started up. In at least one embodiment, operation 402 is performed as a result of a workload being initiated on one or more processors of node or a workload being assigned to one or more processors of node. In at least one embodiment, operation 402 is performed when node is added to a cluster or group of nodes. In at least one embodiment, initiating a metric agent includes identifying endpoints at one or more elements of a computer system of node from which metrics may be obtained. In at least one embodiment, workload metrics may be identified from an application that is to perform workload. In at least one embodiment, endpoints from which to obtain workload metrics may depend on workload. In at least one embodiment, endpoints from which to obtain workload metrics may be identified depending on application use by workload. In at least one embodiment, endpoints to obtain workload metrics may be included in code of an application that is used, at least in part, to perform workload. In at least one embodiment, system metrics may be obtained from same endpoints that are independent of a workload being performed.

Process 400 continues with operation 404 performed by one or more processors, to obtain metrics, in accordance with at least one embodiment. In at least one embodiment, obtaining metrics includes detecting endpoints from which metrics may be obtained. In at least one embodiment, such endpoints may be detected automatically. In at least one embodiment, metrics may include system metrics or workload metrics. In at least one embodiment, metrics are obtained, at least in part, by metric agent. In at least one embodiment, operation 404 includes detecting metrics at node at least in part by metric agent. In at least one embodiment, metrics are obtained from at least one application endpoint of node. In at least one embodiment, one or more processors are used to perform workloads, and metrics are obtained from endpoints that are associated with workloads. In at least one embodiment, endpoints are scraped by metric agent. In at least one embodiment, metrics are obtained from computer program implemented at node such as a system agent or a node exporter. In at least one embodiment, metrics are obtained from a port. In at least one embodiment, a time or date corresponding to individual metrics may be obtained. In at least one embodiment, individual metrics are associated with times or dates. In at least one embodiment, a timestamp is obtained for individual metrics. In at least one embodiment, timestamp corresponds to a time that a metric is collected or stored in a storage.

In at least one embodiment, process 400 continues with operation 406 performed by one or more processors, to store metrics. In at least one embodiment, metrics are stored at node in a local storage. In at least one embodiment, local is at a same physical location such as a same datacenter, a same cluster or group, or a same server. In at least embodiment, local storage is at a same physical location. In at least one embodiment, metrics are stored in a persistent storage at node. In at least one embodiment, metrics are stored with associated time information. In at least one embodiment, metrics include values and context information. In at least one embodiment, time information is a time that corresponds to a metric. In at least one embodiment, time information corresponds to when metric was measured or obtained. In at least one embodiment, time information may indicate for each individual metric a portion of a computer program that is executing. In at least one embodiment, information that corresponds to metrics is stored with metrics. In at least one embodiment, a timestamp is stored with each metric value. In at least one embodiment, metrics data may be stored in cloud storage.

Process 400 continues with operation 408 performed by one or more processors to filter metrics. In at least one embodiment, metrics are filtered at node, at least in part, by a metric agent at node. In at least one embodiment, metrics are filtered by selecting metrics that satisfy one or more criteria. In at least one embodiment, criteria to filter metrics may be indicated by, or obtained from, a user of a computing resource service provider that manages node. In at least one embodiment, criteria may specify one or more metrics, types of metrics, or frequency of metrics that are to be provided. In at least one embodiment, criteria may be associated with a user. In at least one embodiment, criteria may indicate system or workload metrics that are to be provided to a service, e.g., an analytic service or cloud service. In at least one embodiment, criteria may specify metrics that may be useful to determining an amount of parallelization of an application of workload. In at least one embodiment, filtering at node reduces an amount of bandwidth to transfer metrics information from node to an external destination connected over a network leading to improved system performance. In at least one embodiment, only metrics that are to be provided to an external destination.

In at least one embodiment, process 400 continues with operation 410 performed by one or more processors to provide metrics to an external destination. In at least one embodiment, an external destination may be a remote destination, an external storage, or an external service, such as an analytics service. In at least one embodiment, provided metrics include time information. In at least one embodiment, metrics are provided over a network. In at least one embodiment, remote system includes an analytics service that may use metrics to provide feedback on system or workload performance. In at least one embodiment, analytics service may be to provide analytics related to workload performance. In at least one embodiment, analytics service may determine system performance characteristics that may be useful to a computing resource service provider manage workloads that are to be performed on one or more processors. In at least one embodiment, metrics are provided over a network to a storage that may be accessed by analytics service. In at least one embodiment, metrics are provided to analytics service that then causes them to be stored in a storage that is remote with respect to node. In at least one embodiment, stored metrics may be accessed by analytics service. In at least one embodiment, operation 410 includes one or more processors to obtain metrics about one or more processors from one or more processors in an order from newest to oldest. In at least one embodiment, one or more processors is one or more graphics processing units (GPUs). In at least one embodiment, metrics are obtained about one or more processors from one or more processors in an order from newest to oldest, at least in part, by retrieving metrics from storage in order from newest to oldest at one or more processors. In at least one embodiment, metrics are retrieved from newest to oldest based at least in part on time indicators, such as timestamps, that are associated with metrics and stored in storage. In at least one embodiment, metrics are obtained about one or more processors from one or more processors in an order from newest to oldest at least in part by retrieving metrics from endpoints of one or more processors in order from newest to oldest. In at least one embodiment, process 400 includes requesting a token from a token service. In at least one embodiment, operation 410 includes obtaining authorization tokens for remote storage or services in response to a request to token service. In at least one embodiment, metrics may be written to an external destination after an authorization token has been provided. In at least one embodiment, process 400 includes making a GET request at a node exporter to get hardware metrics for hardware components being used by workloads on node. In at least one embodiment, metrics include GPU metrics for one or more GPUs on node. In at least one embodiment, a PUT request may be made to remote storage or service to push metrics to remote storage after obtaining authorization. In at least one embodiment, PUT request allows for metrics to be written by metric agent to remote storage or service.

In at least one embodiment, process 400 continues to decision block 412 performed by one or more processors to determine if process 400 is to end. In at least one embodiment, process 400 is determined to end if a threshold amount of a workload has been completed or if a workload has been terminated. In at least one embodiment, process 400 is determined to end, if an error is obtained during process 400 such as in copying metrics to external destination. If at block 412, it is determined that process 400 has not ended ("No"), process 400 returns to block 404 where metrics are obtained. In at least one embodiment, metrics obtained at a later time may be newer metrics. In at least one embodiment, metrics continue to be provided to an external destination, such as an analytics service. In at least one embodiment, process 400 is determined to end ("Yes") at decision block 412, and metrics collection ends. In at least one embodiment, portions of metrics collection are determined to end. In at least one embodiment, process 400 is determined to end if a confirmation is not received from external destination within a period of time. In at least one embodiment, process 400 is determined to end as to workload when an indication is obtained from orchestration service. In at least one embodiment, process 400 is determined to end as to a workload when metrics are unavailable from one or more endpoints at node associated with workload. In at least one embodiment, metrics collection ends as to workload but may continue for system metrics or other workloads. In at least one embodiment, if a new workload is scheduled or initiated on one or more processors of node, process 400 may be initiated at block 404. In at least one embodiment, endpoints of new workload may be detected and metrics collected as to new workload.

Figure 5:
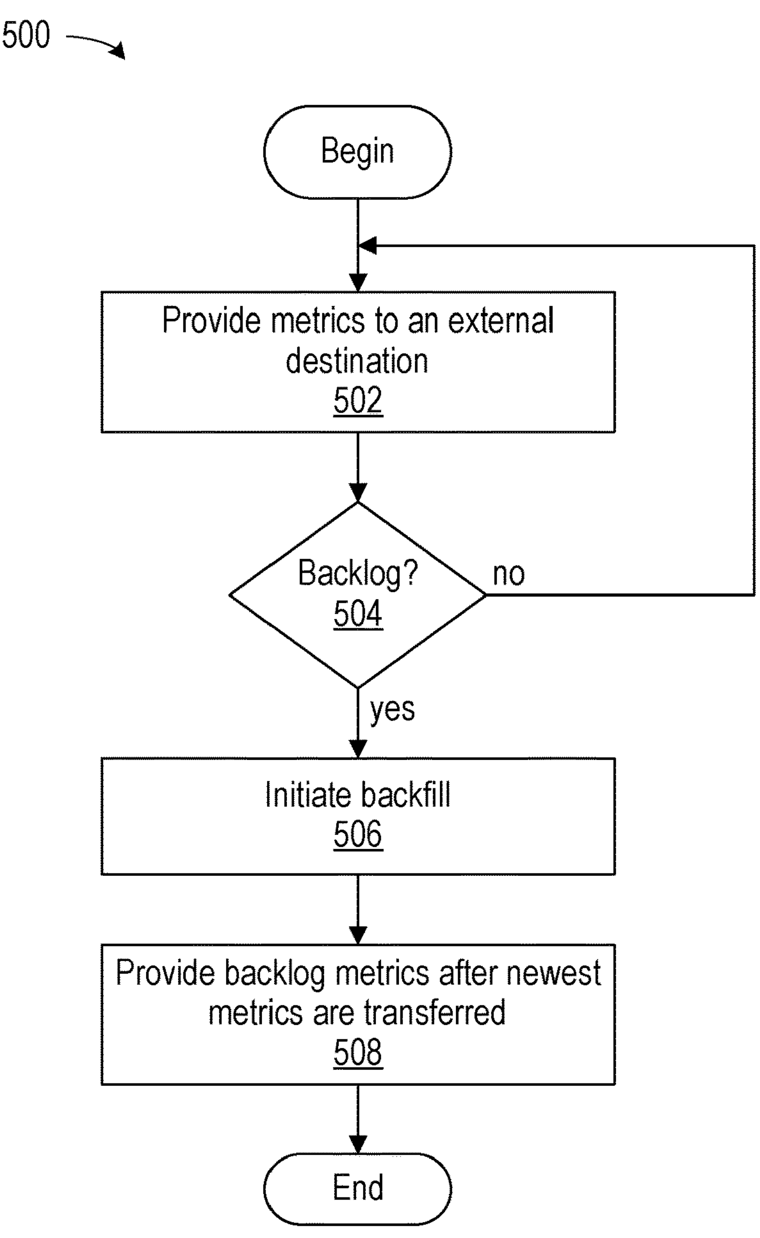
FIG. 5 illustrates an example method to address a backlog, in accordance with at least one embodiment.

FIG. 5 illustrates a process 500 to provide metrics to an external destination, such as a remote storage. One or more aspects of at least one embodiment described in conjunction with FIG. 5 can be combined with one or more aspects of at least one embodiment described herein, including embodiments described at least in conjunction with FIGS. 1-4, 6, and 7. In at least one embodiment, process 500 is implemented, in part, as a computer program that utilizes one or more processors. In at least one embodiment, process 500 starts with an operation 502 to provide metrics to an external destination. In at least one embodiment, metrics may be obtained from a storage at node and provided to an external destination in an order of newest to oldest based on timestamps. In at least one embodiment, obtaining metrics from endpoints and then storing metrics in a local storage, allows metrics to be provided to an external destination in an order of newest to oldest. In at least one embodiment, newest metrics may be more useful than older metrics. In at least one embodiment, if providing older metrics is prioritized over newer metrics, system performance may be negatively impacted.

In at least one embodiment, process 500 continues to decision block 504 performed by one or more processors to determine if a backlog is present. In at least one embodiment, a backlog is present if an attempt to copy metrics to an external destination fails. In at least one embodiment, an attempt to copy metrics to an external destination fails if a confirmation is not received by a metric agent. In at least one embodiment, a confirmation is not received if an attempt to write metrics to an external destination fails. In at least one embodiment, if metrics successfully copy from node to external destination, metrics may be deleted. In at least one embodiment, metrics that fail to transfer to an external destination may be stored in a backlog file in a local storage. In at least one embodiment, a presence of data in a backlog file of a storage may indicate a backlog. In at least one embodiment, a backlog may be caused by an analytics service being temporarily unavailable due to network or hardware issues. If a backlog is present ("YES") at block 504, a backfill operation 506 is initiated. In at least one embodiment, a backfill operation 506 may be implemented, at least in part, on one or more processors of a backfill module of a metric agent. In at least one embodiment, backfill operation 506 may include providing metrics from node to an external destination. In at least one embodiment backfill operation 506 includes determining an order to provide metrics from a backlog, metrics or information of an application log, or metrics in active data 234. In at least one embodiment, determining order to provide metrics includes evaluating an indication of a time that individual metrics were obtained or stored. In at least one embodiment, indication of time that individual metrics were obtained or stored includes timestamps or other data that indicates time. In at least one embodiment, timestamps may be associated with metrics by a metric agent when obtained or stored by metric agent. In at least one embodiment, an operation 508 to provide backlog metrics after newest metrics are transferred may be implemented. In at least one embodiment, newest metrics are prioritized in backfill at least in part by writing metrics from backlog to external destination in an order of newest to oldest. In at least one embodiment, order to write metrics is determined based at least in part on timestamps associated with metrics such that order prioritizes providing newer metrics to an external destination before older metrics. In at least one embodiment, metrics data is caused to be obtained at destination at least in party by metric agent writing or providing metrics data to destination over a network. In at least one embodiment, metrics may ordered based on time obtained or stored by metric agent and then provided to an external destination, such as an analytics service, in order. In at least one embodiment, time information, such as time stamps or other indication of a time associated with metric may be provided to external destination with metrics. In at least one embodiment, metrics are written to external storage, over a network, in an order of newest to oldest. In at least one embodiment, external storage is a storage of an analytics service. In at least one embodiment, metrics that are in active data of storage, such as active data 234 of storage 220 in FIG. 2, are prioritized over metrics in backlog. In at least one embodiment, metrics in backlog are copied to external destination only if no metrics are stored in active data of a storage. In at least one embodiment, a backlog is not present ("NO") at block 504, process 500 continues to provide metrics to an external destination. In at least one embodiment, metrics may be provided to external destination in an order of newest to oldest based at least in part on timestamps. In at least one embodiment, if multiple metrics are obtained from an endpoint, metrics may be stored in a storage, and then metrics may be provided to an external destination in an order of newest to oldest based at least in part on timestamps. In at least one embodiment, a timestamp of a metric in a backlog may correspond to a time that an attempt was made to copy metric to external destination. In at least one embodiment, a timestamp of a metric in active data of storage may correspond to a time that metric was stored in storage.

Figure 6:
FIG. 6 illustrates an example method to add a node to a group of nodes, in accordance with at least one embodiment.
Figure 6:
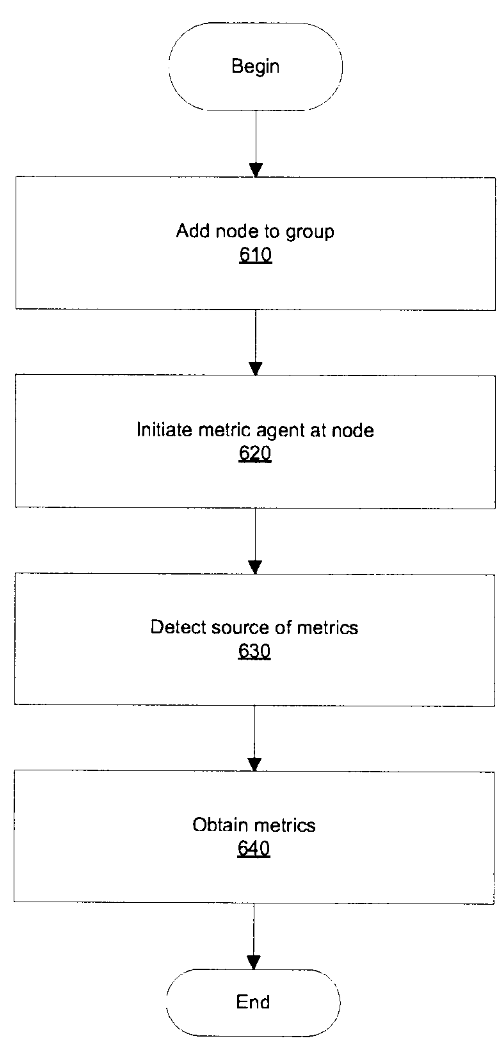

FIG. 6 illustrates a process 600 to add a node to a group, according to at least one embodiment. One or more aspects of at least one embodiment described in conjunction with FIG. 4 can be combined with one or more aspects of at least one embodiment described herein, including embodiments described at least in conjunction with FIGS. 1-5 and 7. In at least one embodiment, process 600 is implemented, in part, as a computer program that utilizes one or more processors. In at least one embodiment, process 600 is implemented, at least in part, by one or more processors of a computer system that implements an orchestration service. In at least one embodiment, process 600 starts with an operation 610 to add node to group. In at least one embodiment, group may be a plurality of nodes to perform workloads. In at least one embodiment, node is added to group due to an increase in demand to perform workloads. In at least one embodiment, node is added to group due to a different node in group malfunctioning or being removed from group.

In at least one embodiment, process 600 continues to operation 620 to cause a metric agent to be initiated at node. In at least one embodiment, operation 620 to initiate a metric agent at node is performed. In at least one embodiment, metric agent is implemented as a computer program that utilizes one or more processors of node. In at least one embodiment, process 600 continues to operation 630 to cause data sources of metrics to be detected. In at least one embodiment, data sources of metrics may be endpoints that may be accessed as connections to hardware components or connection created in software. In at least one embodiment, data sources of metrics may be automatically determined by metric agent. In at least one embodiment, endpoints may be caused to be scraped by metric agent to obtain metrics from node. In at least one embodiment, metrics may be system metrics or workload metrics.

In at least one embodiment, process 600 continues to operation 640 to obtain metrics. In at least one embodiment, metrics are obtained from endpoints. In at least one embodiment, endpoints may expose metrics by a pull model. In at least one embodiment, metrics may be obtained at least in part by being scraped. In at least one embodiment, scraping is to pull metrics from endpoint. In at least one embodiment, metrics are obtained at least in part by metric agent making a GET request at endpoint. In at least one embodiment, operation 640 includes obtaining real-time metrics over a time period. In at least one embodiment, it is desirable to collect or provide metrics from newest to oldest so that programs that monitor and analyze metrics have access to most recent metrics. In at least one embodiment, metrics are obtained from an endpoint in order from oldest to newest. In at least one embodiment, metrics are provided by a metric agent to a remote storage in an order of newest to oldest. In at least one embodiment, metrics are obtained from a metric agent by a remote storage in an order of newest to oldest. In at least one embodiment, a metric agent evaluates metrics data in storage to determine order. In at least one embodiment, metric agent queries a local storage for newest metric and provides newest metric to a destination. In at least one embodiment, newest metric is metric with latest associate time stamp. In at least one embodiment, times corresponding to metrics may be verified by time stamps associated with metrics.

Figure 7:
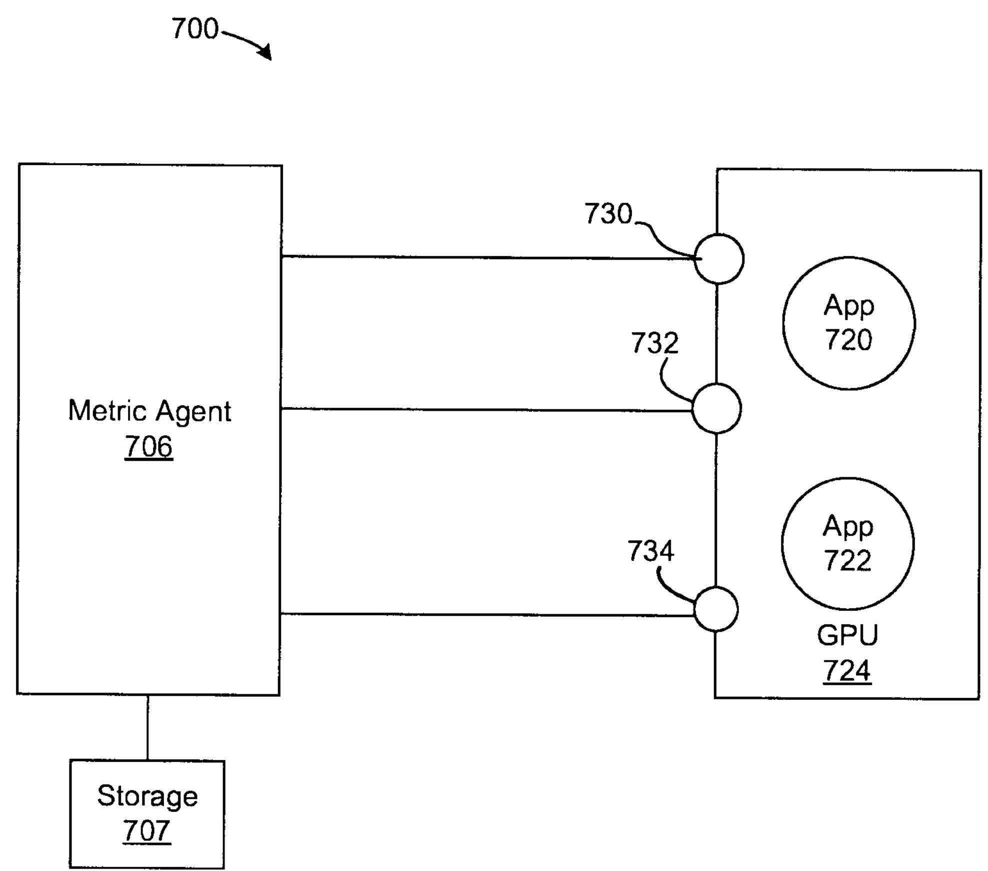
FIG. 7 illustrates a diagram showing obtaining metrics from endpoints of a GPU.

FIG. 7 is a block diagram showing a metrics agent obtaining metrics from endpoints of a GPU, in accordance with at least one embodiment. One or more aspects of at least one embodiment described in conjunction with FIG. 7 can be combined with one or more aspects of embodiments described herein, including embodiments described at least in conjunction with FIGS. 1-6. In at least one embodiment, framework 700 includes a metric agent 706 that is connected to storage 707 and to endpoints 730, 732, and 734 of a node that includes a GPU 724. In at least one embodiment, metric agent 706 detects endpoints 730, 732, and 734. In at least one embodiment, endpoints 730, 732, and 734 may be accessible at addresses, such as IP addresses. In at least one embodiment, endpoints 730, 732, and 734 are to obtain workload metrics. In at least one embodiment, endpoints 730, 732, and 734. In at least one embodiment, metric agent 706 detects endpoints 730, 732, and 734 automatically at startup. In at least one embodiment, endpoints may be detected by metric agent 706 scanning for endpoints. In at least one embodiment, metric agent 706 collects metrics from endpoints 730, 732, 734. In at least one embodiment, one or more GPUs 724 performs applications 720 and 722. In at least one embodiment, applications 720 and 722 may correspond to different workloads. In at least one embodiment, endpoints 730, 732, and 734 may be used by metric agent 706 to obtain information about workloads. In at least one embodiment, metric agent 706 may store metrics data that corresponds to information obtained from endpoints 730, 732, and 734 in storage 707. In at least one embodiment, a metric agent 706 is implemented at each node. In at least one embodiment, if a metric agent malfunctions an analytics service will be able to obtain metrics from other metric agents on other nodes. In at least one embodiment, framework 700 allows for improved scaling as nodes are added to a group of nodes.

Servers and Data Centers

The following figures set forth, without limitation, exemplary network server and data center based systems that can be used to implement at least one embodiment.

Figure 8:
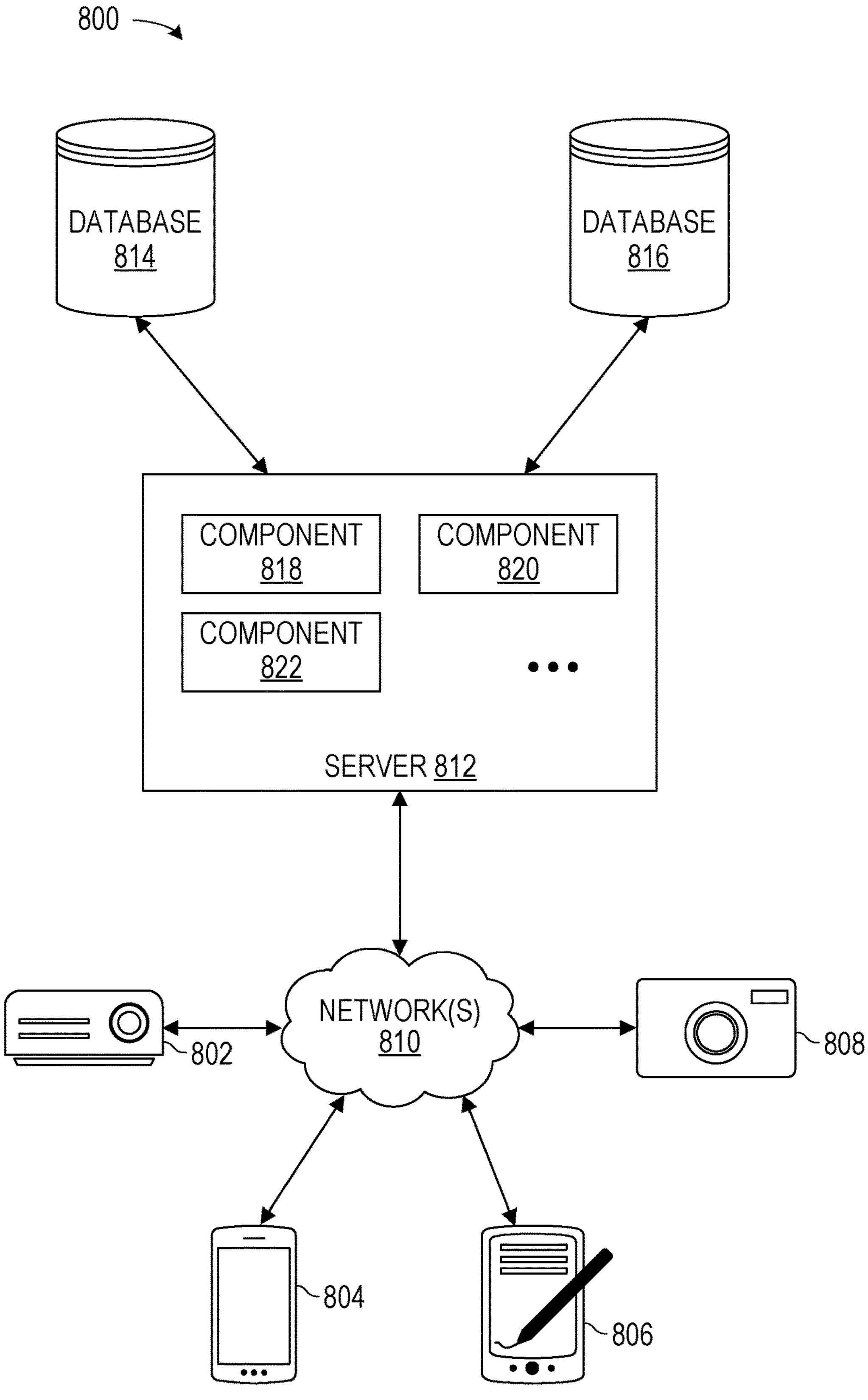
FIG. 8 illustrates a distributed system, in accordance with at least one embodiment.

FIG. 8 illustrates a distributed system 800, in accordance with at least one embodiment. In at least one embodiment, FIG. 8 is to cause metrics data of one or more graphics processing units (GPUs) to be obtained from the one or more GPUs in an order from newest to oldest and/or otherwise perform operations described herein in connection with FIGS. 1-7. In at least one embodiment, distributed system 800 includes one or more client computing devices 802, 804, 806, and 808, which are configured to execute and operate a client application such as a web browser, proprietary client, and/or variations thereof over one or more network(s) 810. In at least one embodiment, server 812 may be communicatively coupled with remote client computing devices 802, 804, 806, and 808 via network 810.

In at least one embodiment, server 812 may be adapted to run one or more services or software applications such as services and applications that may manage session activity of single sign-on (SSO) access across multiple data centers. In at least one embodiment, server 812 may also provide other services or software applications can include non-virtual and virtual environments. In at least one embodiment, these services may be offered as web-based or cloud services or under a Software as a Service (SaaS) model to users of client computing devices 802, 804, 806, and/or 808. In at least one embodiment, users operating client computing devices 802, 804, 806, and/or 808 may in turn utilize one or more client applications to interact with server 812 to utilize services provided by these components.

In at least one embodiment, software components 818, 820 and 822 of system 800 are implemented on server 812. In at least one embodiment, one or more components of system 800 and/or services provided by these components may also be implemented by one or more of client computing devices 802, 804, 806, and/or 808. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

In at least one embodiment, client computing devices 802, 804, 806, and/or 808 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810. Although distributed system 800 in FIG. 8 is shown with four client computing devices, any number of client computing devices may be supported. Other devices, such as devices with sensors, etc., may interact with server 812.

In at least one embodiment, network(s) 810 in distributed system 800 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 810 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 812 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 812 using software defined networking. In at least one embodiment, server 812 may be adapted to run one or more services or software applications.

In at least one embodiment, server 812 may run any operating system, as well as any commercially available server operating system. In at least one embodiment, server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 812 may include one or more applications to analyze and consolidate data feeds and/or event updates received from users of client computing devices 802, 804, 806, and 808. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 812 may also include one or more applications to display data feeds and/or real-time events via one or more display devices of client computing devices 802, 804, 806, and 808.

In at least one embodiment, distributed system 800 may also include one or more databases 814 and 816. In at least one embodiment, databases may provide a mechanism for storing information such as user interactions information, usage patterns information, adaptation rules information, and other information. In at least one embodiment, databases 814 and 816 may reside in a variety of locations. In at least one embodiment, one or more of databases 814 and 816 may reside on a non-transitory storage medium local to (and/or resident in) server 812. In at least one embodiment, databases 814 and 816 may be remote from server 812 and in communication with server 812 via a network-based or dedicated connection. In at least one embodiment, databases 814 and 816 may reside in a storage-area network (SAN). In at least one embodiment, any necessary files for performing functions attributed to server 812 may be stored locally on server 812 and/or remotely, as appropriate. In at least one embodiment, databases 814 and 816 may include relational databases, such as databases that are adapted to store, update, and retrieve data in response to SQL-formatted commands.

Figure 9:
FIG. 9 illustrates an exemplary data center, in accordance with at least one embodiment.
Figure 9:
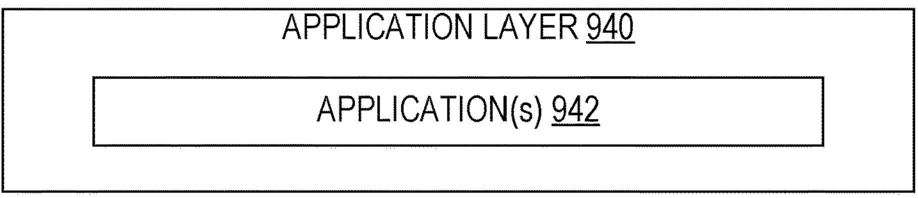
Figure 9:
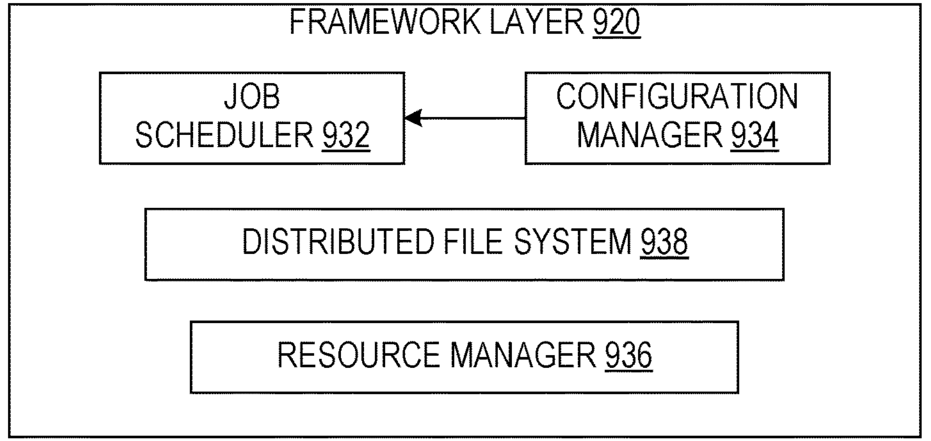
Figure 9:
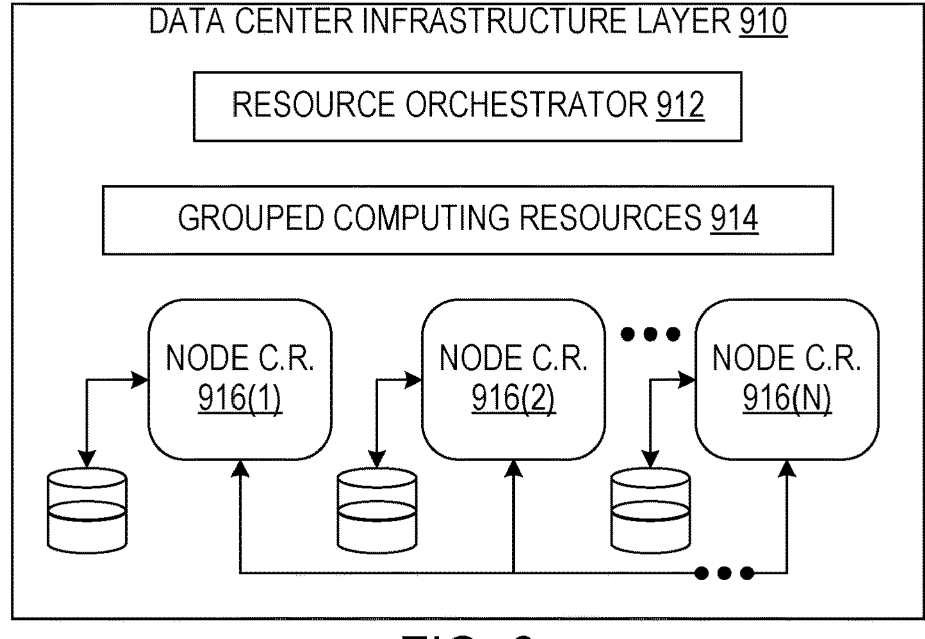

FIG. 9 illustrates an exemplary data center 900, in accordance with at least one embodiment. In at least one embodiment, FIG. 9 is to cause metrics data of one or more graphics processing units (GPUs) to be obtained from the one or more GPUs in an order from newest to oldest and/or otherwise perform operations described herein in connection with FIGS. 1-7. In at least one embodiment, data center 900 includes, without limitation, a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator 912 may include hardware, software or some combination thereof.

In at least one embodiment, as shown in FIG. 9, framework layer 920 includes, without limitation, a job scheduler 932, a configuration manager 934, a resource manager 936 and a distributed file system 938. In at least one embodiment, framework layer 920 may include a framework to support software 952 of software layer 930 and/or one or more application(s) 942 of application layer 940. In at least one embodiment, software 952 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920, including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 952 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. In at least one or more types of applications may include, without limitation, CUDA applications, 5G network applications, artificial intelligence application, data center applications, and/or variations thereof.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

Figure 10:
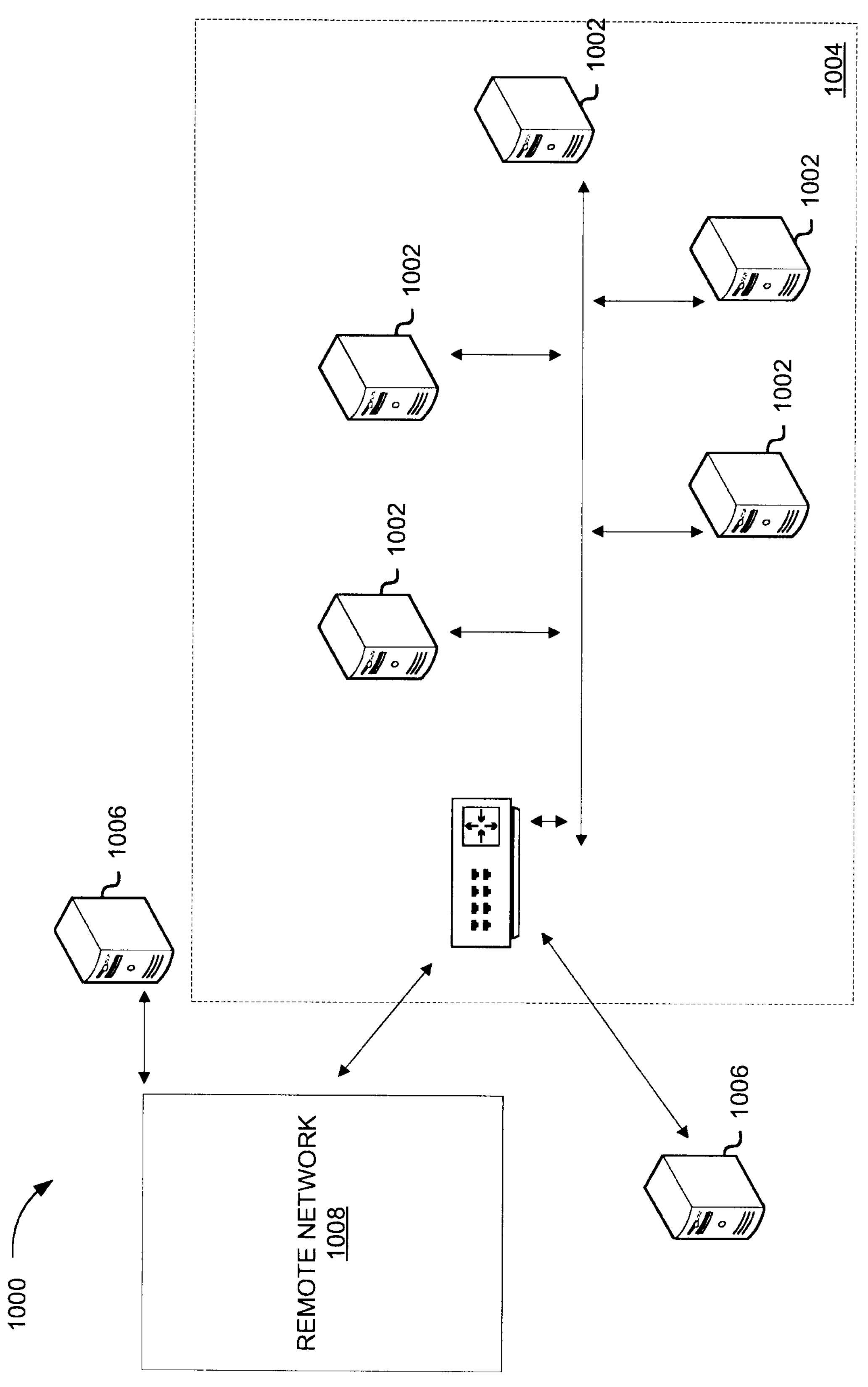
FIG. 10 illustrates a client-server network, in accordance with at least one embodiment.

FIG. 10 illustrates a client-server network 1004 formed by a plurality of network server computers 1002 which are interlinked, in accordance with at least one embodiment. In at least one embodiment, FIG. 10 is to cause metrics data of one or more graphics processing units (GPUs) to be obtained from the one or more GPUs in an order from newest to oldest and/or otherwise perform operations described herein in connection with FIGS. 1-7. In at least one embodiment, in a system 1000, each network server computer 1002 stores data accessible to other network server computers 1002 and to client computers 1006 and networks 1008 which link into a wide area network 1004. In at least one embodiment, configuration of a client-server network 1004 may change over time as client computers 1006 and one or more networks 1008 connect and disconnect from a network 1004, and as one or more trunk line server computers 1002 are added or removed from a network 1004. In at least one embodiment, when a client computer 1006 and a network 1008 are connected with network server computers 1002, client-server network includes such client computer 1006 and network 1008. In at least one embodiment, the term computer includes any device or machine capable of accepting data, applying prescribed processes to data, and supplying results of processes.

In at least one embodiment, client-server network 1004 stores information which is accessible to network server computers 1002, remote networks 1008 and client computers 1006. In at least one embodiment, network server computers 1002 are formed by main frame computers minicomputers, and/or microcomputers having one or more processors each. In at least one embodiment, server computers 1002 are linked together by wired and/or wireless transfer media, such as conductive wire, fiber optic cable, and/or microwave transmission media, satellite transmission media or other conductive, optic or electromagnetic wave transmission media. In at least one embodiment, client computers 1006 access a network server computer 1002 by a similar wired or a wireless transfer medium. In at least one embodiment, a client computer 1006 may link into a client-server network 1004 using a modem and a standard telephone communication network. In at least one embodiment, alternative carrier systems such as cable and satellite communication systems also may be used to link into client-server network 1004. In at least one embodiment, other private or time-shared carrier systems may be used. In at least one embodiment, network 1004 is a global information network, such as the Internet. In at least one embodiment, network is a private intranet using similar protocols as the Internet, but with added security measures and restricted access controls. In at least one embodiment, network 1004 is a private, or semi-private network using proprietary communication protocols.

In at least one embodiment, client computer 1006 is any end user computer, and may also be a mainframe computer, mini-computer or microcomputer having one or more microprocessors. In at least one embodiment, server computer 1002 may at times function as a client computer accessing another server computer 1002. In at least one embodiment, remote network 1008 may be a local area network, a network added into a wide area network through an independent service provider (ISP) for the Internet, or another group of computers interconnected by wired or wireless transfer media having a configuration which is either fixed or changing over time. In at least one embodiment, client computers 1006 may link into and access a network 1004 independently or through a remote network 1008.

Figure 11:
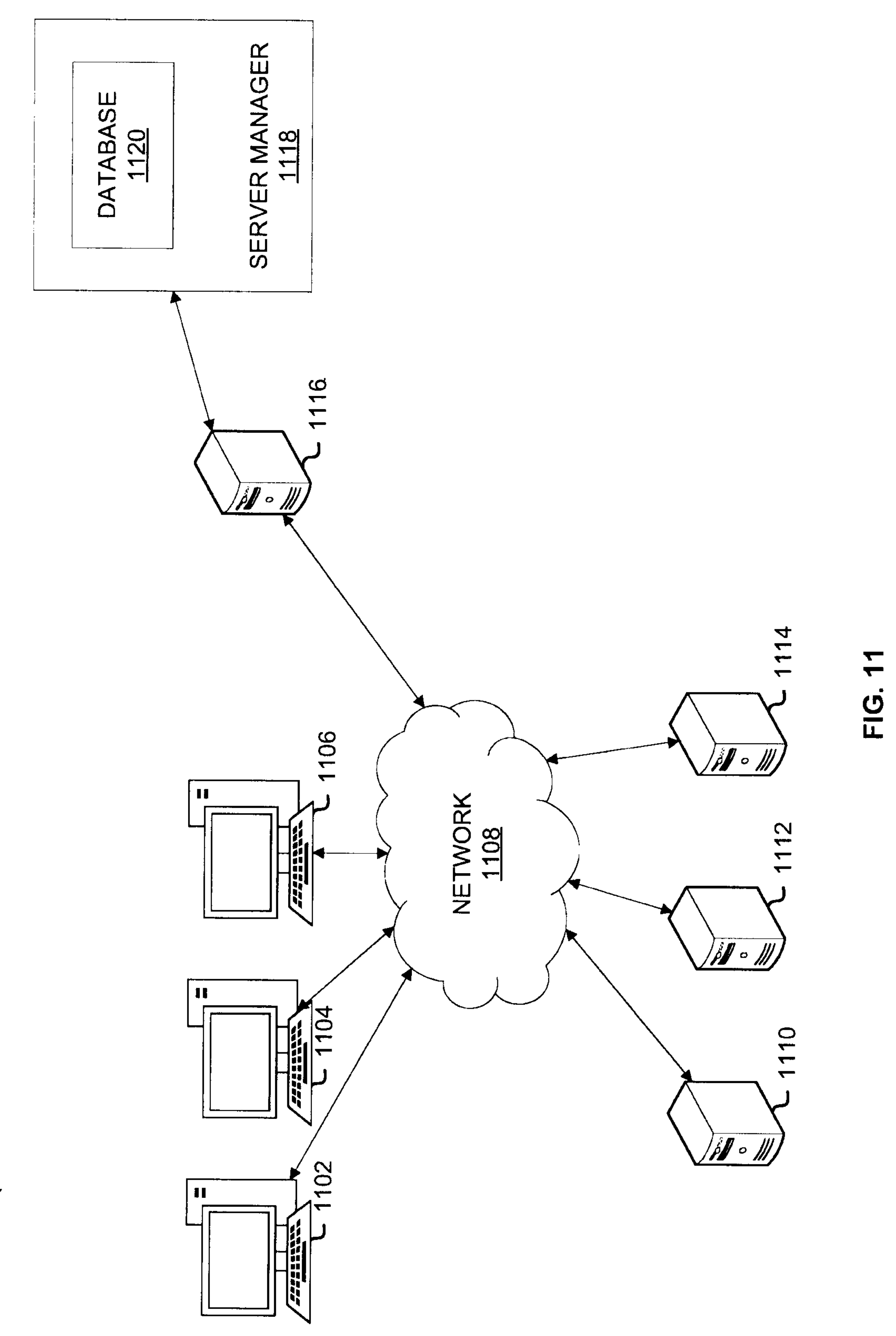
FIG. 11 illustrates an example of a computer network, in accordance with at least one embodiment.

FIG. 11 illustrates an example 1100 of a computer network 1108 connecting one or more computing machines, in accordance with at least one embodiment. In at least one embodiment, FIG. 11 is to cause metrics data of one or more graphics processing units (GPUs) to be obtained from the one or more GPUs in an order from newest to oldest and/or otherwise perform operations described herein in connection with FIGS. 1-7. In at least one embodiment, network 1108 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1108 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1108 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1108 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1102, 1104, and 1106 are connected to a network 1108 via respective communication links. In at least one embodiment, each of these clients may access a network 1108 via any desired form of communication, such as via a dial-up modem connection, cable link, a digital subscriber line (DSL), wireless or satellite link, or any other form of communication. In at least one embodiment, each client may communicate using any machine that is compatible with a network 1108, such as a personal computer (PC), work station, dedicated terminal, personal data assistant (PDA), or other similar equipment. In at least one embodiment, clients 1102, 1104, and 1106 may or may not be located in a same geographical area.

In at least one embodiment, a plurality of servers 1110, 1112, and 1114 are connected to a network 1108 to serve clients that are in communication with a network 1108. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1110, 1112, 1114 run application programs that respond to client commands. In at least one embodiment, server 1110 may run a web server application for responding to client requests for HTML pages and may also run a mail server application for receiving and routing electronic mail. In at least one embodiment, other application programs, such as an FTP server or a media server for streaming audio/video data to clients may also be running on a server 1110. In at least one embodiment, different servers may be dedicated to performing different tasks. In at least one embodiment, server 1110 may be a dedicated web server that manages resources relating to web sites for various users, whereas a server 1112 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1110, 1112, 1114 are under control of a web hosting provider in a business of maintaining and delivering third party content over a network 1108.

In at least one embodiment, web hosting providers deliver services to two different types of clients. In at least one embodiment, one type, which may be referred to as a browser, requests content from servers 1110, 1112, 1114 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1116 is in communication with a network 1108 via a communication link. In at least one embodiment, intranet server 1116 is in communication with a server manager 1118. In at least one embodiment, server manager 1118 comprises a database of an application program configuration parameters which are being utilized in servers 1110, 1112, 1114. In at least one embodiment, users modify a database 1120 via an intranet 1116, and a server manager 1118 interacts with servers 1110, 1112, 1114 to modify application program parameters so that they match a content of a database. In at least one embodiment, a user logs onto an intranet server 1116 by connecting to an intranet 1116 via computer 1102 and entering authentication information, such as a username and password.

In at least one embodiment, when a user wishes to sign up for new service or modify an existing service, an intranet server 1116 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1116 updates a database 1120. In at least one embodiment, server manager 1118 forwards this information to an appropriate server, and a new parameter is used during application program operation. In at least one embodiment, an intranet server 1116 is configured to provide users with access to configuration parameters of hosted network resources (e.g., web pages, email, FTP sites, media sites, etc.), for which a user has contracted with a web hosting service provider.

Figure 12A:
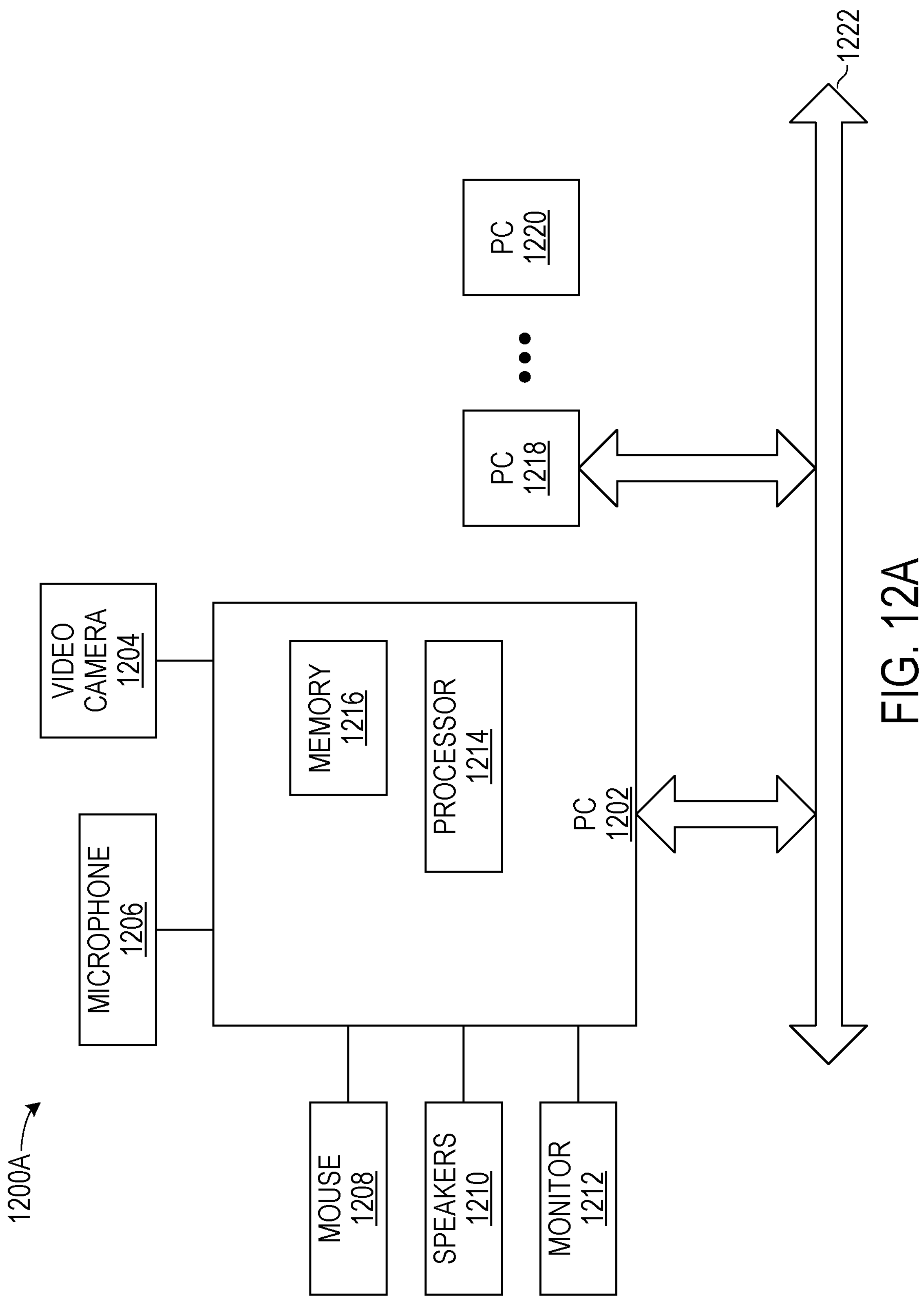
FIG. 12A illustrates a networked computer system, in accordance with at least one embodiment.

FIG. 12A illustrates a networked computer system 1200A, in accordance with at least one embodiment. In at least one embodiment, networked computer system 1200A comprises a plurality of nodes or personal computers ("PCs") 1202, 1218, 1220. In at least one embodiment, personal computer or node 1202 comprises a processor 1214, memory 1216, video camera 1204, microphone 1206, mouse 1208, speakers 1210, and monitor 1212. In at least one embodiment, PCs 1202, 1218, 1220 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1202, 1218, 1220 and other nodes of a network are interconnected via medium 1222. In at least one embodiment, medium 1222 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1214 is a general-purpose programmable processor. In at least one embodiment, processors of nodes of networked computer system 1200A may also be special-purpose video processors. In at least one embodiment, various peripherals and components of a node such as those of node 1202 may vary from those of other nodes. In at least one embodiment, node 1218 and node 1220 may be configured identically to or differently than node 1202. In at least one embodiment, a node may be implemented on any suitable computer system in addition to PC systems.

Figure 12B:
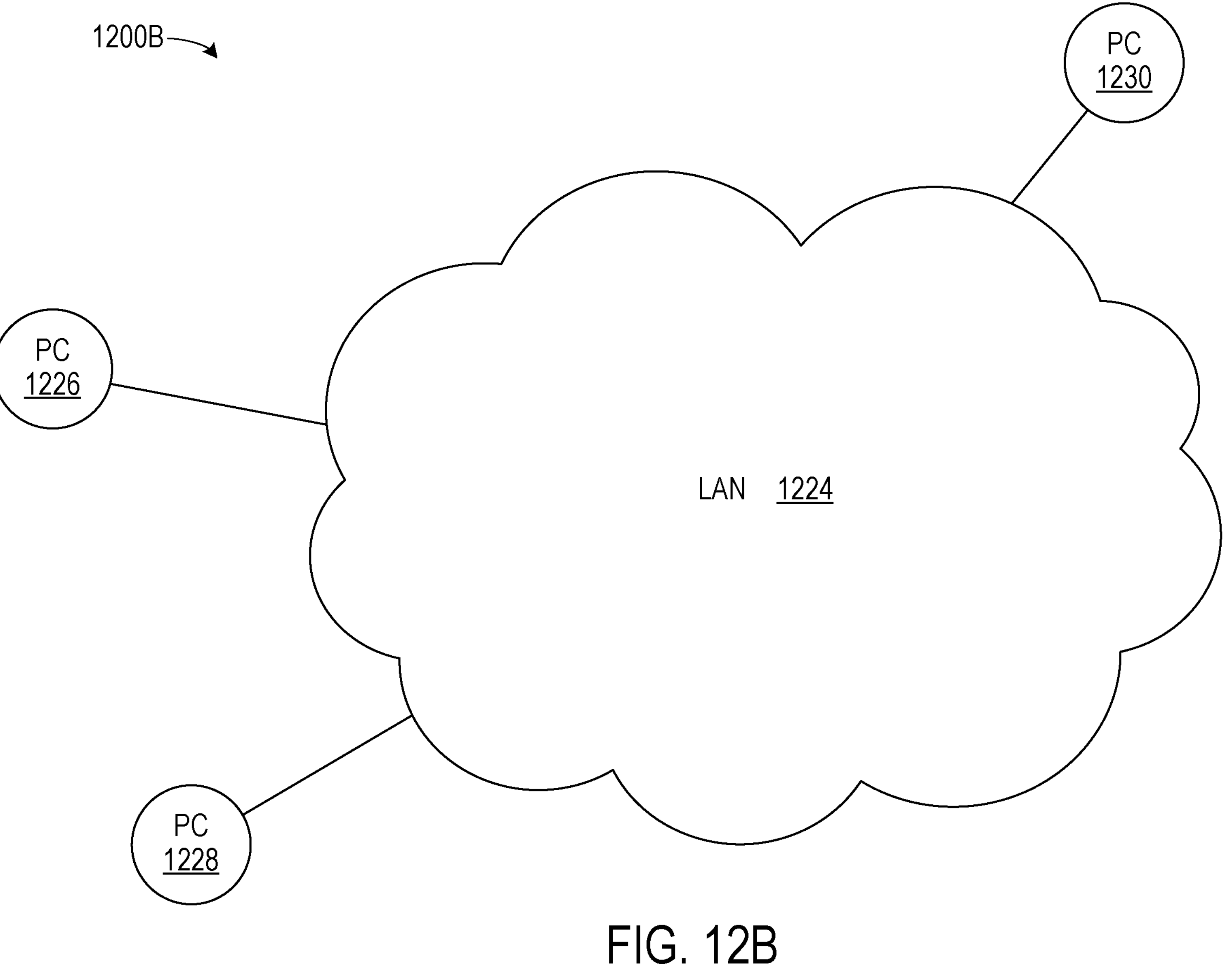
FIG. 12B illustrates a networked computer system, in accordance with at least one embodiment.

FIG. 12B illustrates a networked computer system 1200B, in accordance with at least one embodiment. In at least one embodiment, system 1200B illustrates a network such as LAN 1224, which may be used to interconnect a variety of nodes that may communicate with each other. In at least one embodiment, attached to LAN 1224 are a plurality of nodes such as PC nodes 1226, 1228, 1230. In at least one embodiment, a node may also be connected to the LAN via a network server or other means. In at least one embodiment, system 1200B comprises other types of nodes or elements, for example including routers, servers, and nodes.

Figure 12C:
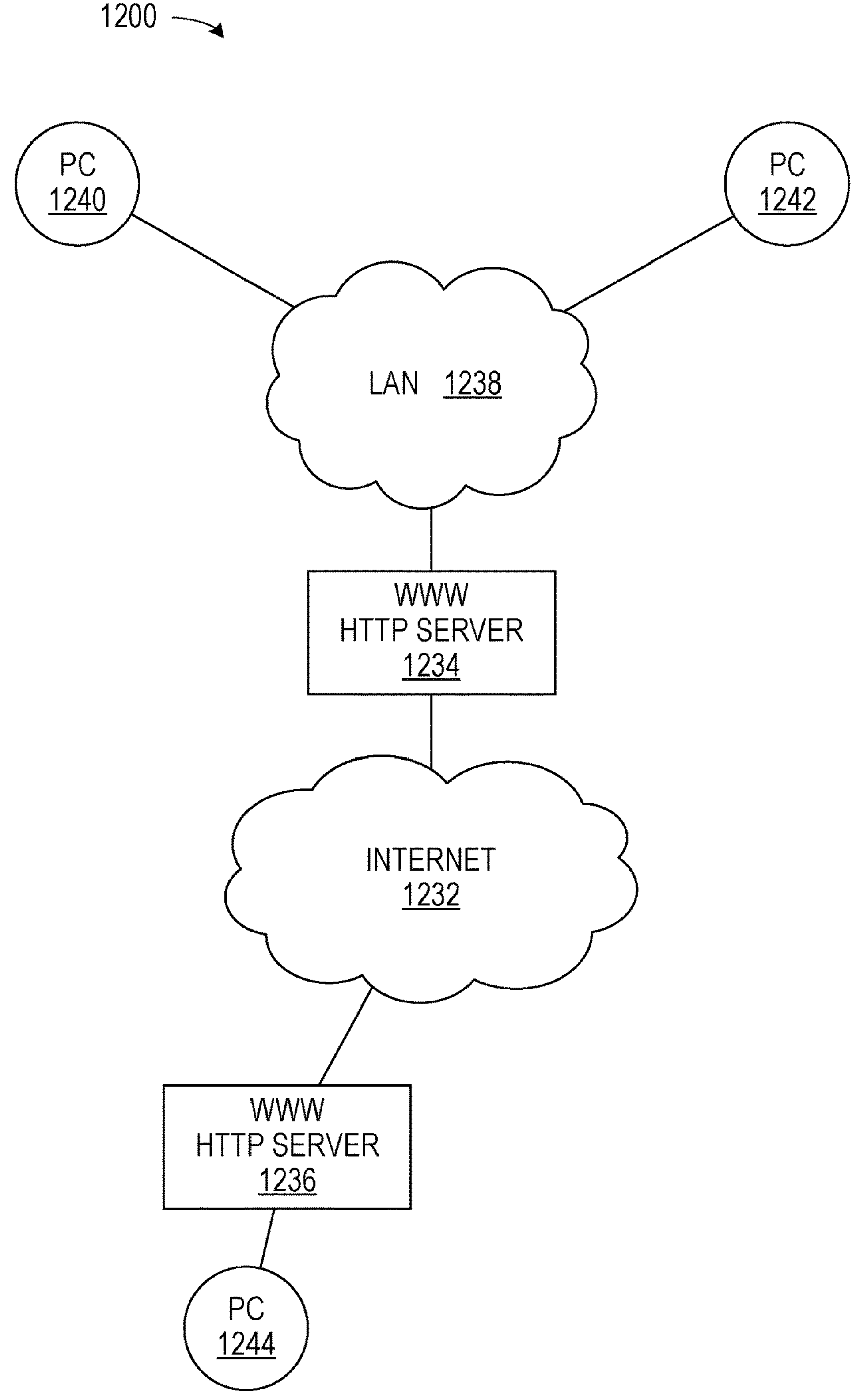
FIG. 12C illustrates a networked computer system, in accordance with at least one embodiment.

FIG. 12C illustrates a networked computer system 1200C, in accordance with at least one embodiment. In at least one embodiment, system 1200C illustrates a WWW system having communications across a backbone communications network such as Internet 1232, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1232 in WWW are a plurality of nodes such as PCs 1240, 1242, 1244. In at least one embodiment, a node is interfaced to other nodes of WWW through a WWW HTTP server such as servers 1234, 1236. In at least one embodiment, PC 1244 may be a PC forming a node of network 1232 and itself running its server 1236, although PC 1244 and server 1236 are illustrated separately in FIG. 12C for illustrative purposes. In at least one embodiment, FIGS. 12A-12C is to cause metrics data of one or more graphics processing units (GPUs) to be obtained from the one or more GPUs in an order from newest to oldest and/or otherwise perform operations described herein in connection with FIGS. 1-7.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1238 as illustrated with respect to WWW HTTP server 1234. In at least one embodiment, system 1200C may also comprise other types of nodes or elements. In at least one embodiment, a WWW HTTP server is an application running on a machine, such as a PC. In at least one embodiment, each user may be considered to have a unique "server," as illustrated with respect to PC 1244. In at least one embodiment, a server may be considered to be a server such as WWW HTTP server 1234, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

Figure 13:
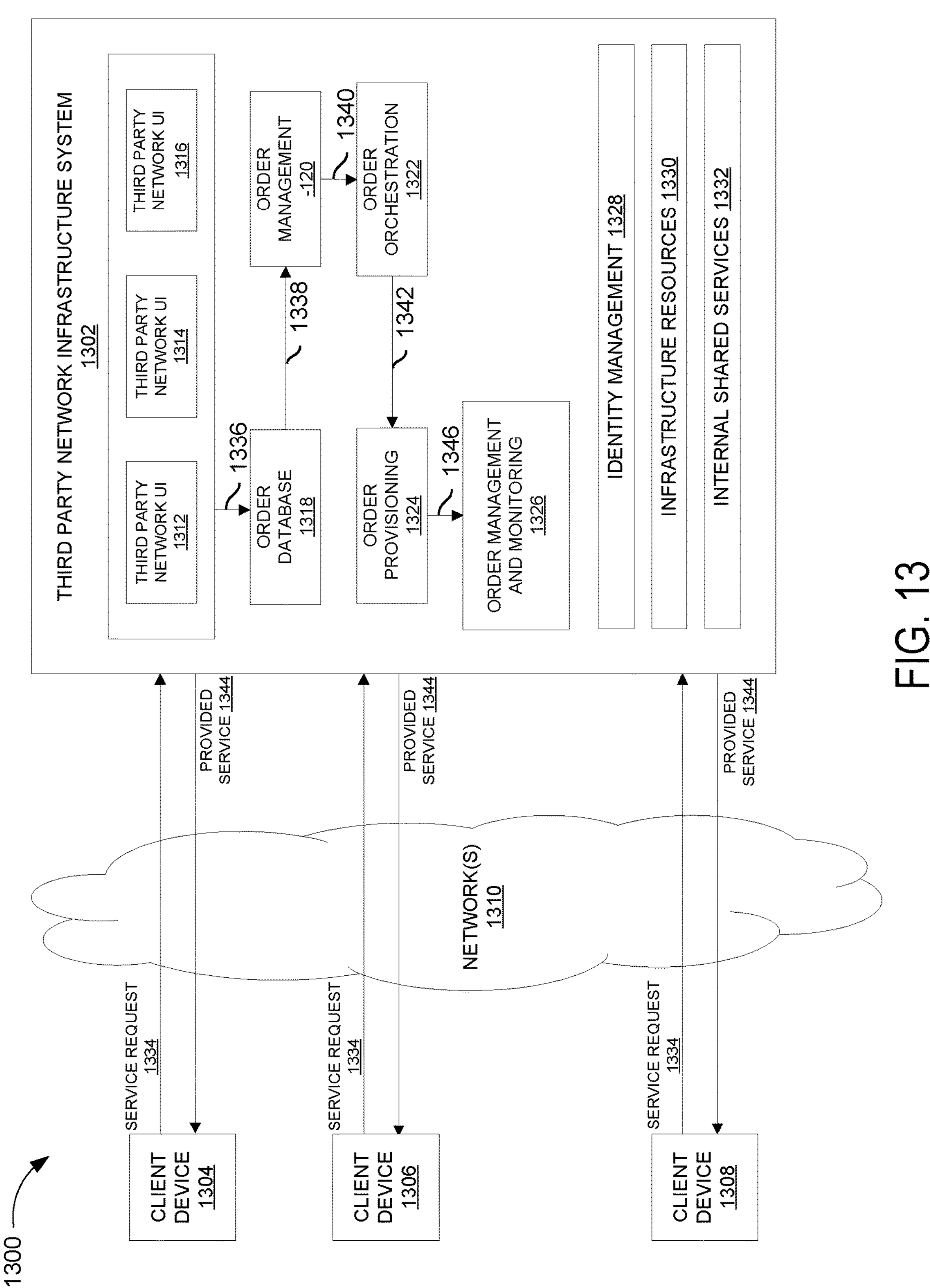
FIG. 13 illustrates one or more components of a system environment in which services may be offered as third party network services, in accordance with at least one embodiment.

FIG. 13 illustrates one or more components of a system environment 1300 in which services may be offered as third party network services, in accordance with at least one embodiment. In at least one embodiment, FIG. 13 is to cause metrics data of one or more graphics processing units (GPUs) to be obtained from the one or more GPUs in an order from newest to oldest and/or otherwise perform operations described herein in connection with FIGS. 1-7. In at least one embodiment, a third party network may be referred to as a cloud, cloud network, cloud computing network, and/or variations thereof. In at least one embodiment, system environment 1300 includes one or more client computing devices 1304, 1306, and 1308 that may be used by users to interact with a third party network infrastructure system 1302 that provides third party network services, which may be referred to as cloud computing services. In at least one embodiment, third party network infrastructure system 1302 may comprise one or more computers and/or servers.

It should be appreciated that third party network infrastructure system 1302 depicted in FIG. 13 may have other components than those depicted. Further, FIG. 13 depicts an embodiment of a third party network infrastructure system. In at least one embodiment, third party network infrastructure system 1302 may have more or fewer components than depicted in FIG. 13, may combine two or more components, or may have a different configuration or arrangement of components.

In at least one embodiment, client computing devices 1304, 1306, and 1308 may be configured to operate a client application such as a web browser, a proprietary client application, or some other application, which may be used by a user of a client computing device to interact with third party network infrastructure system 1302 to use services provided by third party network infrastructure system 1302. Although exemplary system environment 1300 is shown with three client computing devices, any number of client computing devices may be supported. In at least one embodiment, other devices such as devices with sensors, etc. may interact with third party network infrastructure system 1302. In at least one embodiment, network(s) 1310 may facilitate communications and exchange of data between client computing devices 1304, 1306, and 1308 and third party network infrastructure system 1302.

In at least one embodiment, services provided by third party network infrastructure system 1302 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1302 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1302 may include a suite of applications, middleware, and database service offerings that are delivered to a customer in a self-service, subscription-based, elastically scalable, reliable, highly available, and secure manner. In at least one embodiment, third party network infrastructure system 1302 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1302 may be adapted to automatically provision, manage and track a customer's subscription to services offered by third party network infrastructure system 1302. In at least one embodiment, third party network infrastructure system 1302 may provide third party network services via different deployment models. In at least one embodiment, services may be provided under a public third party network model in which third party network infrastructure system 1302 is owned by an organization selling third party network services and services are made available to a general public or different industry enterprises. In at least one embodiment, services may be provided under a private third party network model in which third party network infrastructure system 1302 is operated solely for a single organization and may provide services for one or more entities within an organization. In at least one embodiment, third party network services may also be provided under a community third party network model in which third party network infrastructure system 1302 and services provided by third party network infrastructure system 1302 are shared by several organizations in a related community. In at least one embodiment, third party network services may also be provided under a hybrid third party network model, which is a combination of two or more different models.

In at least one embodiment, services provided by third party network infrastructure system 1302 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1302. In at least one embodiment, third party network infrastructure system 1302 then performs processing to provide services in a customer's subscription order.

In at least one embodiment, services provided by third party network infrastructure system 1302 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1302 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1302 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1302 may also include infrastructure resources 1330 for providing resources used to provide various services to customers of a third party network infrastructure system. In at least one embodiment, infrastructure resources 1330 may include pre-integrated and optimized combinations of hardware, such as servers, storage, and networking resources to execute services provided by a Paas platform and a Saas platform, and other resources.

In at least one embodiment, resources in third party network infrastructure system 1302 may be shared by multiple users and dynamically re-allocated per demand. In at least one embodiment, resources may be allocated to users in different time zones. In at least one embodiment, third party network infrastructure system 1302 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1332 may be provided that are shared by different components or modules of third party network infrastructure system 1302 to enable provision of services by third party network infrastructure system 1302. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1302 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1302, and/or variations thereof.

In at least one embodiment, as depicted in FIG. 13, third party network management functionality may be provided by one or more modules, such as an order management module 1320, an order orchestration module 1322, an order provisioning module 1324, an order management and monitoring module 1326, and an identity management module 1328. In at least one embodiment, these modules may include or be provided using one or more computers and/or servers, which may be general purpose computers, specialized server computers, server farms, server clusters, or any other appropriate arrangement and/or combination.

In at least one embodiment, at step 1334, a customer using a client device, such as client computing devices 1304, 1306 or 1308, may interact with third party network infrastructure system 1302 by requesting one or more services provided by third party network infrastructure system 1302 and placing an order for a subscription for one or more services offered by third party network infrastructure system 1302. In at least one embodiment, a customer may access a third party network User Interface (UI) such as third party network UI 1312, third party network UI 1314 and/or third party network UI 1316 and place a subscription order via these UIs. In at least one embodiment, order information received by third party network infrastructure system 1302 in response to a customer placing an order may include information identifying a customer and one or more services offered by a third party network infrastructure system 1302 that a customer intends to subscribe to.

In at least one embodiment, at step 1336, an order information received from a customer may be stored in an order database 1318. In at least one embodiment, if this is a new order, a new record may be created for an order. In at least one embodiment, order database 1318 can be one of several databases operated by third party network infrastructure system 1318 and operated in conjunction with other system elements.

In at least one embodiment, at step 1338, an order information may be forwarded to an order management module 1320 that may be configured to perform billing and accounting functions related to an order, such as verifying an order, and upon verification, booking an order.

In at least one embodiment, at step 1340, information regarding an order may be communicated to an order orchestration module 1322 that is configured to orchestrate provisioning of services and resources for an order placed by a customer. In at least one embodiment, order orchestration module 1322 may use services of order provisioning module 1324 for provisioning. In at least one embodiment, order orchestration module 1322 enables management of business processes associated with each order and applies business logic to determine whether an order should proceed to provisioning.

In at least one embodiment, at step 1342, upon receiving an order for a new subscription, order orchestration module 1322 sends a request to order provisioning module 1324 to allocate resources and configure resources needed to fulfill a subscription order. In at least one embodiment, order provisioning module 1324 enables an allocation of resources for services ordered by a customer. In at least one embodiment, order provisioning module 1324 provides a level of abstraction between third party network services provided by third party network infrastructure system 1300 and a physical implementation layer that is used to provision resources for providing requested services. In at least one embodiment, this enables order orchestration module 1322 to be isolated from implementation details, such as whether or not services and resources are actually provisioned in real-time or pre-provisioned and only allocated/assigned upon request.

In at least one embodiment, at step 1344, once services and resources are provisioned, a notification may be sent to subscribing customers indicating that a requested service is now ready for use. In at least one embodiment, information (e.g. a link) may be sent to a customer that enables a customer to start using requested services.

In at least one embodiment, at step 1346, a customer's subscription order may be managed and tracked by an order management and monitoring module 1326. In at least one embodiment, order management and monitoring module 1326 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1300 may include an identity management module 1328 that is configured to provide identity services, such as access management and authorization services in third party network infrastructure system 1300. In at least one embodiment, identity management module 1328 may control information about customers who wish to utilize services provided by third party network infrastructure system 1302. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1328 may also include management of descriptive information about each customer and about how and by whom that descriptive information can be accessed and modified.

Figure 14:
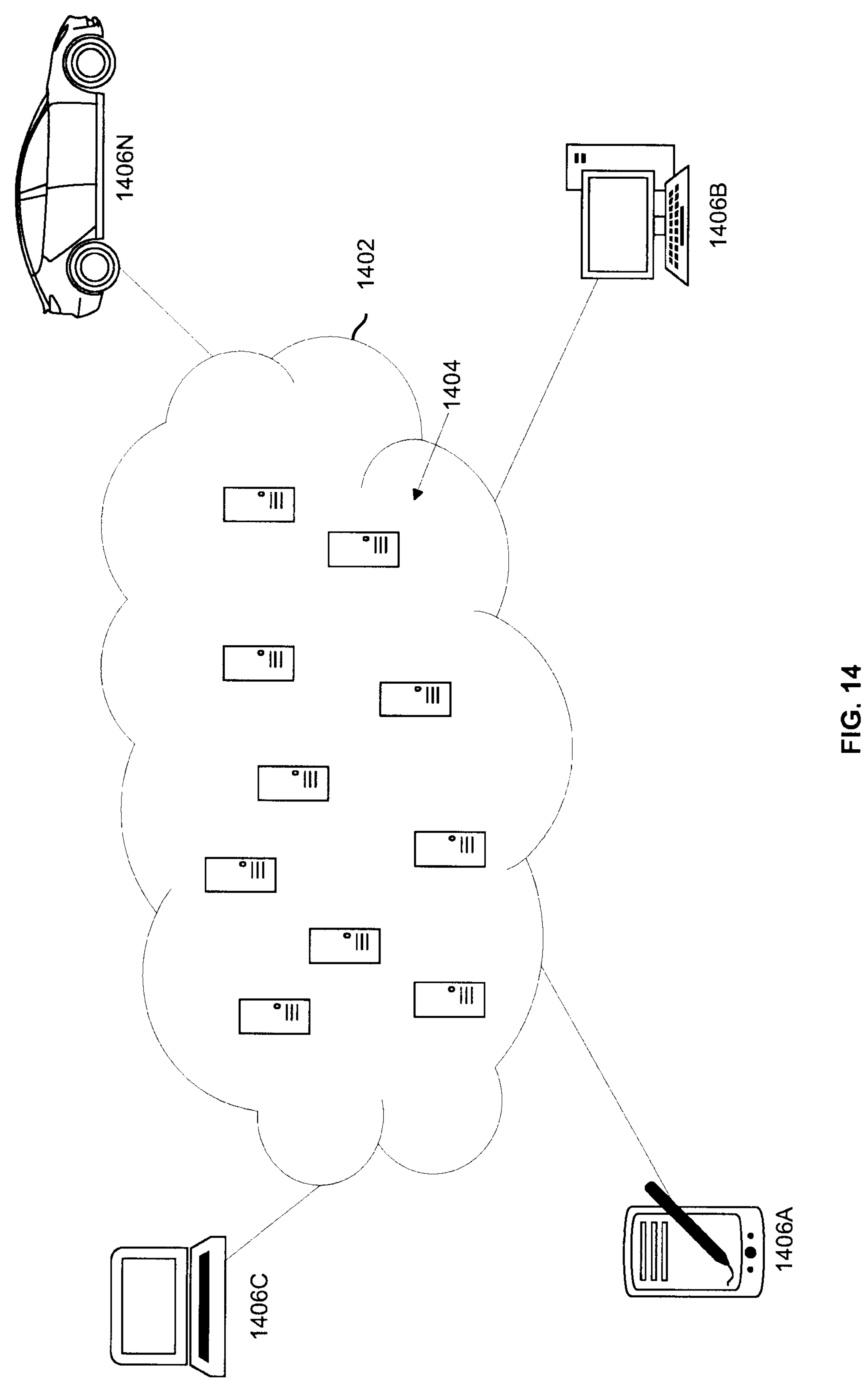
FIG. 14 illustrates a cloud computing environment, in accordance with at least one embodiment.

FIG. 14 illustrates a cloud computing environment 1402, in accordance with at least one embodiment. In at least one embodiment, FIG. 14 is to cause metrics data of one or more graphics processing units (GPUs) to be obtained from the one or more GPUs in an order from newest to oldest and/or otherwise perform operations described herein in connection with FIGS. 1-7. In at least one embodiment, cloud computing environment 1402 comprises one or more computer system/servers 1404 with which computing devices such as, personal digital assistant (PDA) or cellular telephone 1406A, desktop computer 1406B, laptop computer 1406C, and/or automobile computer system 1406N communicate. In at least one embodiment, this allows for infrastructure, platforms and/or software to be offered as services from cloud computing environment 1402, so as to not require each client to separately maintain such resources. It is understood that types of computing devices 1406A-N shown in FIG. 14 are intended to be illustrative only and that cloud computing environment 1402 can communicate with any type of computerized device over any type of network and/or network/addressable connection (e.g., using a web browser).

In at least one embodiment, a computer system/server 1404, which can be denoted as a cloud computing node, is operational with numerous other general purpose or special purpose computing system environments or configurations. In at least one embodiment, examples of computing systems, environments, and/or configurations that may be suitable for use with computer system/server 1404 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1404 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1404 may be practiced in distributed loud computing environments where tasks are performed by remote processing devices that are linked through a communications network. In at least one embodiment, in a distributed cloud computing environment, program modules may be located in both local and remote computer system storage media including memory storage devices.

Figure 15:
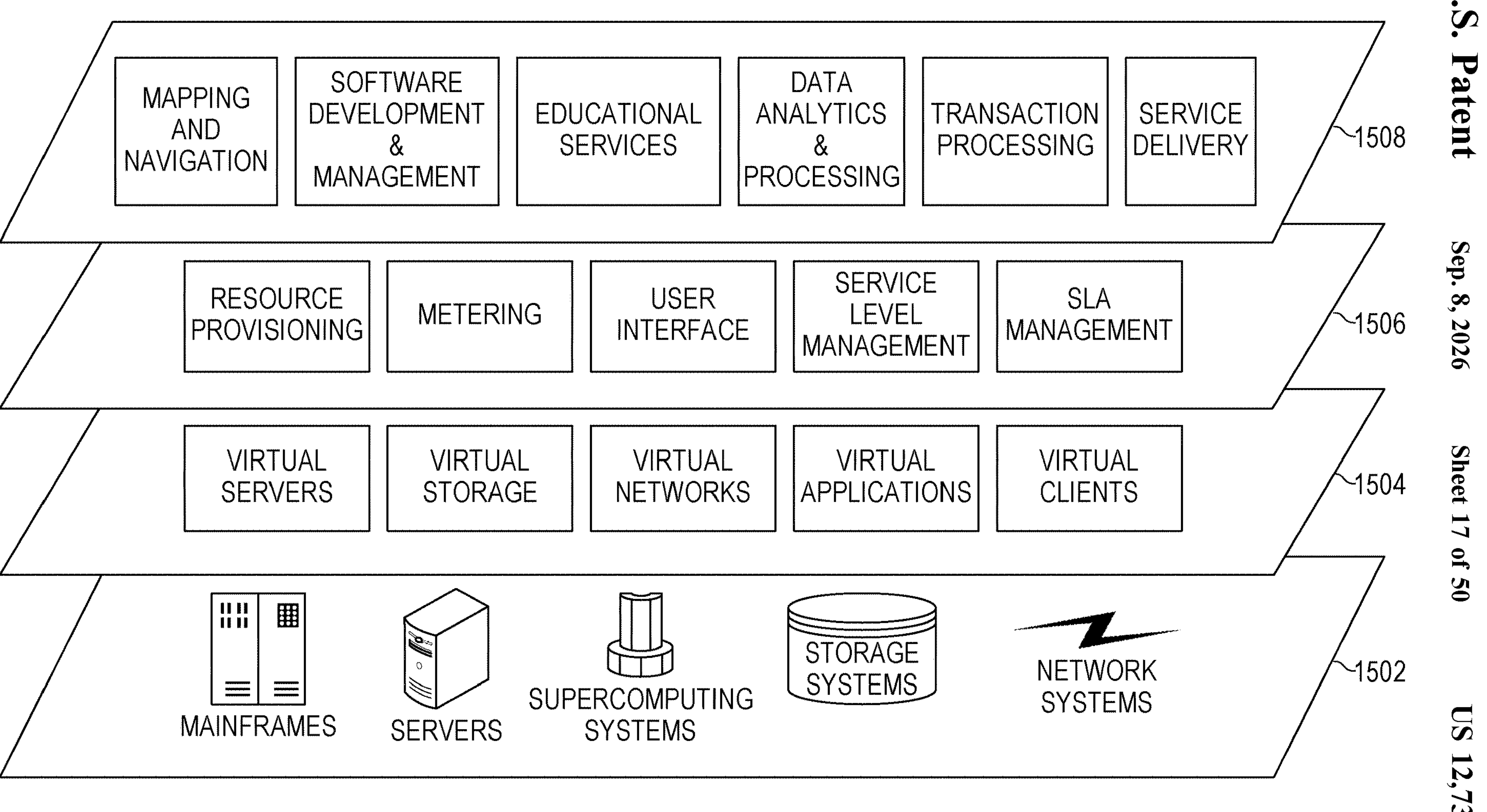
FIG. 15 illustrates a set of functional abstraction layers provided by a cloud computing environment, in accordance with at least one embodiment.

FIG. 15 illustrates a set of functional abstraction layers provided by cloud computing environment 1402 (FIG. 14), in accordance with at least one embodiment. In at least one embodiment, FIG. 15 is to cause metrics data of one or more graphics processing units (GPUs) to be obtained from the one or more GPUs in an order from newest to oldest and/or otherwise perform operations described herein in connection with FIGS. 1-7. It should be understood in advance that components, layers, and functions shown in FIG. 15 are intended to be illustrative only, and components, layers, and functions may vary.

In at least one embodiment, hardware and software layer 1502 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1504 provides an abstraction layer from which following exemplary virtual entities may be provided: virtual servers, virtual storage, virtual networks, including virtual private networks, virtual applications, virtual clients, and/or variations thereof.

In at least one embodiment, management layer 1506 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1508 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 16:
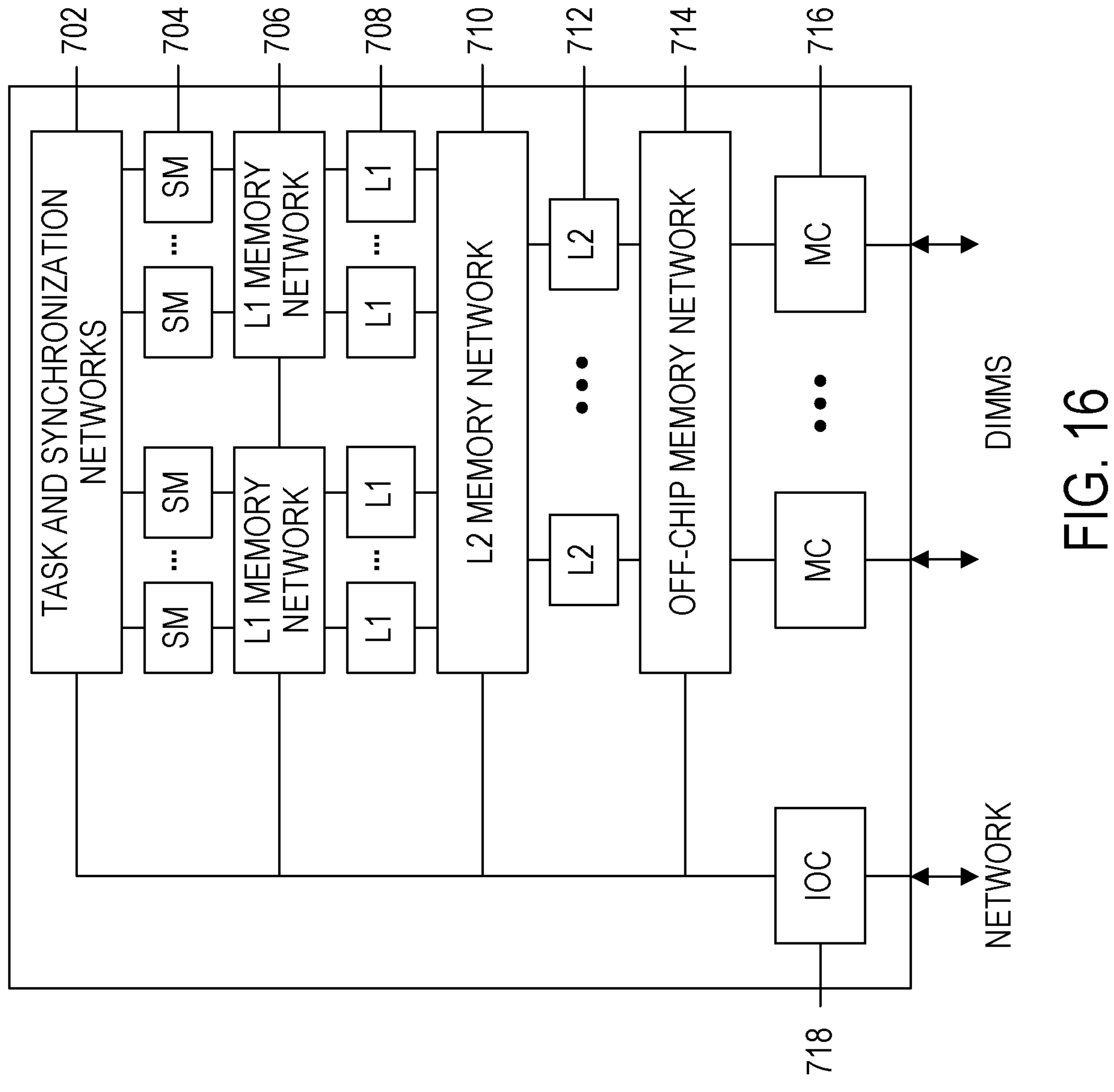
FIG. 16 illustrates a supercomputer at a chip level, in accordance with at least one embodiment.

FIG. 16 illustrates a supercomputer at a chip level, in accordance with at least one embodiment. In at least one embodiment, inside an FPGA or ASIC chip, main computation is performed within finite state machines (1604) called thread units. In at least one embodiment, FIG. 16 is to cause metrics data of one or more graphics processing units (GPUs) to be obtained from the one or more GPUs in an order from newest to oldest and/or otherwise perform operations described herein in connection with FIGS. 1-7. In at least one embodiment, task and synchronization networks (1602) connect finite state machines and are used to dispatch threads and execute operations in correct order. In at least one embodiment, a multi-level partitioned on-chip cache hierarchy (1608, 1612) is accessed using memory networks (1606, 1610). In at least one embodiment, off-chip memory is accessed using memory controllers (1616) and an off-chip memory network (1614). In at least one embodiment, I/O controller (1618) is used for cross-chip communication when a design does not fit in a single logic chip.

Figure 17:
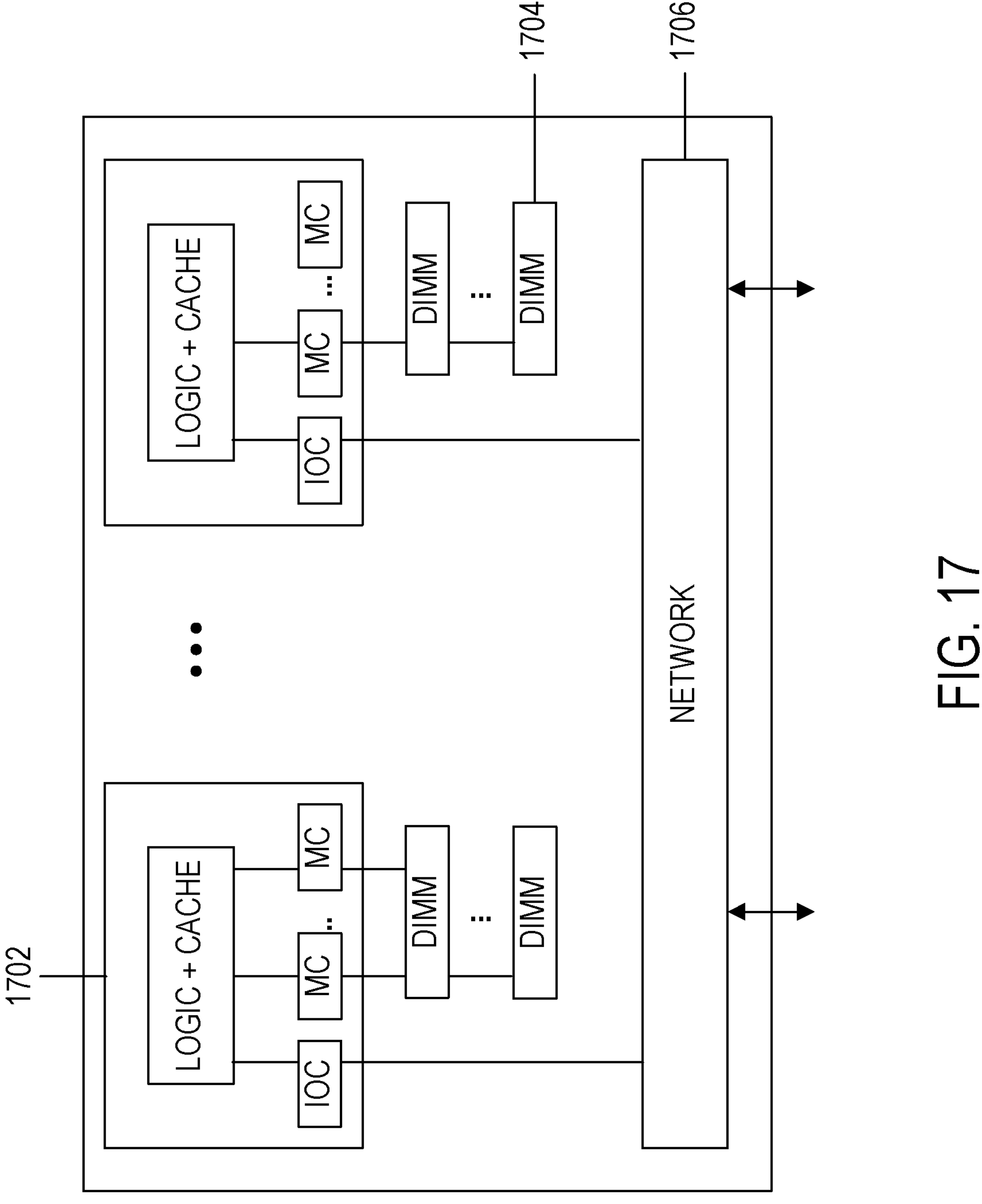
FIG. 17 illustrates a supercomputer at a rack module level, in accordance with at least one embodiment.

FIG. 17 illustrates a supercomputer at a rock module level, in accordance with at least one embodiment. In at least one embodiment, FIG. 17 is to cause metrics data of one or more graphics processing units (GPUs) to be obtained from the one or more GPUs in an order from newest to oldest and/or otherwise perform operations described herein in connection with FIGS. 1-7. In at least one embodiment, within a rack module, there are multiple FPGA or ASIC chips (1702) that are connected to one or more DRAM units (1704) which constitute main accelerator memory. In at least one embodiment, each FPGA/ASIC chip is connected to its neighbor FPGA/ASIC chip using wide busses on a board, with differential high speed signaling (1706). In at least one embodiment, each FPGA/ASIC chip is also connected to at least one high-speed serial communication cable.

Figure 18:
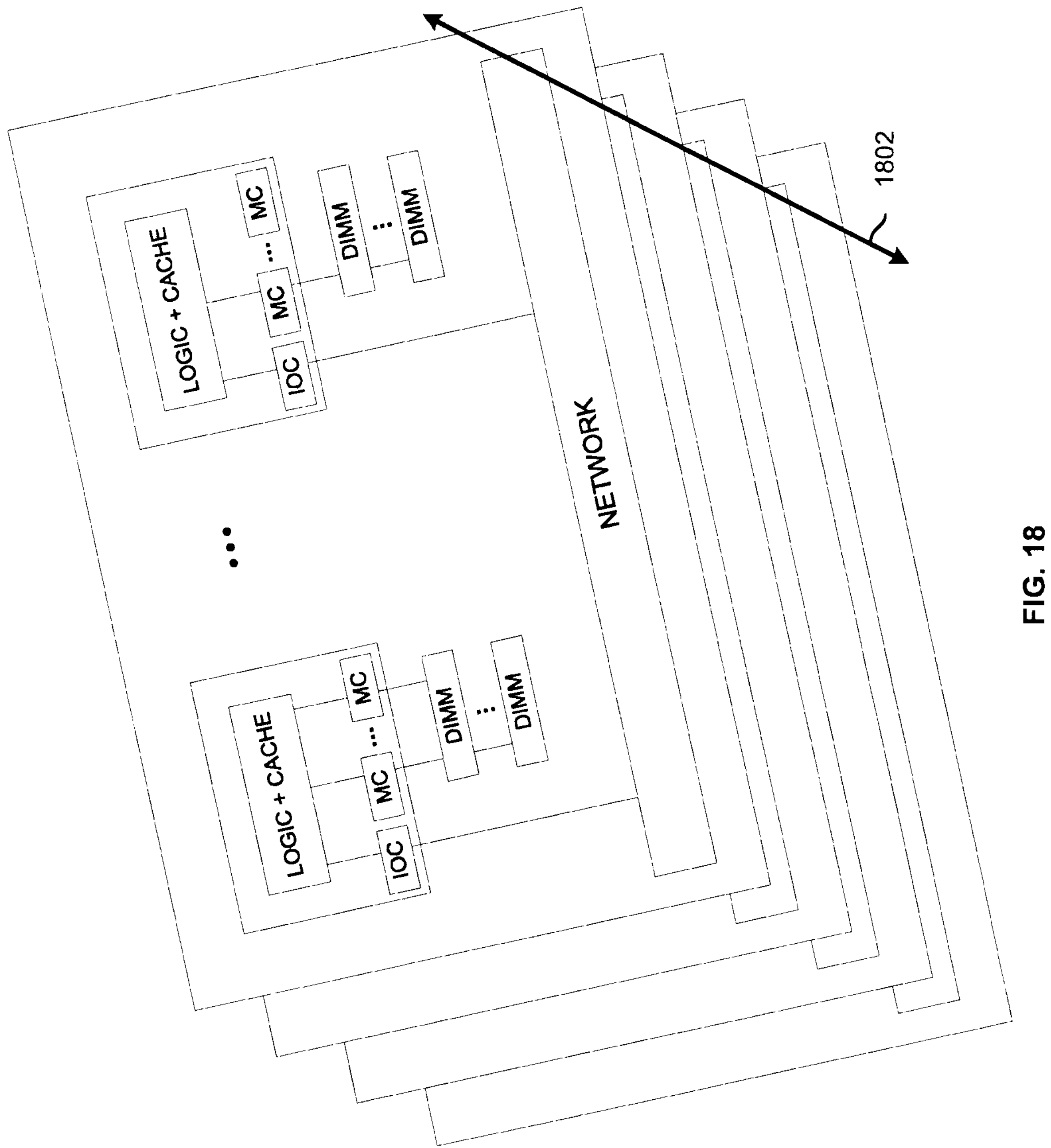
FIG. 18 illustrates a supercomputer at a rack level, in accordance with at least one embodiment.
Figure 19:
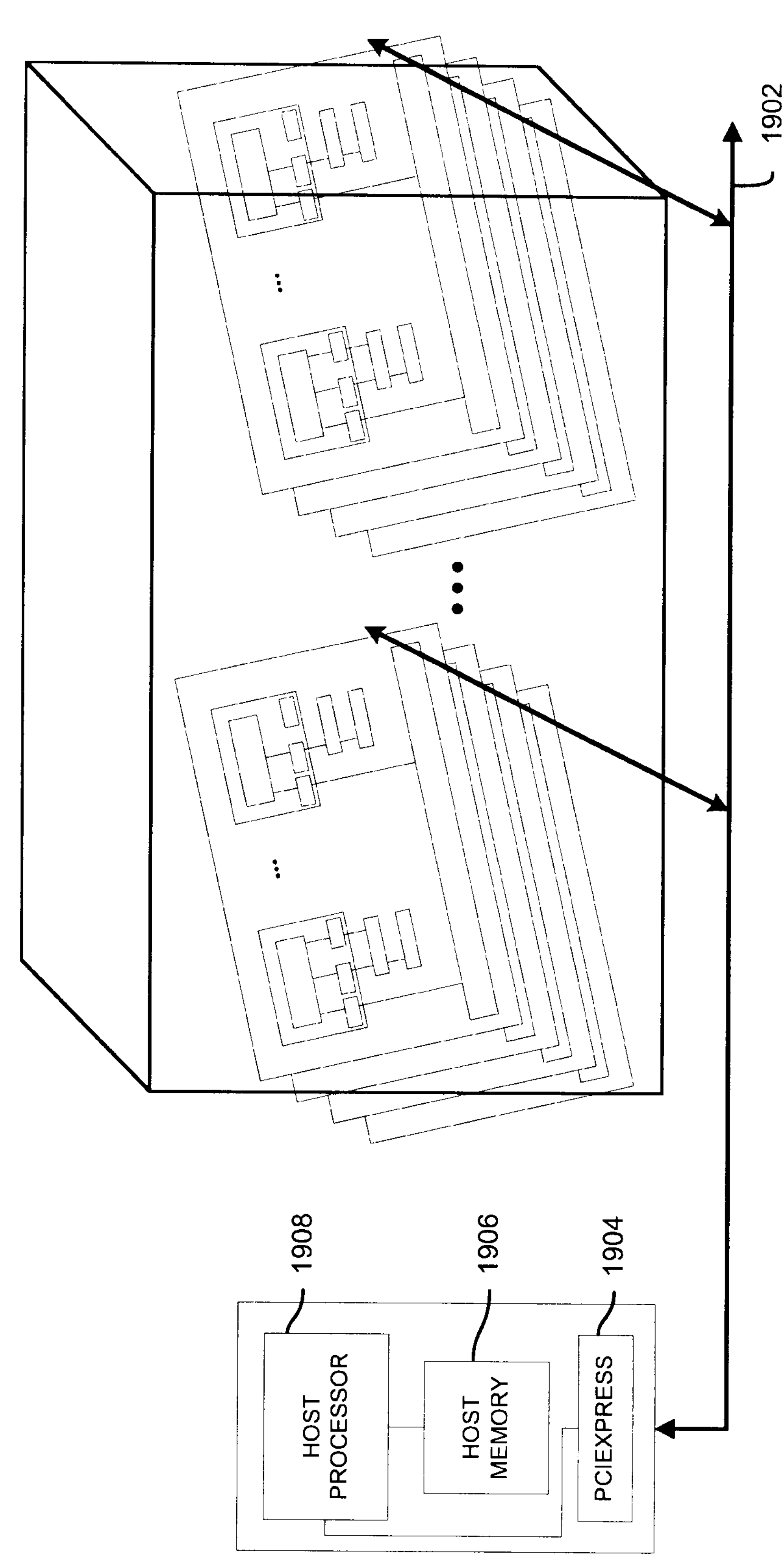
FIG. 19 illustrates a supercomputer at a whole system level, in accordance with at least one embodiment.

FIG. 18 illustrates a supercomputer at a rack level, in accordance with at least one embodiment. FIG. 19 illustrates a supercomputer at a whole system level, in accordance with at least one embodiment. In at least one embodiment, FIGS. 18 and 19 are to cause metrics data of one or more graphics processing units (GPUs) to be obtained from the one or more GPUs in an order from newest to oldest and/or otherwise perform operations described herein in connection with FIGS. 1-7. In at least one embodiment, referring to FIG. 18 and FIG. 19, between rack modules in a rack and across racks throughout an entire system, high-speed serial optical or copper cables (1802, 1902) are used to realize a scalable, possibly incomplete hypercube network. In at least one embodiment, one of FPGA/ASIC chips of an accelerator is connected to a host system through a PCI-Express connection (1904). In at least one embodiment, host system comprises a host microprocessor (1908) that a software part of an application runs on and a memory consisting of one or more host memory DRAM units (1906) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

Artificial Intelligence

The following figures set forth, without limitation, exemplary artificial intelligence-based systems that can be used to implement at least one embodiment.

Figure 20A:
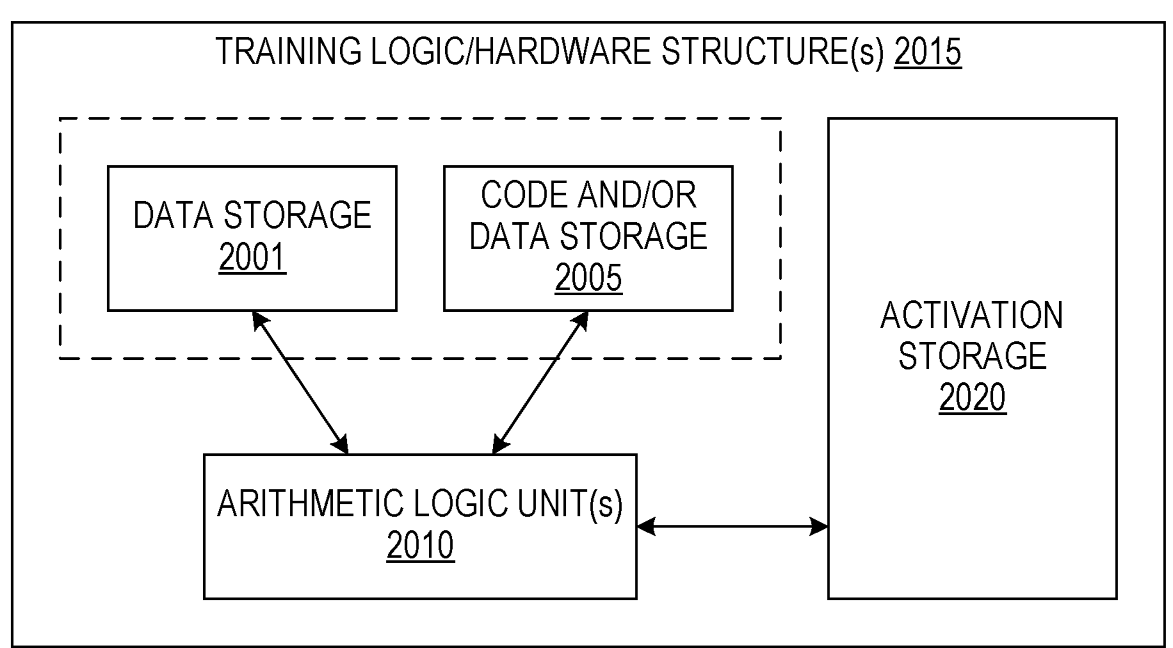
FIG. 20A illustrates inference and/or training logic, in accordance with at least one embodiment.
Figure 20B:
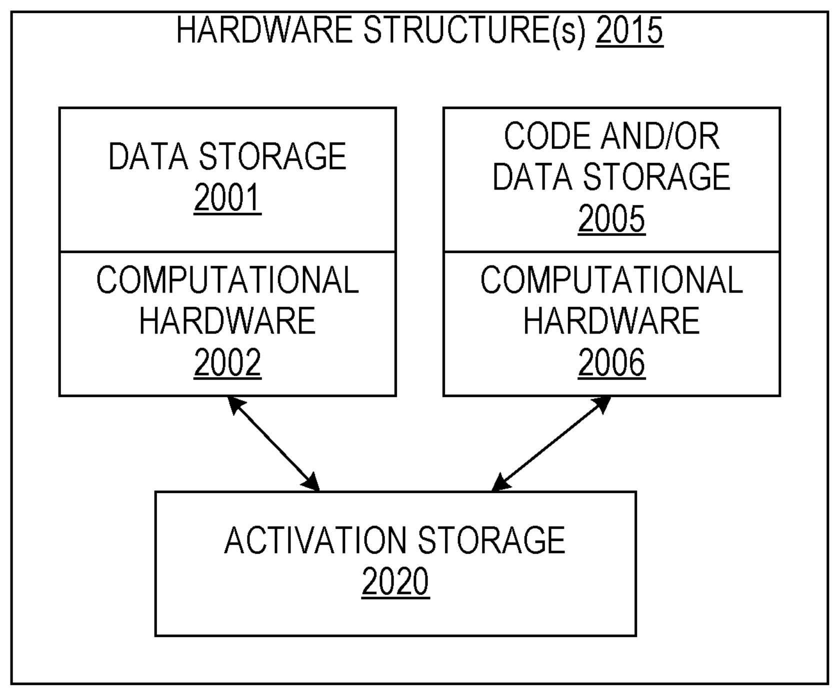
FIG. 20B illustrates inference and/or training logic, in accordance with at least one embodiment.

FIG. 20A illustrates inference and/or training logic 2015 used to perform inferencing and/or training operations associated with one or more embodiments. Details regarding inference and/or training logic 2015 are provided below in conjunction with FIGS. 20A and/or 20B. In at least one embodiment, FIGS. 20A and 20B are to cause metrics data of one or more graphics processing units (GPUs) to be obtained from the one or more GPUs in an order from newest to oldest and/or otherwise perform operations described herein in connection with FIGS. 1-7.

In at least one embodiment, inference and/or training logic 2015 may include, without limitation, code and/or data storage 2001 to store forward and/or output weight and/or input/output data, and/or other parameters to configure neurons or layers of a neural network trained and/or used for inferencing in aspects of one or more embodiments. In at least one embodiment, training logic 2015 may include, or be coupled to code and/or data storage 2001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2001 may be included with other on-chip or off-chip data storage, including a processor's L1, L2, or L3 cache or system memory.

In at least one embodiment, any portion of code and/or data storage 2001 may be internal or external to one or more processors or other hardware logic devices or circuits. In at least one embodiment, code and/or code and/or data storage 2001 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2001 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2015 may include, without limitation, a code and/or data storage 2005 to store backward and/or output weight and/or input/output data corresponding to neurons or layers of a neural network trained and/or used for inferencing in aspects of one or more embodiments. In at least one embodiment, code and/or data storage 2005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2015 may include, or be coupled to code and/or data storage 2005 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2005 may be included with other on-chip or off-chip data storage, including a processor's L1, L2, or L3 cache or system memory. In at least one embodiment, any portion of code and/or data storage 2005 may be internal or external to one or more processors or other hardware logic devices or circuits. In at least one embodiment, code and/or data storage 2005 may be cache memory, DRAM, SRAM, non-volatile memory (e.g., flash memory), or other storage. In at least one embodiment, a choice of whether code and/or data storage 2005 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2001 and code and/or data storage 2005 may be separate storage structures. In at least one embodiment, code and/or data storage 2001 and code and/or data storage 2005 may be a combined storage structure. In at least one embodiment, code and/or data storage 2001 and code and/or data storage 2005 may be partially combined and partially separate. In at least one embodiment, any portion of code and/or data storage 2001 and code and/or data storage 2005 may be included with other on-chip or off-chip data storage, including a processor's L1, L2, or L3 cache or system memory.

In at least one embodiment, inference and/or training logic 2015 may include, without limitation, one or more arithmetic logic unit(s) ("ALU(s)") 2010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2020 that are functions of input/output and/or weight parameter data stored in code and/or data storage 2001 and/or code and/or data storage 2005. In at least one embodiment, activations stored in activation storage 2020 are generated according to linear algebraic and or matrix-based mathematics performed by ALU(s) 2010 in response to performing instructions or other code, wherein weight values stored in code and/or data storage 2005 and/or data storage 2001 are used as operands along with other values, such as bias values, gradient information, momentum values, or other parameters or hyperparameters, any or all of which may be stored in code and/or data storage 2005 or code and/or data storage 2001 or another storage on or off-chip.

In at least one embodiment, ALU(s) 2010 are included within one or more processors or other hardware logic devices or circuits, whereas in another embodiment, ALU(s) 2010 may be external to a processor or other hardware logic device or circuit that uses them (e.g., a co-processor). In at least one embodiment, ALUs 2010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2001, code and/or data storage 2005, and activation storage 2020 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2020 may be cache memory, DRAM, SRAM, non-volatile memory (e.g., flash memory), or other storage. In at least one embodiment, activation storage 2020 may be completely or partially within or external to one or more processors or other logical circuits. In at least one embodiment, a choice of whether activation storage 2020 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2015 illustrated in FIG. 20A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2015 illustrated in FIG. 20A may be used in conjunction with central processing unit ("CPU") hardware, graphics processing unit ("GPU") hardware or other hardware, such as field programmable gate arrays ("FPGAs").

FIG. 20B illustrates inference and/or training logic 2015, according to at least one embodiment. In at least one embodiment, inference and/or training logic 2015 may include, without limitation, hardware logic in which computational resources are dedicated or otherwise exclusively used in conjunction with weight values or other information corresponding to one or more layers of neurons within a neural network. In at least one embodiment, inference and/or training logic 2015 illustrated in FIG. 20B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2015 illustrated in FIG. 20B may be used in conjunction with central processing unit (CPU) hardware, graphics processing unit (GPU) hardware or other hardware, such as field programmable gate arrays (FPGAs). In at least one embodiment, inference and/or training logic 2015 includes, without limitation, code and/or data storage 2001 and code and/or data storage 2005, which may be used to store code (e.g., graph code), weight values and/or other information, including bias values, gradient information, momentum values, and/or other parameter or hyperparameter information. In at least one embodiment illustrated in FIG. 20B, each of code and/or data storage 2001 and code and/or data storage 2005 is associated with a dedicated computational resource, such as computational hardware 2002 and computational hardware 2006, respectively. In at least one embodiment, each of computational hardware 2002 and computational hardware 2006 comprises one or more ALUs that perform mathematical functions, such as linear algebraic functions, only on information stored in code and/or data storage 2001 and code and/or data storage 2005, respectively, result of which is stored in activation storage 2020.

In at least one embodiment, each of code and/or data storage 2001 and 2005 and corresponding computational hardware 2002 and 2006, respectively, correspond to different layers of a neural network, such that resulting activation from one storage/computational pair 2001/2002 of code and/or data storage 2001 and computational hardware 2002 is provided as an input to a next storage/computational pair 2005/2006 of code and/or data storage 2005 and computational hardware 2006, in order to mirror a conceptual organization of a neural network. In at least one embodiment, each of storage/computational pairs 2001/2002 and 2005/2006 may correspond to more than one neural network layer. In at least one embodiment, additional storage/computation pairs (not shown) subsequent to or in parallel with storage/computation pairs 2001/2002 and 2005/2006 may be included in inference and/or training logic 2015.

Figure 21:
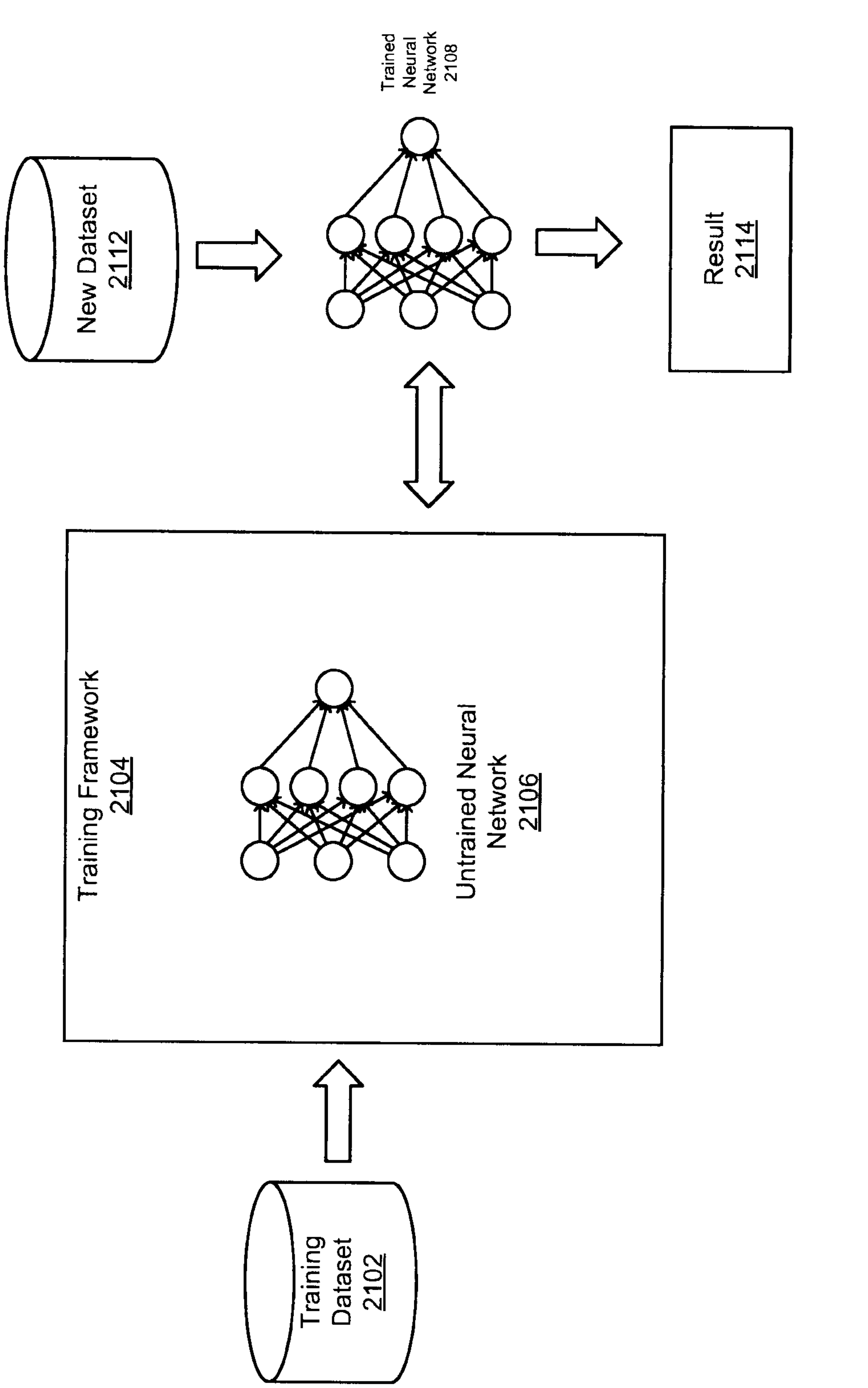
FIG. 21 illustrates training and deployment of a neural network, in accordance with at least one embodiment.

FIG. 21 illustrates training and deployment of a deep neural network, according to at least one embodiment. In at least one embodiment, FIG. 21 are to cause metrics data of one or more graphics processing units (GPUs) to be obtained from the one or more GPUs in an order from newest to oldest and/or otherwise perform operations described herein in connection with FIGS. 1-7. In at least one embodiment, untrained neural network 2106 is trained using a training dataset 2102. In at least one embodiment, training framework 2104 is a PyTorch framework, whereas in other embodiments, training framework 2104 is a TensorFlow, Boost, Caffe, Microsoft Cognitive Toolkit/CNTK, MXNet, Chainer, Keras, Deeplearning4j, or other training framework. In at least one embodiment, training framework 2104 trains an untrained neural network 2106 and enables it to be trained using processing resources described herein to generate a trained neural network 2108. In at least one embodiment, weights may be chosen randomly or by pre-training using a deep belief network. In at least one embodiment, training may be performed in either a supervised, partially supervised, or unsupervised manner.

In at least one embodiment, untrained neural network 2106 is trained using supervised learning, wherein training dataset 2102 includes an input paired with a desired output for an input, or where training dataset 2102 includes input having a known output and an output of neural network 2106 is manually graded. In at least one embodiment, untrained neural network 2106 is trained in a supervised manner and processes inputs from training dataset 2102 and compares resulting outputs against a set of expected or desired outputs. In at least one embodiment, errors are then propagated back through untrained neural network 2106. In at least one embodiment, training framework 2104 adjusts weights that control untrained neural network 2106. In at least one embodiment, training framework 2104 includes tools to monitor how well untrained neural network 2106 is converging towards a model, such as trained neural network 2108, suitable to generating correct answers, such as in result 2114, based on input data such as a new dataset 2112. In at least one embodiment, training framework 2104 trains untrained neural network 2106 repeatedly while adjust weights to refine an output of untrained neural network 2106 using a loss function and adjustment algorithm, such as stochastic gradient descent. In at least one embodiment, training framework 2104 trains untrained neural network 2106 until untrained neural network 2106 achieves a desired accuracy. In at least one embodiment, trained neural network 2108 can then be deployed to implement any number of machine learning operations.

In at least one embodiment, untrained neural network 2106 is trained using unsupervised learning, wherein untrained neural network 2106 attempts to train itself using unlabeled data. In at least one embodiment, unsupervised learning training dataset 2102 will include input data without any associated output data or "ground truth" data. In at least one embodiment, untrained neural network 2106 can learn groupings within training dataset 2102 and can determine how individual inputs are related to untrained dataset 2102. In at least one embodiment, unsupervised training can be used to generate a self-organizing map in trained neural network 2108 capable of performing operations useful in reducing dimensionality of new dataset 2112. In at least one embodiment, unsupervised training can also be used to perform anomaly detection, which allows identification of data points in new dataset 2112 that deviate from normal patterns of new dataset 2112.

In at least one embodiment, semi-supervised learning may be used, which is a technique in which in training dataset 2102 includes a mix of labeled and unlabeled data. In at least one embodiment, training framework 2104 may be used to perform incremental learning, such as through transferred learning techniques. In at least one embodiment, incremental learning enables trained neural network 2108 to adapt to new dataset 2112 without forgetting knowledge instilled within trained neural network 2108 during initial training.

5G Networks

The following figures set forth, without limitation, exemplary 5G network-based systems that can be used to implement at least one embodiment.

Figure 22:
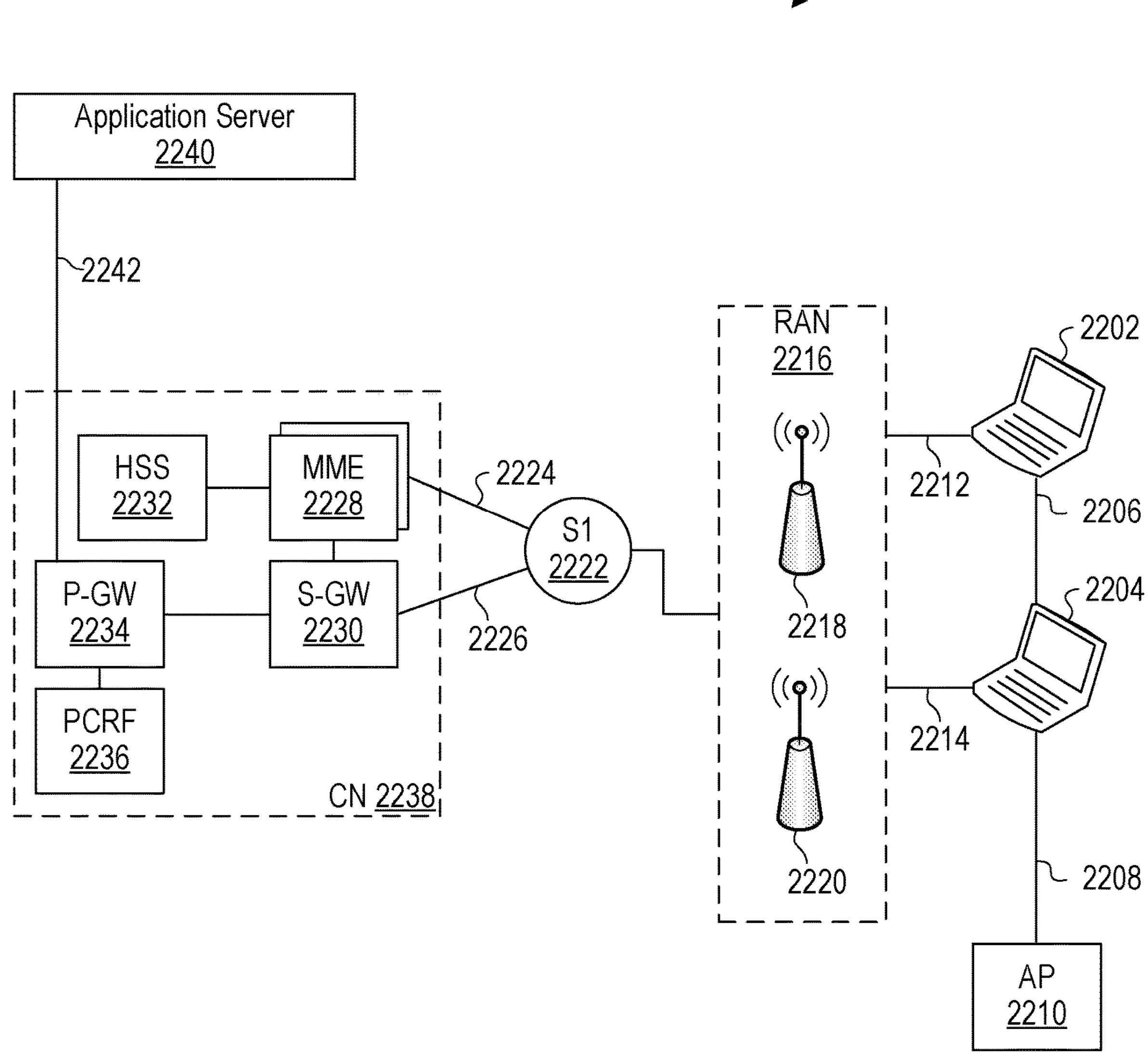
FIG. 22 illustrates an architecture of a system of a network, in accordance with at least one embodiment.

FIG. 22 illustrates an architecture of a system 2200 of a network, in accordance with at least one embodiment. In at least one embodiment, FIG. 22 is to cause metrics data of one or more graphics processing units (GPUs) to be obtained from the one or more GPUs in an order from newest to oldest and/or otherwise perform operations described herein in connection with FIGS. 1-7. In at least one embodiment, system 2200 is shown to include a user equipment (UE) 2202 and a UE 2204. In at least one embodiment, UEs 2202 and 2204 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 2202 and 2204 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2202 and 2204 may be configured to connect, e.g., communicatively couple, with a radio access network (RAN) 2216. In at least one embodiment, RAN 2216 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2202 and 2204 utilize connections 2212 and 2214, respectively, each of which comprises a physical communications interface or layer. In at least one embodiment, connections 2212 and 2214 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2202 and 2204 may further directly exchange communication data via a ProSe interface 2206. In at least one embodiment, ProSe interface 2206 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2204 is shown to be configured to access an access point (AP) 2210 via connection 2208. In at least one embodiment, connection 2208 can comprise a local wireless connection, such as a connection consistent with any IEEE 802.11 protocol, wherein AP 2210 would comprise a wireless fidelity (WiFi®) router. In at least one embodiment, AP 2210 is shown to be connected to an Internet without connecting to a core network of a wireless system.

In at least one embodiment, RAN 2216 can include one or more access nodes that enable connections 2212 and 2214. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 2216 may include one or more RAN nodes for providing macrocells, e.g., macro RAN node 2218, and one or more RAN nodes for providing femtocells or picocells (e.g., cells having smaller coverage areas, smaller user capacity, or higher bandwidth compared to macrocells), e.g., low power (LP) RAN node 2220.

In at least one embodiment, any of RAN nodes 2218 and 2220 can terminate an air interface protocol and can be a first point of contact for UEs 2202 and 2204. In at least one embodiment, any of RAN nodes 2218 and 2220 can fulfill various logical functions for RAN 2216 including, but not limited to, radio network controller (RNC) functions such as radio bearer management, uplink and downlink dynamic radio resource management and data packet scheduling, and mobility management.

In at least one embodiment, UEs 2202 and 2204 can be configured to communicate using Orthogonal Frequency-Division Multiplexing (OFDM) communication signals with each other or with any of RAN nodes 2218 and 2220 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 2218 and 2220 to UEs 2202 and 2204, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2202 and 2204. In at least one embodiment, a physical downlink control channel (PDCCH) may carry information about a transport format and resource allocations related to PDSCH channel, among other things. In at least one embodiment, it may also inform UEs 2202 and 2204 about a transport format, resource allocation, and HARQ (Hybrid Automatic Repeat Request) information related to an uplink shared channel. In at least one embodiment, typically, downlink scheduling (assigning control and shared channel resource blocks to UE 2202 within a cell) may be performed at any of RAN nodes 2218 and 2220 based on channel quality information fed back from any of UEs 2202 and 2204. In at least one embodiment, downlink resource assignment information may be sent on a PDCCH used for (e.g., assigned to) each of UEs 2202 and 2204.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2216 is shown to be communicatively coupled to a core network (CN) 2238 via an S1 interface 2222. In at least one embodiment, CN 2238 may be an evolved packet core (EPC) network, a NextGen Packet Core (NPC) network, or some other type of CN. In at least one embodiment, S1 interface 2222 is split into two parts: S1-U interface 2226, which carries traffic data between RAN nodes 2218 and 2220 and serving gateway (S-GW) 2230, and a S1-mobility management entity (MME) interface 2224, which is a signaling interface between RAN nodes 2218 and 2220 and MMEs 2228.

In at least one embodiment, CN 2238 comprises MMEs 2228, S-GW 2230, Packet Data Network (PDN) Gateway (P-GW) 2234, and a home subscriber server (HSS) 2232. In at least one embodiment, MMEs 2228 may be similar in function to a control plane of legacy Serving General Packet Radio Service (GPRS) Support Nodes (SGSN). In at least one embodiment, MMEs 2228 may manage mobility aspects in access such as gateway selection and tracking area list management. In at least one embodiment, HSS 2232 may comprise a database for network users, including subscription related information to support a network entities' handling of communication sessions. In at least one embodiment, CN 2238 may comprise one or several HSSs 2232, depending on a number of mobile subscribers, on a capacity of an equipment, on an organization of a network, etc. In at least one embodiment, HSS 2232 can provide support for routing/roaming, authentication, authorization, naming/addressing resolution, location dependencies, etc.

In at least one embodiment, S-GW 2230 may terminate a S1 interface 2222 towards RAN 2216, and routes data packets between RAN 2216 and CN 2238. In at least one embodiment, S-GW 2230 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2234 may terminate an SGi interface toward a PDN. In at least one embodiment, P-GW 2234 may route data packets between an EPC network 2238 and external networks such as a network including application server 2240 (alternatively referred to as application function (AF)) via an Internet Protocol (IP) interface 2242. In at least one embodiment, application server 2240 may be an element offering applications that use IP bearer resources with a core network (e.g., UMTS Packet Services (PS) domain, LTE PS data services, etc.). In at least one embodiment, P-GW 2234 is shown to be communicatively coupled to an application server 2240 via an IP communications interface 2242. In at least one embodiment, application server 2240 can also be configured to support one or more communication services (e.g., Voice-over-Internet Protocol (VoIP) sessions, PTT sessions, group communication sessions, social networking services, etc.) for UEs 2202 and 2204 via CN 2238.

In at least one embodiment, P-GW 2234 may further be a node for policy enforcement and charging data collection. In at least one embodiment, policy and Charging Enforcement Function (PCRF) 2236 is a policy and charging control element of CN 2238. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2236 may be communicatively coupled to application server 2240 via P-GW 2234. In at least one embodiment, application server 2240 may signal PCRF 2236 to indicate a new service flow and select an appropriate Quality of Service (QoS) and charging parameters. In at least one embodiment, PCRF 2236 may provision this rule into a Policy and Charging Enforcement Function (PCEF) (not shown) with an appropriate traffic flow template (TFT) and QoS class of identifier (QCI), which commences a QoS and charging as specified by application server 2240.

Figure 23:
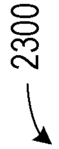
FIG. 23 illustrates an architecture of a system of a network, in accordance with at least one embodiment.
Figure 23:
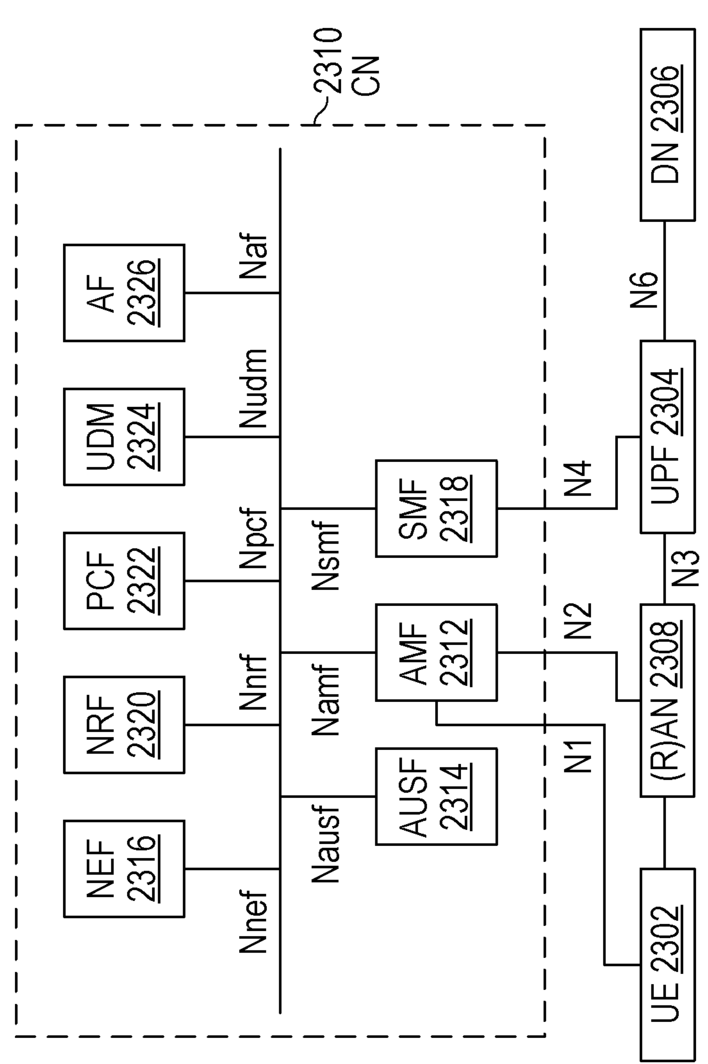

FIG. 23 illustrates an architecture of a system 2300 of a network in accordance with some embodiments. In at least one embodiment, FIG. 23 is to cause metrics data of one or more graphics processing units (GPUs) to be obtained from the one or more GPUs in an order from newest to oldest and/or otherwise perform operations described herein in connection with FIGS. 1-7. In at least one embodiment, system 2300 is shown to include a UE 2302, a 5G access node or RAN node (shown as (R)AN node 2308), a User Plane Function (shown as UPF 2304), a Data Network (DN 2306), which may be, for example, operator services, Internet access or 3rd party services, and a 5G Core Network (5GC) (shown as CN 2310).

In at least one embodiment, CN 2310 includes an Authentication Server Function (AUSF 2314); a Core Access and Mobility Management Function (AMF 2312); a Session Management Function (SMF 2318); a Network Exposure Function (NEF 2316); a Policy Control Function (PCF 2322); a Network Function (NF) Repository Function (NRF 2320); a Unified Data Management (UDM 2324); and an Application Function (AF 2326). In at least one embodiment, CN 2310 may also include other elements that are not shown, such as a Structured Data Storage network function (SDSF), an Unstructured Data Storage network function (UDSF), and variations thereof.

In at least one embodiment, UPF 2304 may act as an anchor point for intra-RAT and inter-RAT mobility, an external PDU session point of interconnect to DN 2306, and a branching point to support multi-homed PDU session. In at least one embodiment, UPF 2304 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2304 may include an uplink classifier to support routing traffic flows to a data network. In at least one embodiment, DN 2306 may represent various network operator services, Internet access, or third party services.

In at least one embodiment, AUSF 2314 may store data for authentication of UE 2302 and handle authentication related functionality. In at least one embodiment, AUSF 2314 may facilitate a common authentication framework for various access types.

In at least one embodiment, AMF 2312 may be responsible for registration management (e.g., for registering UE 2302, etc.), connection management, reachability management, mobility management, and lawful interception of AMF-related events, and access authentication and authorization. In at least one embodiment, AMF 2312 may provide transport for SM messages for SMF 2318, and act as a transparent proxy for routing SM messages. In at least one embodiment, AMF 2312 may also provide transport for short message service (SMS) messages between UE 2302 and an SMS function (SMSF) (not shown by FIG. 23). In at least one embodiment, AMF 2312 may act as Security Anchor Function (SEA), which may include interaction with AUSF 2314 and UE 2302 and receipt of an intermediate key that was established as a result of UE 2302 authentication process. In at least one embodiment, where USIM based authentication is used, AMF 2312 may retrieve security material from AUSF 2314. In at least one embodiment, AMF 2312 may also include a Security Context Management (SCM) function, which receives a key from SEA that it uses to derive access-network specific keys. In at least one embodiment, furthermore, AMF 2312 may be a termination point of RAN CP interface (N2 reference point), a termination point of NAS (NI) signaling, and perform NAS ciphering and integrity protection.

In at least one embodiment, AMF 2312 may also support NAS signaling with a UE 2302 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2302 and AMF 2312, and relay uplink and downlink user-plane packets between UE 2302 and UPF 2304. In at least one embodiment, N3IWF also provides mechanisms for IPsec tunnel establishment with UE 2302.

In at least one embodiment, SMF 2318 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2318 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2316 may provide means for securely exposing services and capabilities provided by 3GPP network functions for third party, internal exposure/re-exposure, Application Functions (e.g., AF 2326), edge computing or fog computing systems, etc. In at least one embodiment, NEF 2316 may authenticate, authorize, and/or throttle AFs. In at least one embodiment, NEF 2316 may also translate information exchanged with AF 2326 and information exchanged with internal network functions. In at least one embodiment, NEF 2316 may translate between an AF-Service-Identifier and an internal 5GC information. In at least one embodiment, NEF 2316 may also receive information from other network functions (NFs) based on exposed capabilities of other network functions. In at least one embodiment, this information may be stored at NEF 2316 as structured data, or at a data storage NF using a standardized interfaces. In at least one embodiment, stored information can then be re-exposed by NEF 2316 to other NFs and AFs, and/or used for other purposes such as analytics.

In at least one embodiment, NRF 2320 may support service discovery functions, receive NF Discovery Requests from NF instances, and provide information of discovered NF instances to NF instances. In at least one embodiment, NRF 2320 also maintains information of available NF instances and their supported services.

In at least one embodiment, PCF 2322 may provide policy rules to control plane function(s) to enforce them, and may also support unified policy framework to govern network behavior. In at least one embodiment, PCF 2322 may also implement a front end (FE) to access subscription information relevant for policy decisions in a UDR of UDM 2324.

In at least one embodiment, UDM 2324 may handle subscription-related information to support a network entities' handling of communication sessions, and may store subscription data of UE 2302. In at least one embodiment, UDM 2324 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2322. In at least one embodiment, UDM 2324 may also support SMS management, wherein an SMS-FE implements a similar application logic as discussed previously.

In at least one embodiment, AF 2326 may provide application influence on traffic routing, access to a Network Capability Exposure (NCE), and interact with a policy framework for policy control. In at least one embodiment, NCE may be a mechanism that allows a 5GC and AF 2326 to provide information to each other via NEF 2316, which may be used for edge computing implementations. In at least one embodiment, network operator and third party services may be hosted close to UE 2302 access point of attachment to achieve an efficient service delivery through a reduced end-to-end latency and load on a transport network. In at least one embodiment, for edge computing implementations, 5GC may select a UPF 2304 close to UE 2302 and execute traffic steering from UPF 2304 to DN 2306 via N6 interface. In at least one embodiment, this may be based on UE subscription data, UE location, and information provided by AF 2326. In at least one embodiment, AF 2326 may influence UPF (re)selection and traffic routing. In at least one embodiment, based on operator deployment, when AF 2326 is considered to be a trusted entity, a network operator may permit AF 2326 to interact directly with relevant NFs.

In at least one embodiment, CN 2310 may include an SMSF, which may be responsible for SMS subscription checking and verification, and relaying SM messages to/from UE 2302 to/from other entities, such as an SMS-GMSC/IWMSC/SMS-router. In at least one embodiment, SMS may also interact with AMF 2312 and UDM 2324 for notification procedure that UE 2302 is available for SMS transfer (e.g., set a UE not reachable flag, and notifying UDM 2324 when UE 2302 is available for SMS).

In at least one embodiment, system 2300 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2300 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2310 may include an Nx interface, which is an inter-CN interface between MME and AMF 2312 in order to enable interworking between CN 2310 and CN 7223.

In at least one embodiment, system 2300 may include multiple RAN nodes (such as (R)AN node 2308) wherein an Xn interface is defined between two or more (R)AN node 2308 (e.g., gNBs) that connecting to 5GC 410, between a (R)AN node 2308 (e.g., gNB) connecting to CN 2310 and an eNB (e.g., a macro RAN node), and/or between two eNBs connecting to CN 2310.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 2302 in a connected mode (e.g., CM-CONNECTED) including functionality to manage UE mobility for connected mode between one or more (R)AN node 2308. In at least one embodiment, mobility support may include context transfer from an old (source) serving (R)AN node 2308 to new (target) serving (R)AN node 2308; and control of user plane tunnels between old (source) serving (R)AN node 2308 to new (target) serving (R)AN node 2308.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

Figure 24:
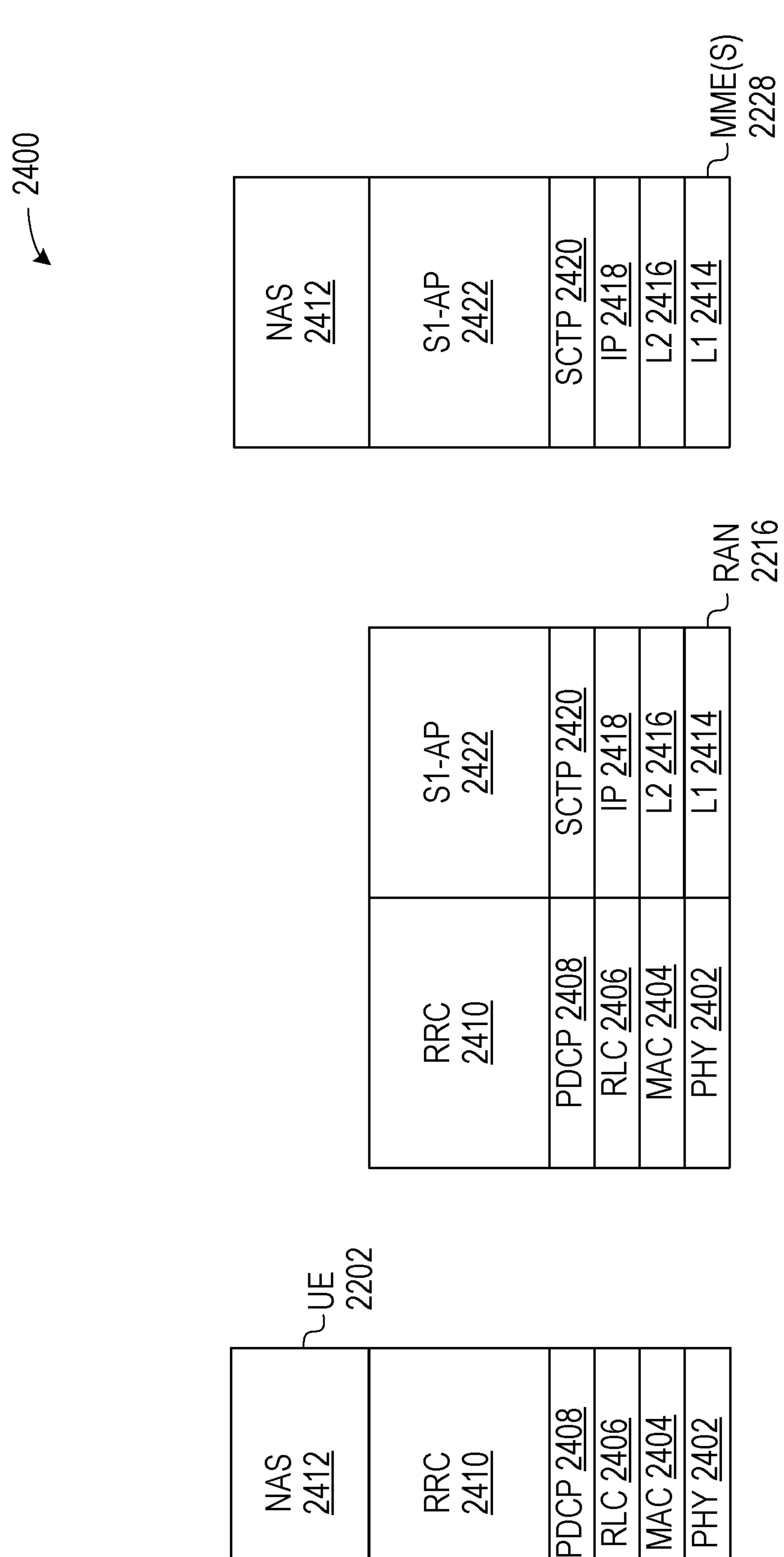
FIG. 24 illustrates a control plane protocol stack, in accordance with at least one embodiment.

FIG. 24 is an illustration of a control plane protocol stack in accordance with some embodiments. In at least one embodiment, FIG. 24 is to cause metrics data of one or more graphics processing units (GPUs) to be obtained from the one or more GPUs in an order from newest to oldest and/or otherwise perform operations described herein in connection with FIGS. 1-7. In at least one embodiment, a control plane 2400 is shown as a communications protocol stack between UE 2202 (or alternatively, UE 2204), RAN 2216, and MME(s) 2228.

In at least one embodiment, PHY layer 2402 may transmit or receive information used by MAC layer 2404 over one or more air interfaces. In at least one embodiment, PHY layer 2402 may further perform link adaptation or adaptive modulation and coding (AMC), power control, cell search (e.g., for initial synchronization and handover purposes), and other measurements used by higher layers, such as an RRC layer 2410. In at least one embodiment, PHY layer 2402 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 2404 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2406 may operate in a plurality of modes of operation, including: Transparent Mode (TM), Unacknowledged Mode (UM), and Acknowledged Mode (AM). In at least one embodiment, RLC layer 2406 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2406 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2408 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2410 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 2202 and RAN 2216 may utilize a Uu interface (e.g., an LTE-Uu interface) to exchange control plane data via a protocol stack comprising PHY layer 2402, MAC layer 2404, RLC layer 2406, PDCP layer 2408, and RRC layer 2410.

In at least one embodiment, non-access stratum (NAS) protocols (NAS protocols 2412) form a highest stratum of a control plane between UE 2202 and MME(s) 2228. In at least one embodiment, NAS protocols 2412 support mobility of UE 2202 and session management procedures to establish and maintain IP connectivity between UE 2202 and P-GW 2234.

In at least one embodiment, Si Application Protocol (S1-AP) layer (Si-AP layer 2422) may support functions of a Si interface and comprise Elementary Procedures (EPs). In at least one embodiment, an EP is a unit of interaction between RAN 2216 and CN 2228. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 2420) may ensure reliable delivery of signaling messages between RAN 2216 and MME(s) 2228 based, in part, on an IP protocol, supported by an IP layer 2418. In at least one embodiment, L2 layer 2416 and an L1 layer 2414 may refer to communication links (e.g., wired or wireless) used by a RAN node and MME to exchange information.

In at least one embodiment, RAN 2216 and MME(s) 2228 may utilize an S1-MME interface to exchange control plane data via a protocol stack comprising a L1 layer 2414, L2 layer 2416, IP layer 2418, SCTP layer 2420, and Si-AP layer 2422.

Figure 25:
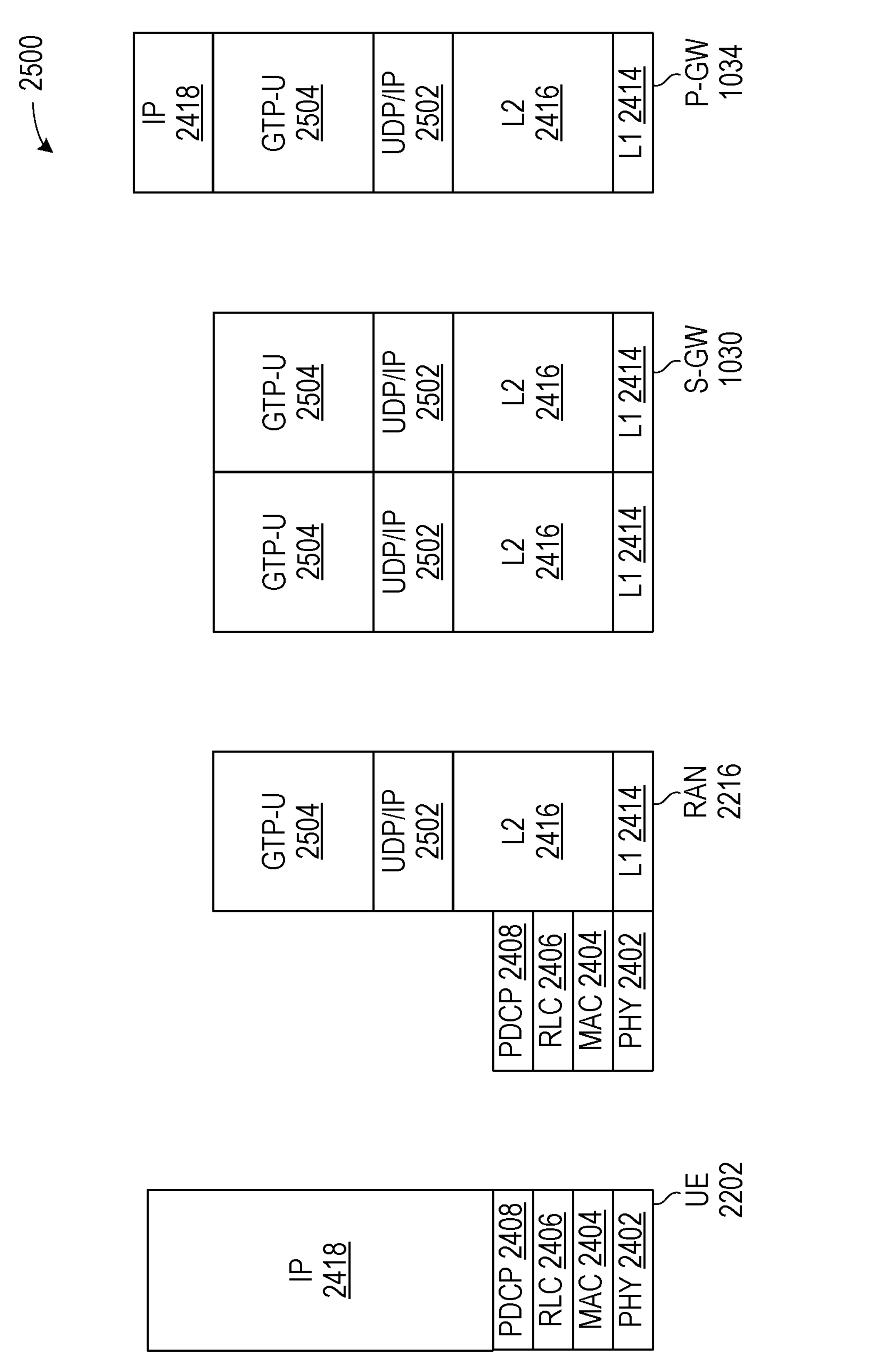
FIG. 25 illustrates a user plane protocol stack, in accordance with at least one embodiment.

FIG. 25 is an illustration of a user plane protocol stack in accordance with at least one embodiment. In at least one embodiment, FIG. 25 is to cause metrics data of one or more graphics processing units (GPUs) to be obtained from the one or more GPUs in an order from newest to oldest and/or otherwise perform operations described herein in connection with FIGS. 1-7. In at least one embodiment, a user plane 2500 is shown as a communications protocol stack between a UE 2202, RAN 2216, S-GW 2230, and P-GW 2234. In at least one embodiment, user plane 2500 may utilize a same protocol layers as control plane 2400. In at least one embodiment, for example, UE 2202 and RAN 2216 may utilize a Uu interface (e.g., an LTE-Uu interface) to exchange user plane data via a protocol stack comprising PHY layer 2402, MAC layer 2404, RLC layer 2406, PDCP layer 2408.

In at least one embodiment, General Packet Radio Service (GPRS) Tunneling Protocol for a user plane (GTP-U) layer (GTP-U layer 2504) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 2502) may provide checksums for data integrity, port numbers for addressing different functions at a source and destination, and encryption and authentication on selected data flows. In at least one embodiment, RAN 2216 and S-GW 2230 may utilize an S1-U interface to exchange user plane data via a protocol stack comprising L1 layer 2414, L2 layer 2416, UDP/IP layer 2502, and GTP-U layer 2504. In at least one embodiment, S-GW 2230 and P-GW 2234 may utilize an S5/S8a interface to exchange user plane data via a protocol stack comprising L1 layer 2414, L2 layer 2416, UDP/IP layer 2502, and GTP-U layer 2504. In at least one embodiment, as discussed above with respect to FIG. 24, NAS protocols support a mobility of UE 2202 and session management procedures to establish and maintain IP connectivity between UE 2202 and P-GW 2234.

Figure 26:
FIG. 26 illustrates components of a core network, in accordance with at least one embodiment.
Figure 26:
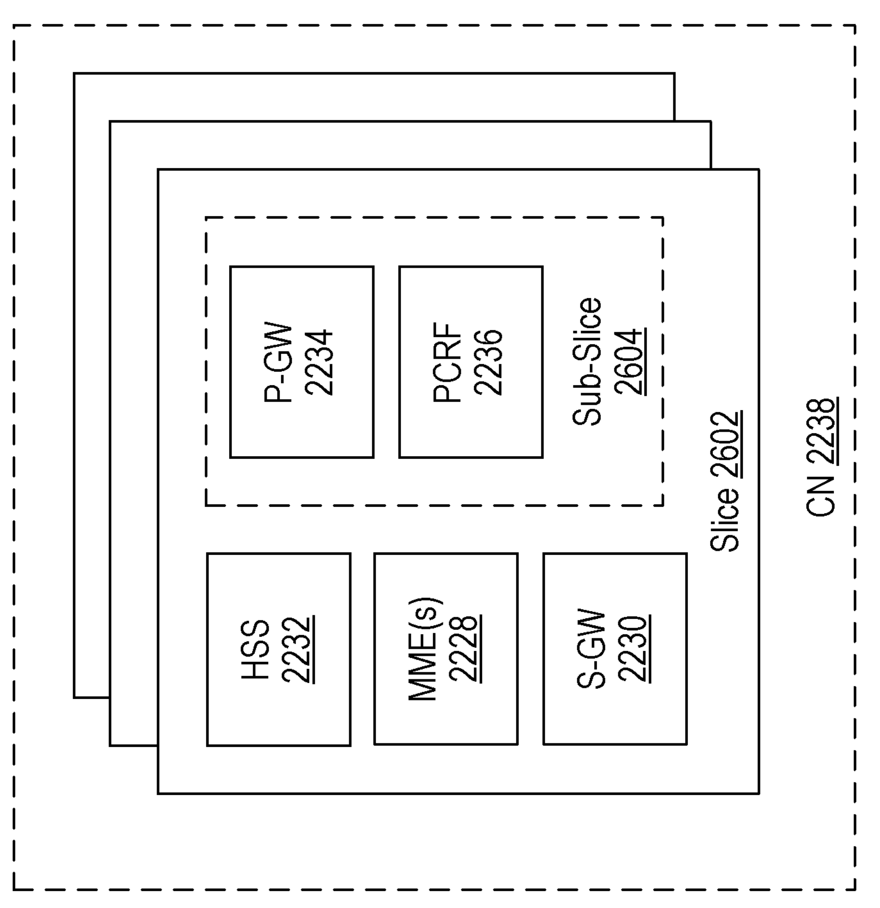

FIG. 26 illustrates components 2600 of a core network in accordance with at least one embodiment. In at least one embodiment, FIG. 26 is to cause metrics data of one or more graphics processing units (GPUs) to be obtained from the one or more GPUs in an order from newest to oldest and/or otherwise perform operations described herein in connection with FIGS. 1-7. In at least one embodiment, components of CN 2238 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2238 may be referred to as a network slice 2602 (e.g., network slice 2602 is shown to include HSS 2232, MME(s) 2228, and S-GW 2230). In at least one embodiment, a logical instantiation of a portion of CN 2238 may be referred to as a network sub-slice 2604 (e.g., network sub-slice 2604 is shown to include P-GW 2234 and PCRF 2236).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

Figure 27:
FIG. 27 illustrates components of a system to support network function virtualization (NFV), in accordance with at least one embodiment.
Figure 27:
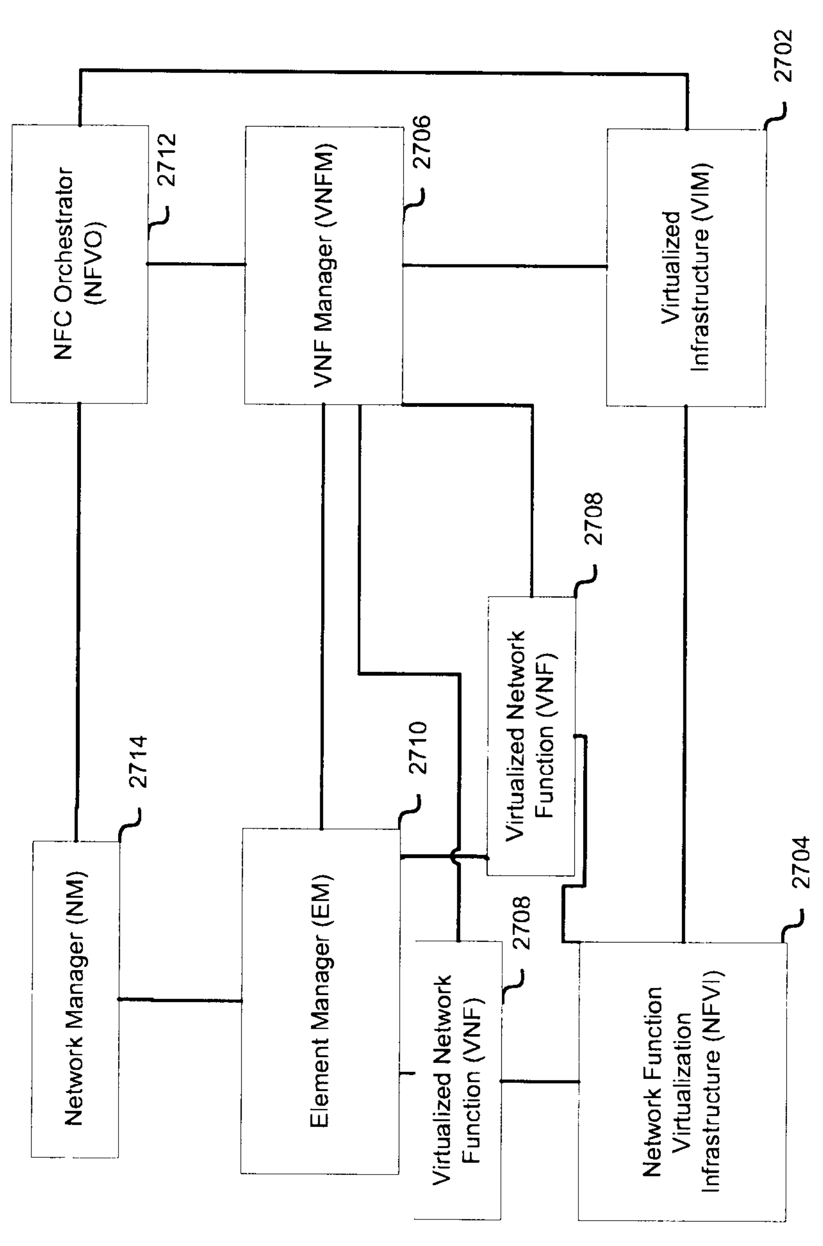

FIG. 27 is a block diagram illustrating components, according to at least one embodiment, of a system 2700 to support network function virtualization (NFV). In at least one embodiment, FIG. 27 is to cause metrics data of one or more graphics processing units (GPUs) to be obtained from the one or more GPUs in an order from newest to oldest and/or otherwise perform operations described herein in connection with FIGS. 1-7. In at least one embodiment, system 2700 is illustrated as including a virtualized infrastructure manager (shown as VIM 2702), a network function virtualization infrastructure (shown as NFVI 2704), a VNF manager (shown as VNFM 2706), virtualized network functions (shown as VNF 2708), an element manager (shown as EM 2710), an NFV Orchestrator (shown as NFVO 2712), and a network manager (shown as NM 2714).

In at least one embodiment, VIM 2702 manages resources of NFVI 2704. In at least one embodiment, NFVI 2704 can include physical or virtual resources and applications (including hypervisors) used to execute system 2700. In at least one embodiment, VIM 2702 may manage a life cycle of virtual resources with NFVI 2704 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 2706 may manage VNF 2708. In at least one embodiment, VNF 2708 may be used to execute EPC components/functions. In at least one embodiment, VNFM 2706 may manage a life cycle of VNF 2708 and track performance, fault and security of virtual aspects of VNF 2708. In at least one embodiment, EM 2710 may track performance, fault and security of functional aspects of VNF 2708. In at least one embodiment, tracking data from VNFM 2706 and EM 2710 may comprise, for example, performance measurement (PM) data used by VIM 2702 or NFVI 2704. In at least one embodiment, both VNFM 2706 and EM 2710 can scale up/down a quantity of VNFs of system 2700.

In at least one embodiment, NFVO 2712 may coordinate, authorize, release and engage resources of NFVI 2704 in order to provide a requested service (e.g., to execute an EPC function, component, or slice). In at least one embodiment, NM 2714 may provide a package of end-user functions with responsibility for a management of a network, which may include network elements with VNFs, non-virtualized network functions, or both (management of VNFs may occur via an EM 2710).

Computer-Based Systems

The following figures set forth, without limitation, exemplary computer-based systems that can be used to implement at least one embodiment.

Figure 28:
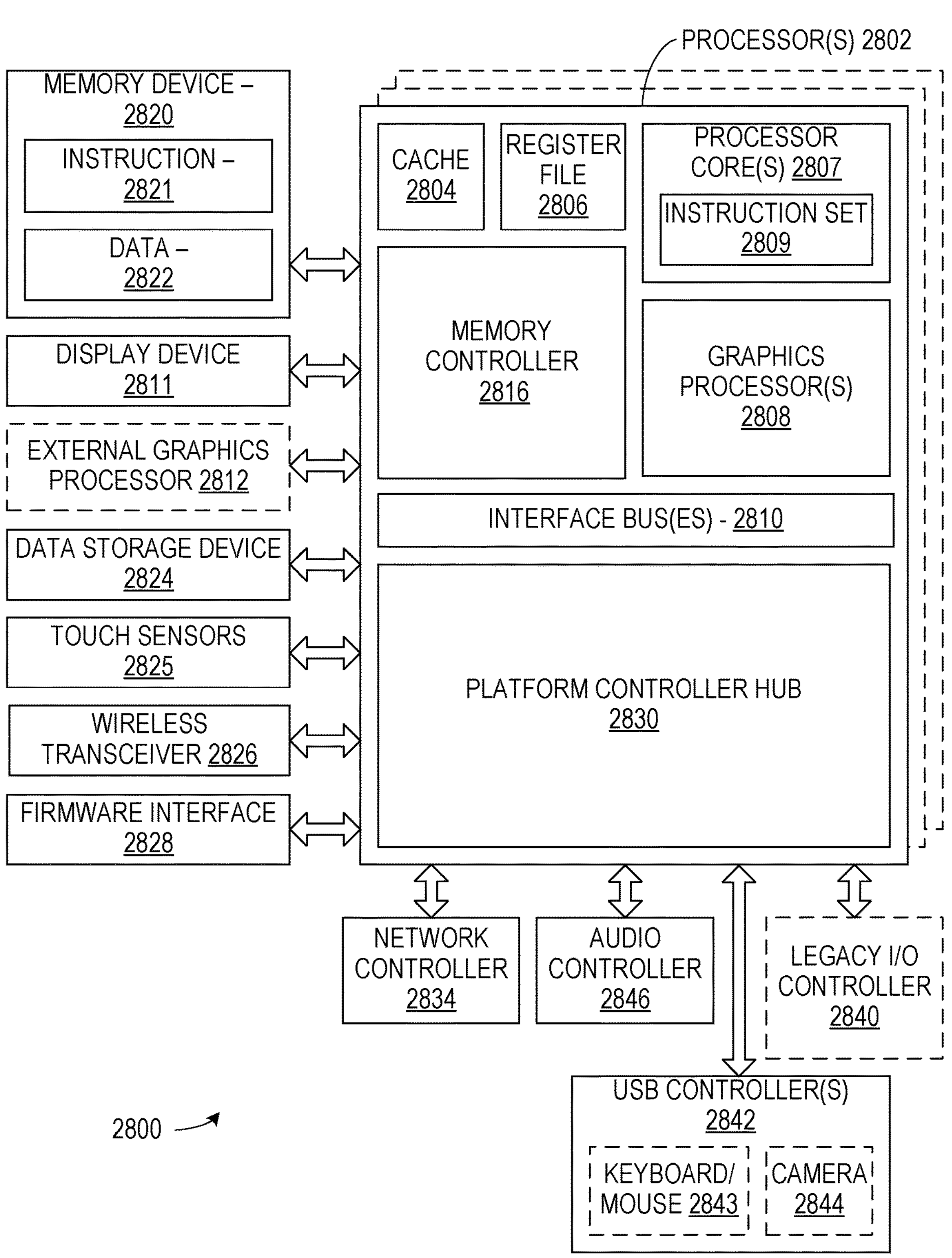
FIG. 28 illustrates a processing system, in accordance with at least one embodiment.

FIG. 28 illustrates a processing system 2800, in accordance with at least one embodiment. In at least one embodiment, FIG. 28 is to cause metrics data of one or more graphics processing units (GPUs) to be obtained from the one or more GPUs in an order from newest to oldest and/or otherwise perform operations described herein in connection with FIGS. 1-7. In at least one embodiment, processing system 2800 includes one or more processors 2802 and one or more graphics processors 2808, and may be a single processor desktop system, a multiprocessor workstation system, or a server system having a large number of processors 2802 or processor cores 2807. In at least one embodiment, processing system 2800 is a processing platform incorporated within a system-on-a-chip ("Sort") integrated circuit for use in mobile, handheld, or embedded devices.

In at least one embodiment, processing system 2800 can include, or be incorporated within a server-based gaming platform, a game console, a media console, a mobile gaming console, a handheld game console, or an online game console. In at least one embodiment, processing system 2800 is a mobile phone, smart phone, tablet computing device or mobile Internet device. In at least one embodiment, processing system 2800 can also include, couple with, or be integrated within a wearable device, such as a smart watch wearable device, smart eyewear device, augmented reality device, or virtual reality device. In at least one embodiment, processing system 2800 is a television or set top box device having one or more processors 2802 and a graphical interface generated by one or more graphics processors 2808.

In at least one embodiment, one or more processors 2802 each include one or more processor cores 2807 to process instructions which, when executed, perform operations for system and user software. In at least one embodiment, each of one or more processor cores 2807 is configured to process a specific instruction set 2809. In at least one embodiment, instruction set 2809 may facilitate Complex Instruction Set Computing ("CISC"), Reduced Instruction Set Computing ("RISC"), or computing via a Very Long Instruction Word ("VLIW"). In at least one embodiment, processor cores 2807 may each process a different instruction set 2809, which may include instructions to facilitate emulation of other instruction sets. In at least one embodiment, processor core 2807 may also include other processing devices, such as a digital signal processor ("DSP").

In at least one embodiment, processor 2802 includes cache memory ('cache") 2804. In at least one embodiment, processor 2802 can have a single internal cache or multiple levels of internal cache. In at least one embodiment, cache memory is shared among various components of processor 2802. In at least one embodiment, processor 2802 also uses an external cache (e.g., a Level 3 ("L3") cache or Last Level Cache ("LLC")) (not shown), which may be shared among processor cores 2807 using known cache coherency techniques. In at least one embodiment, register file 2806 is additionally included in processor 2802 which may include different types of registers for storing different types of data (e.g., integer registers, floating point registers, status registers, and an instruction pointer register). In at least one embodiment, register file 2806 may include general-purpose registers or other registers.

In at least one embodiment, one or more processor(s) 2802 are coupled with one or more interface bus(es) 2810 to transmit communication signals such as address, data, or control signals between processor 2802 and other components in processing system 2800. In at least one embodiment interface bus 2810, in one embodiment, can be a processor bus, such as a version of a Direct Media Interface ("DMI") bus. In at least one embodiment, interface bus 2810 is not limited to a DMI bus, and may include one or more Peripheral Component Interconnect buses (e.g., "PCI," PCI Express ("PCIe")), memory buses, or other types of interface buses. In at least one embodiment processor(s) 2802 include an integrated memory controller 2816 and a platform controller hub 2830. In at least one embodiment, memory controller 2816 facilitates communication between a memory device and other components of processing system 2800, while platform controller hub ("PCH") 2830 provides connections to Input/Output ("I/O") devices via a local I/O bus.

In at least one embodiment, memory device 2820 can be a dynamic random access memory ("DRAM") device, a static random access memory ("SRAM") device, flash memory device, phase-change memory device, or some other memory device having suitable performance to serve as processor memory. In at least one embodiment memory device 2820 can operate as system memory for processing system 2800, to store data 2822 and instructions 2821 for use when one or more processors 2802 executes an application or process. In at least one embodiment, memory controller 2816 also couples with an optional external graphics processor 2812, which may communicate with one or more graphics processors 2808 in processors 2802 to perform graphics and media operations. In at least one embodiment, a display device 2811 can connect to processor(s) 2802. In at least one embodiment display device 2811 can include one or more of an internal display device, as in a mobile electronic device or a laptop device or an external display device attached via a display interface (e.g., DisplayPort, etc.). In at least one embodiment, display device 2811 can include a head mounted display ("HMD") such as a stereoscopic display device for use in virtual reality ("VR") applications or augmented reality ("AR") applications.

In at least one embodiment, platform controller hub 2830 enables peripherals to connect to memory device 2820 and processor 2802 via a high-speed I/O bus. In at least one embodiment, I/O peripherals include, but are not limited to, an audio controller 2846, a network controller 2834, a firmware interface 2828, a wireless transceiver 2826, touch sensors 2825, a data storage device 2824 (e.g., hard disk drive, flash memory, etc.). In at least one embodiment, data storage device 2824 can connect via a storage interface (e.g., SATA) or via a peripheral bus, such as PCI, or PCIe. In at least one embodiment, touch sensors 2825 can include touch screen sensors, pressure sensors, or fingerprint sensors. In at least one embodiment, wireless transceiver 2826 can be a Wi-Fi transceiver, a Bluetooth transceiver, or a mobile network transceiver such as a 3G, 4G, or Long Term Evolution ("LTE") transceiver. In at least one embodiment, firmware interface 2828 enables communication with system firmware, and can be, for example, a unified extensible firmware interface ("UEFI"). In at least one embodiment, network controller 2834 can enable a network connection to a wired network. In at least one embodiment, a high-performance network controller (not shown) couples with interface bus 2810. In at least one embodiment, audio controller 2846 is a multi-channel high definition audio controller. In at least one embodiment, processing system 2800 includes an optional legacy I/O controller 2840 for coupling legacy (e.g., Personal System 2 ("PS/2")) devices to processing system 2800. In at least one embodiment, platform controller hub 2830 can also connect to one or more Universal Serial Bus ("USB") controllers 2842 connect input devices, such as keyboard and mouse 2843 combinations, a camera 2844, or other USB input devices.

In at least one embodiment, an instance of memory controller 2816 and platform controller hub 2830 may be integrated into a discreet external graphics processor, such as external graphics processor 2812. In at least one embodiment, platform controller hub 2830 and/or memory controller 2816 may be external to one or more processor(s) 2802. For example, in at least one embodiment, processing system 2800 can include an external memory controller 2816 and platform controller hub 2830, which may be configured as a memory controller hub and peripheral controller hub within a system chipset that is in communication with processor(s) 2802.

Figure 29:
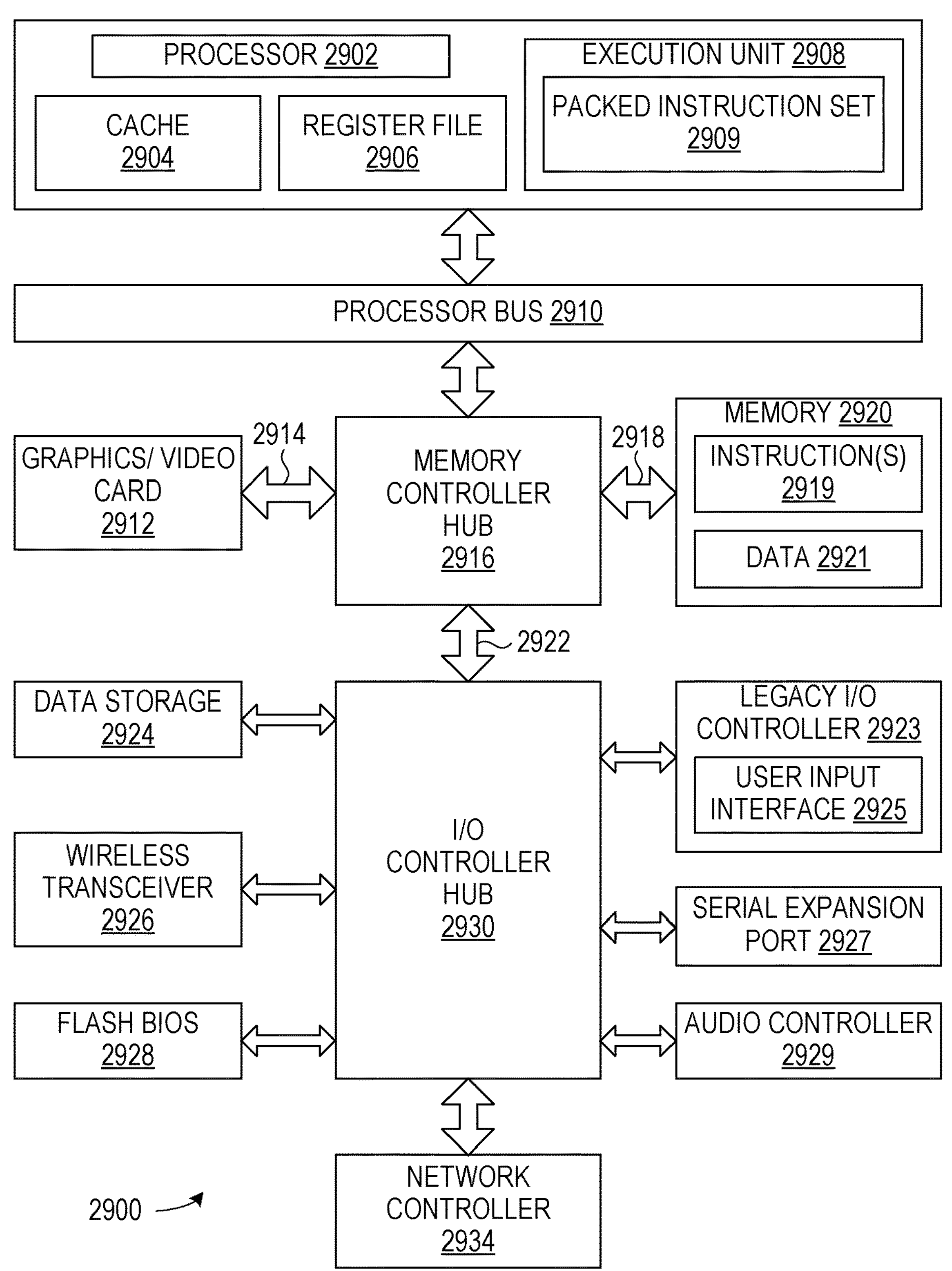
FIG. 29 illustrates a computer system, in accordance with at least one embodiment.

FIG. 29 illustrates a computer system 2900, in accordance with at least one embodiment. In at least one embodiment, FIG. 29 is to cause metrics data of one or more graphics processing units (GPUs) to be obtained from the one or more GPUs in an order from newest to oldest and/or otherwise perform operations described herein in connection with FIGS. 1-7. In at least one embodiment, computer system 2900 may be a system with interconnected devices and components, an SOC, or some combination. In at least on embodiment, computer system 2900 is formed with a processor 2902 that may include execution units to execute an instruction. In at least one embodiment, computer system 2900 may include, without limitation, a component, such as processor 2902 to employ execution units including logic to perform algorithms for processing data. In at least one embodiment, computer system 2900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 2900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 2900 may include, without limitation, processor 2902 that may include, without limitation, one or more execution units 2908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 2900 is a single processor desktop or server system. In at least one embodiment, computer system 2900 may be a multiprocessor system. In at least one embodiment, processor 2902 may include, without limitation, a CISC microprocessor, a RISC microprocessor, a VLIW microprocessor, a processor implementing a combination of instruction sets, or any other processor device, such as a digital signal processor, for example. In at least one embodiment, processor 2902 may be coupled to a processor bus 2910 that may transmit data signals between processor 2902 and other components in computer system 2900.

In at least one embodiment, processor 2902 may include, without limitation, a Level 1 ("L1") internal cache memory ("cache") 2904. In at least one embodiment, processor 2902 may have a single internal cache or multiple levels of internal cache. In at least one embodiment, cache memory may reside external to processor 2902. In at least one embodiment, processor 2902 may also include a combination of both internal and external caches. In at least one embodiment, a register file 2906 may store different types of data in various registers including, without limitation, integer registers, floating point registers, status registers, and instruction pointer register.

In at least one embodiment, execution unit 2908, including, without limitation, logic to perform integer and floating point operations, also resides in processor 2902. Processor 2902 may also include a microcode ("ucode") read only memory ("ROM") that stores microcode for certain macro instructions. In at least one embodiment, execution unit 2908 may include logic to handle a packed instruction set 2909. In at least one embodiment, by including packed instruction set 2909 in an instruction set of a general-purpose processor 2902, along with associated circuitry to execute instructions, operations used by many multimedia applications may be performed using packed data in a general-purpose processor 2902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 2908 may also be used in microcontrollers, embedded processors, graphics devices, DSPs, and other types of logic circuits. In at least one embodiment, computer system 2900 may include, without limitation, a memory 2920. In at least one embodiment, memory 2920 may be implemented as a DRAM device, an SRAM device, flash memory device, or other memory device. Memory 2920 may store instruction(s) 2919 and/or data 2921 represented by data signals that may be executed by processor 2902.

In at least one embodiment, a system logic chip may be coupled to processor bus 2910 and memory 2920. In at least one embodiment, a system logic chip may include, without limitation, a memory controller hub ("MCH") 2916, and processor 2902 may communicate with MCH 2916 via processor bus 2910. In at least one embodiment, MCH 2916 may provide a high bandwidth memory path 2918 to memory 2920 for instruction and data storage and for storage of graphics commands, data and textures. In at least one embodiment, MCH 2916 may direct data signals between processor 2902, memory 2920, and other components in computer system 2900 and to bridge data signals between processor bus 2910, memory 2920, and a system I/O 2922. In at least one embodiment, system logic chip may provide a graphics port for coupling to a graphics controller. In at least one embodiment, MCH 2916 may be coupled to memory 2920 through high bandwidth memory path 2918 and graphics/video card 2912 may be coupled to MCH 2916 through an Accelerated Graphics Port ("AGP") interconnect 2914.

In at least one embodiment, computer system 2900 may use system I/O 2922 that is a proprietary hub interface bus to couple MCH 2916 to I/O controller hub ("ICH") 2930. In at least one embodiment, ICH 2930 may provide direct connections to some I/O devices via a local I/O bus. In at least one embodiment, local I/O bus may include, without limitation, a high-speed I/O bus for connecting peripherals to memory 2920, a chipset, and processor 2902. Examples may include, without limitation, an audio controller 2929, a firmware hub ("flash BIOS") 2928, a wireless transceiver 2926, a data storage 2924, a legacy I/O controller 2923 containing a user input interface 2925 and a keyboard interface, a serial expansion port 2927, such as a USB, and a network controller 2934. Data storage 2924 may comprise a hard disk drive, a floppy disk drive, a CD-ROM device, a flash memory device, or other mass storage device.

In at least one embodiment, FIG. 29 illustrates a system, which includes interconnected hardware devices or "chips."

In at least one embodiment, FIG. 29 may illustrate an exemplary SoC. In at least one embodiment, devices illustrated in FIG. 29 may be interconnected with proprietary interconnects, standardized interconnects (e.g., PCIe), or some combination thereof. In at least one embodiment, one or more components of system 2900 are interconnected using compute express link ("CXL") interconnects.

Figure 30:
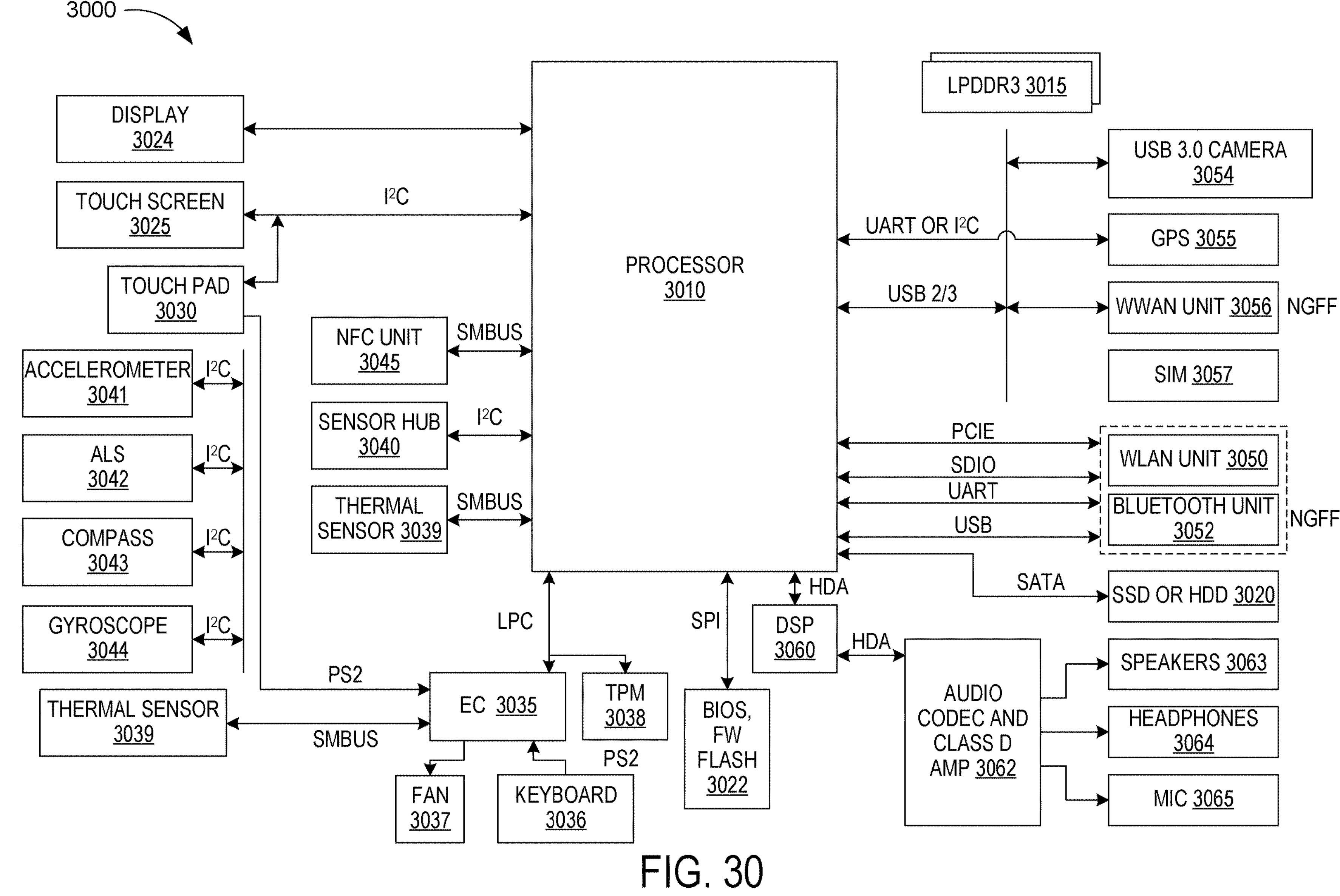
FIG. 30 illustrates a system, in accordance with at least one embodiment.

FIG. 30 illustrates a system 3000, in accordance with at least one embodiment. In at least one embodiment, FIG. 30 is to cause metrics data of one or more graphics processing units (GPUs) to be obtained from the one or more GPUs in an order from newest to oldest and/or otherwise perform operations described herein in connection with FIGS. 1-7. In at least one embodiment, system 3000 is an electronic device that utilizes a processor 3010. In at least one embodiment, system 3000 may be, for example and without limitation, a notebook, a tower server, a rack server, a blade server, a laptop, a desktop, a tablet, a mobile device, a phone, an embedded computer, or any other suitable electronic device.

In at least one embodiment, system 3000 may include, without limitation, processor 3010 communicatively coupled to any suitable number or kind of components, peripherals, modules, or devices. In at least one embodiment, processor 3010 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 30 illustrates a system which includes interconnected hardware devices or "chips." In at least one embodiment, FIG. 30 may illustrate an exemplary SoC. In at least one embodiment, devices illustrated in FIG. 30 may be interconnected with proprietary interconnects, standardized interconnects (e.g., PCIe) or some combination thereof. In at least one embodiment, one or more components of FIG. 30 are interconnected using CXL interconnects.

In at least one embodiment, FIG. 30 may include a display 3024, a touch screen 3025, a touch pad 3030, a Near Field Communications unit ("NFC") 3045, a sensor hub 3040, a thermal sensor 3046, an Express Chipset ("EC") 3035, a Trusted Platform Module ("TPM") 3038, BIOS/firmware/flash memory ("BIOS, FW Flash") 3022, a DSP 3060, a Solid State Disk ("SSD") or Hard Disk Drive ("HDD") 3020, a wireless local area network unit ("WLAN") 3050, a Bluetooth unit 3052, a Wireless Wide Area Network unit ("WWAN") 3056, a Global Positioning System ("GPS") 3055, a camera ("USB 3.0 camera") 3054 such as a USB 3.0 camera, or a Low Power Double Data Rate ("LPDDR") memory unit ("LPDDR3") 3015 implemented in, for example, LPDDR3 standard. These components may each be implemented in any suitable manner.

In at least one embodiment, other components may be communicatively coupled to processor 3010 through components discussed above. In at least one embodiment, an accelerometer 3041, an Ambient Light Sensor ("ALS") 3042, a compass 3043, and a gyroscope 3044 may be communicatively coupled to sensor hub 3040. In at least one embodiment, a thermal sensor 3039, a fan 3037, a keyboard 3046, and a touch pad 3030 may be communicatively coupled to EC 3035. In at least one embodiment, a speaker 3063, a headphones 3064, and a microphone ("mic") 3065 may be communicatively coupled to an audio unit ("audio codec and class d amp") 3064, which may in turn be communicatively coupled to DSP 3060. In at least one embodiment, audio unit 3064 may include, for example and without limitation, an audio coder/decoder ("codec") and a class D amplifier. In at least one embodiment, a SIM card ("SIM") 3057 may be communicatively coupled to WWAN unit 3056. In at least one embodiment, components such as WLAN unit 3050 and Bluetooth unit 3052, as well as WWAN unit 3056 may be implemented in a Next Generation Form Factor ("NGFF").

Figure 31:
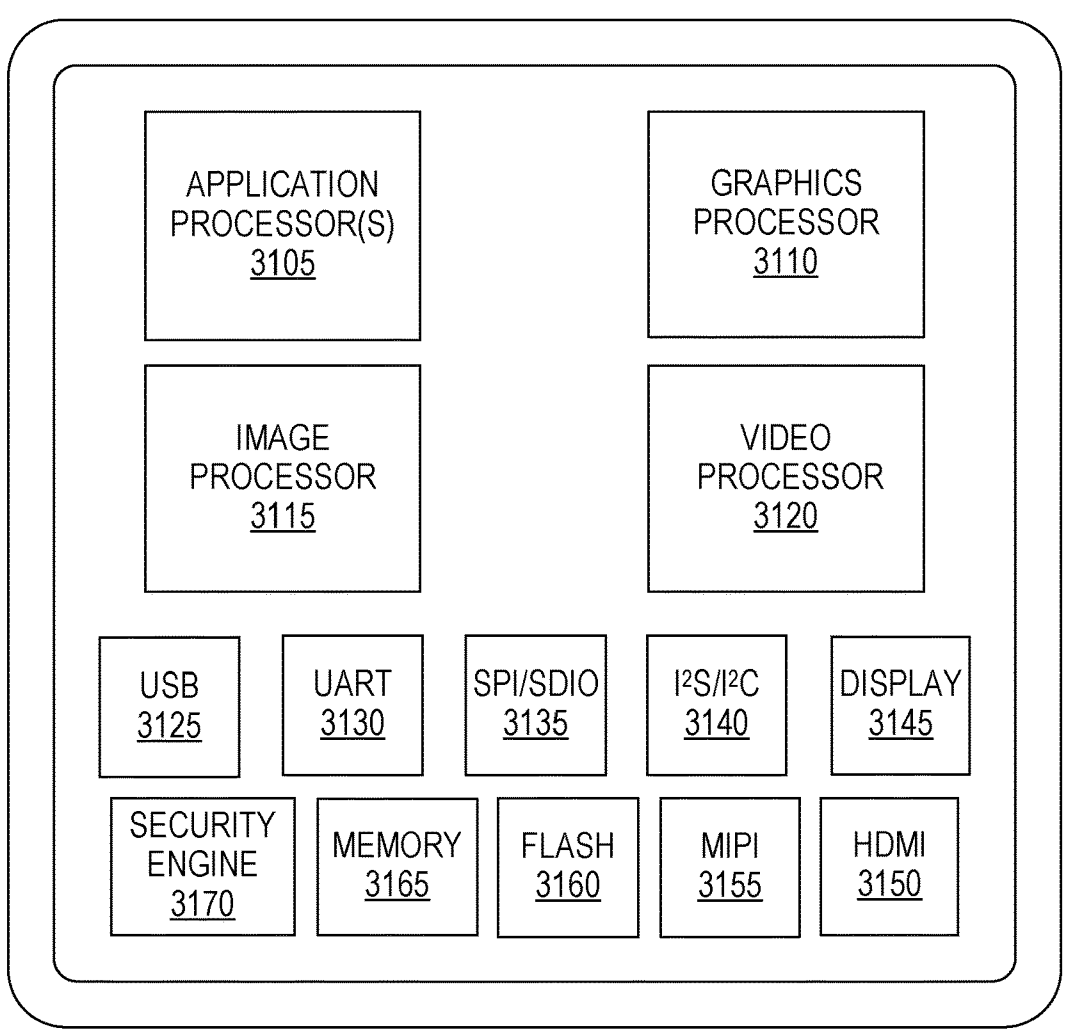
FIG. 31 illustrates an exemplary integrated circuit, in accordance with at least one embodiment.

FIG. 31 illustrates an exemplary integrated circuit 3100, in accordance with at least one embodiment. In at least one embodiment, FIG. 31 is to cause metrics data of one or more graphics processing units (GPUs) to be obtained from the one or more GPUs in an order from newest to oldest and/or otherwise perform operations described herein in connection with FIGS. 1-7. In at least one embodiment, exemplary integrated circuit 3100 is an SoC that may be fabricated using one or more IP cores. In at least one embodiment, integrated circuit 3100 includes one or more application processor(s) 3105 (e.g., CPUs), at least one graphics processor 3110, and may additionally include an image processor 3115 and/or a video processor 3120, any of which may be a modular IP core. In at least one embodiment, integrated circuit 3100 includes peripheral or bus logic including a USB controller 3125, a UART controller 3130, an SPI/SDIO controller 3135, and an $I^2S/I^2C$ controller 3140. In at least one embodiment, integrated circuit 3100 can include a display device 3145 coupled to one or more of a high-definition multimedia interface ("HDMI") controller 3150 and a mobile industry processor interface ("MIPI") display interface 3155. In at least one embodiment, storage may be provided by a flash memory subsystem 3160 including flash memory and a flash memory controller. In at least one embodiment, a memory interface may be provided via a memory controller 3165 for access to SDRAM or SRAM memory devices. In at least one embodiment, some integrated circuits additionally include an embedded security engine 3170.

Figure 32:
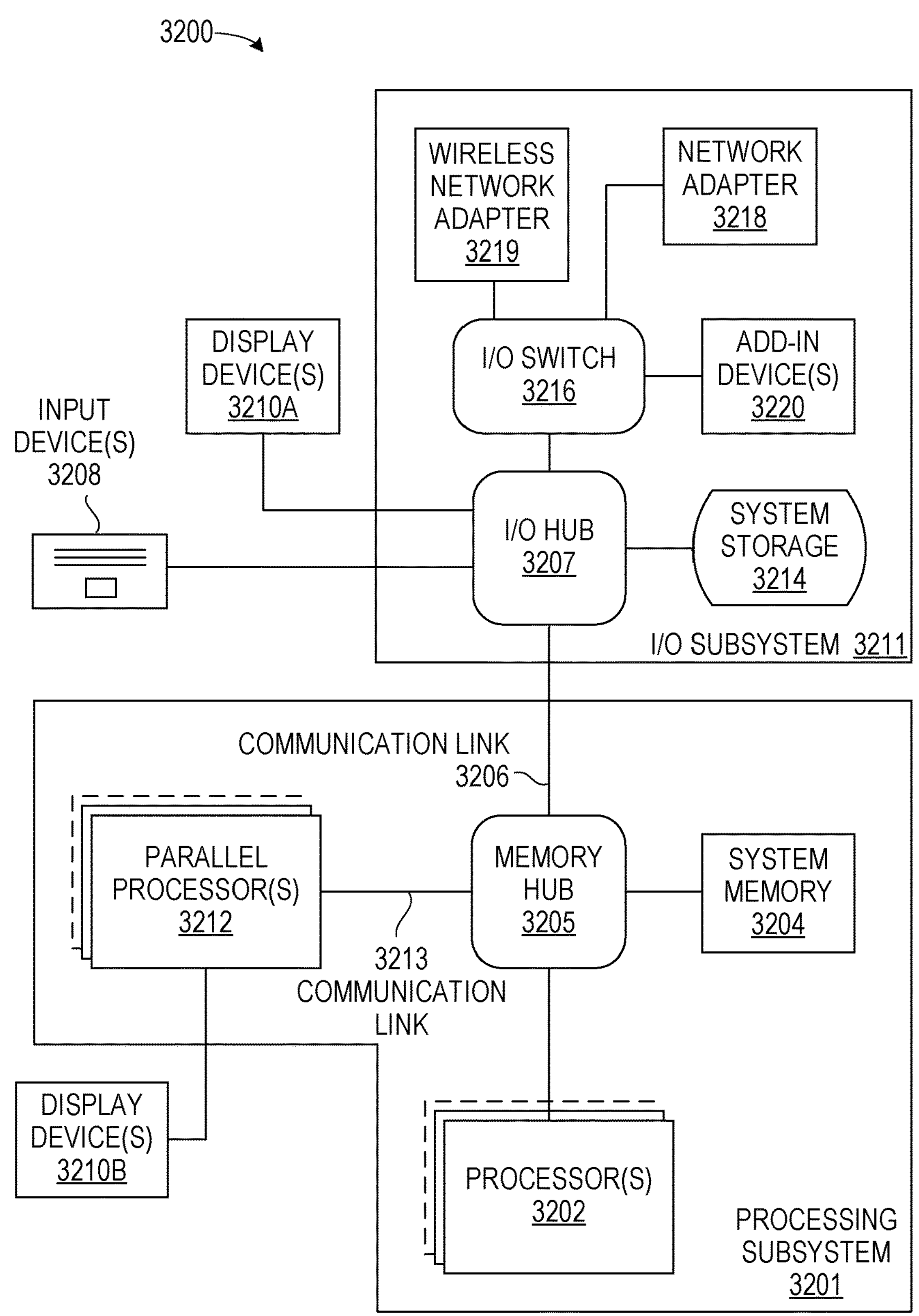
FIG. 32 illustrates a computing system, according to at least one embodiment.

FIG. 32 illustrates a computing system 3200, according to at least one embodiment. In at least one embodiment, FIG. 32 is to cause metrics data of one or more graphics processing units (GPUs) to be obtained from the one or more GPUs in an order from newest to oldest and/or otherwise perform operations described herein in connection with FIGS. 1-7. In at least one embodiment, computing system 3200 includes a processing subsystem 3201 having one or more processor(s) 3202 and a system memory 3204 communicating via an interconnection path that may include a memory hub 3205. In at least one embodiment, memory hub 3205 may be a separate component within a chipset component or may be integrated within one or more processor(s) 3202. In at least one embodiment, memory hub 3205 couples with an I/O subsystem 3211 via a communication link 3206. In at least one embodiment, I/O subsystem 3211 includes an I/O hub 3207 that can enable computing system 3200 to receive input from one or more input device(s) 3208. In at least one embodiment, I/O hub 3207 can enable a display controller, which may be included in one or more processor(s) 3202, to provide outputs to one or more display device(s) 3210A. In at least one embodiment, one or more display device(s) 3210A coupled with I/O hub 3207 can include a local, internal, or embedded display device.

In at least one embodiment, processing subsystem 3201 includes one or more parallel processor(s) 3212 coupled to memory hub 3205 via a bus or other communication link 3213. In at least one embodiment, communication link 3213 may be one of any number of standards based communication link technologies or protocols, such as, but not limited to PCIe, or may be a vendor specific communications interface or communications fabric. In at least one embodiment, one or more parallel processor(s) 3212 form a computationally focused parallel or vector processing system that can include a large number of processing cores and/or processing clusters, such as a many integrated core processor. In at least one embodiment, one or more parallel processor(s) 3212 form a graphics processing subsystem that can output pixels to one of one or more display device(s) 3210A coupled via I/O Hub 3207. In at least one embodiment, one or more parallel processor(s) 3212 can also include a display controller and display interface (not shown) to enable a direct connection to one or more display device(s) 3210B.

In at least one embodiment, a system storage unit 3214 can connect to I/O hub 3207 to provide a storage mechanism for computing system 3200. In at least one embodiment, an I/O switch 3216 can be used to provide an interface mechanism to enable connections between I/O hub 3207 and other components, such as a network adapter 3218 and/or wireless network adapter 3219 that may be integrated into a platform, and various other devices that can be added via one or more add-in device(s) 3220. In at least one embodiment, network adapter 3218 can be an Ethernet adapter or another wired network adapter. In at least one embodiment, wireless network adapter 3219 can include one or more of a Wi-Fi, Bluetooth, NFC, or other network device that includes one or more wireless radios.

In at least one embodiment, computing system 3200 can include other components not explicitly shown, including USB or other port connections, optical storage drives, video capture devices, and/or variations thereof, that may also be connected to I/O hub 3207. In at least one embodiment, communication paths interconnecting various components in FIG. 32 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3212 incorporate circuitry optimized for graphics and video processing, including, for example, video output circuitry, and constitutes a graphics processing unit ("GPU"). In at least one embodiment, one or more parallel processor(s) 3212 incorporate circuitry optimized for general purpose processing. In at least embodiment, components of computing system 3200 may be integrated with one or more other system elements on a single integrated circuit. For example, in at least one embodiment, one or more parallel processor(s) 3212, memory hub 3205, processor(s) 3202, and I/O hub 3207 can be integrated into a SoC integrated circuit. In at least one embodiment, components of computing system 3200 can be integrated into a single package to form a system in package ("SIP") configuration. In at least one embodiment, at least a portion of components of computing system 3200 can be integrated into a multi-chip module ("MCM"), which can be interconnected with other multi-chip modules into a modular computing system. In at least one embodiment, I/O subsystem 3211 and display devices 3210B are omitted from computing system 3200.

Processing Systems

The following figures set forth, without limitation, exemplary processing systems that can be used to implement at least one embodiment.

Figure 33:
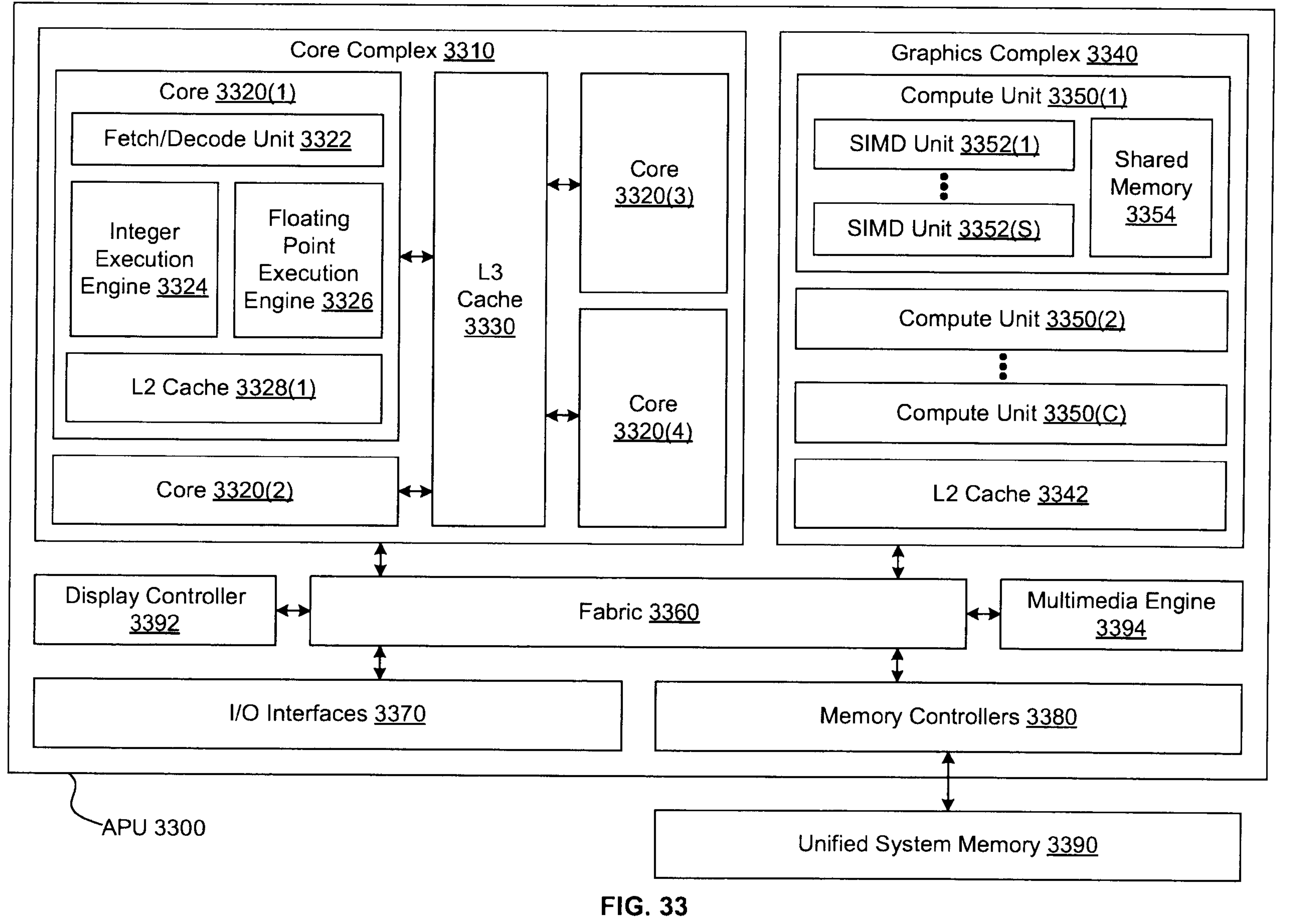
FIG. 33 illustrates an APU, in accordance with at least one embodiment.

FIG. 33 illustrates an accelerated processing unit ("APU") 3300, in accordance with at least one embodiment. In at least one embodiment, FIG. 33 is to cause metrics data of one or more graphics processing units (GPUs) to be obtained from the one or more GPUs in an order from newest to oldest and/or otherwise perform operations described herein in connection with FIGS. 1-7. In at least one embodiment, APU 3300 is developed by AMD Corporation of Santa Clara, CA. In at least one embodiment, APU 3300 can be configured to execute an application program, such as a CUDA program. In at least one embodiment, APU 3300 includes, without limitation, a core complex 3310, a graphics complex 3340, fabric 3360, I/O interfaces 3370, memory controllers 3380, a display controller 3392, and a multimedia engine 3394. In at least one embodiment, APU 3300 may include, without limitation, any number of core complexes 3310, any number of graphics complexes 3340, any number of display controllers 3392, and any number of multimedia engines 3394 in any combination. For explanatory purposes, multiple instances of like objects are denoted herein with reference numbers identifying an object and parenthetical numbers identifying an instance where needed.

In at least one embodiment, core complex 3310 is a CPU, graphics complex 3340 is a GPU, and APU 3300 is a processing unit that integrates, without limitation, 3310 and 3340 onto a single chip. In at least one embodiment, some tasks may be assigned to core complex 3310 and other tasks may be assigned to graphics complex 3340. In at least one embodiment, core complex 3310 is configured to execute main control software associated with APU 3300, such as an operating system. In at least one embodiment, core complex 3310 is a master processor of APU 3300, controlling and coordinating operations of other processors. In at least one embodiment, core complex 3310 issues commands that control an operation of graphics complex 3340. In at least one embodiment, core complex 3310 can be configured to execute host executable code derived from CUDA source code, and graphics complex 3340 can be configured to execute device executable code derived from CUDA source code.

In at least one embodiment, core complex 3310 includes, without limitation, cores 3320(1)-3320(4) and an L3 cache 3330. In at least one embodiment, core complex 3310 may include, without limitation, any number of cores 3320 and any number and type of caches in any combination. In at least one embodiment, cores 3320 are configured to execute instructions of a particular instruction set architecture ("ISA"). In at least one embodiment, each core 3320 is a CPU core.

In at least one embodiment, each core 3320 includes, without limitation, a fetch/decode unit 3322, an integer execution engine 3324, a floating point execution engine 3326, and an L2 cache 3328. In at least one embodiment, fetch/decode unit 3322 fetches instructions, decodes such instructions, generates micro-operations, and dispatches separate micro-instructions to integer execution engine 3324 and floating point execution engine 3326. In at least one embodiment, fetch/decode unit 3322 can concurrently dispatch one micro-instruction to integer execution engine 3324 and another micro-instruction to floating point execution engine 3326. In at least one embodiment, integer execution engine 3324 executes, without limitation, integer and memory operations. In at least one embodiment, floating point engine 3326 executes, without limitation, floating point and vector operations. In at least one embodiment, fetch-decode unit 3322 dispatches micro-instructions to a single execution engine that replaces both integer execution engine 3324 and floating point execution engine 3326.

In at least one embodiment, each core 3320(*i*), where i is an integer representing a particular instance of core 3320, may access L2 cache 3328(*i*) included in core 3320(*i*). In at least one embodiment, each core 3320 included in core complex 3310(*j*), where j is an integer representing a particular instance of core complex 3310, is connected to other cores 3320 included in core complex 3310(*j*) via L3 cache 3330(*j*) included in core complex 3310(*j*). In at least one embodiment, cores 3320 included in core complex 3310(*j*), where j is an integer representing a particular instance of core complex 3310, can access all of L3 cache 3330(*j*) included in core complex 3310(*j*). In at least one embodiment, L3 cache 3330 may include, without limitation, any number of slices.

In at least one embodiment, graphics complex 3340 can be configured to perform compute operations in a highly-parallel fashion. In at least one embodiment, graphics complex 3340 is configured to execute graphics pipeline operations such as draw commands, pixel operations, geometric computations, and other operations associated with rendering an image to a display. In at least one embodiment, graphics complex 3340 is configured to execute operations unrelated to graphics. In at least one embodiment, graphics complex 3340 is configured to execute both operations related to graphics and operations unrelated to graphics.

In at least one embodiment, graphics complex 3340 includes, without limitation, any number of compute units 3350 and an L2 cache 3342. In at least one embodiment, compute units 3350 share L2 cache 3342. In at least one embodiment, L2 cache 3342 is partitioned. In at least one embodiment, graphics complex 3340 includes, without limitation, any number of compute units 3350 and any number (including zero) and type of caches. In at least one embodiment, graphics complex 3340 includes, without limitation, any amount of dedicated graphics hardware.

In at least one embodiment, each compute unit 3350 includes, without limitation, any number of SIMD units 3352 and a shared memory 3354. In at least one embodiment, each SIMD unit 3352 implements a SIMD architecture and is configured to perform operations in parallel. In at least one embodiment, each compute unit 3350 may execute any number of thread blocks, but each thread block executes on a single compute unit 3350. In at least one embodiment, a thread block includes, without limitation, any number of threads of execution. In at least one embodiment, a workgroup is a thread block. In at least one embodiment, each SIMD unit 3352 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3354.

In at least one embodiment, fabric 3360 is a system interconnect that facilitates data and control transmissions across core complex 3310, graphics complex 3340, I/O interfaces 3370, memory controllers 3380, display controller 3392, and multimedia engine 3394. In at least one embodiment, APU 3300 may include, without limitation, any amount and type of system interconnect in addition to or instead of fabric 3360 that facilitates data and control transmissions across any number and type of directly or indirectly linked components that may be internal or external to APU 3300. In at least one embodiment, I/O interfaces 3370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3370 In at least one embodiment, peripheral devices that are coupled to I/O interfaces 3370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3394 includes, without limitation, any amount and type of circuitry that is related to multimedia, such as a video decoder, a video encoder, an image signal processor, etc. In at least one embodiment, memory controllers 3380 facilitate data transfers between APU 3300 and a unified system memory 3390. In at least one embodiment, core complex 3310 and graphics complex 3340 share unified system memory 3390.

In at least one embodiment, APU 3300 implements a memory subsystem that includes, without limitation, any amount and type of memory controllers 3380 and memory devices (e.g., shared memory 3354) that may be dedicated to one component or shared among multiple components. In at least one embodiment, APU 3300 implements a cache subsystem that includes, without limitation, one or more cache memories (e.g., L2 caches 3428, L3 cache 3330, and L2 cache 3342) that may each be private to or shared between any number of components (e.g., cores 3320, core complex 3310, SIMD units 3352, compute units 3350, and graphics complex 3340).

Figure 34:
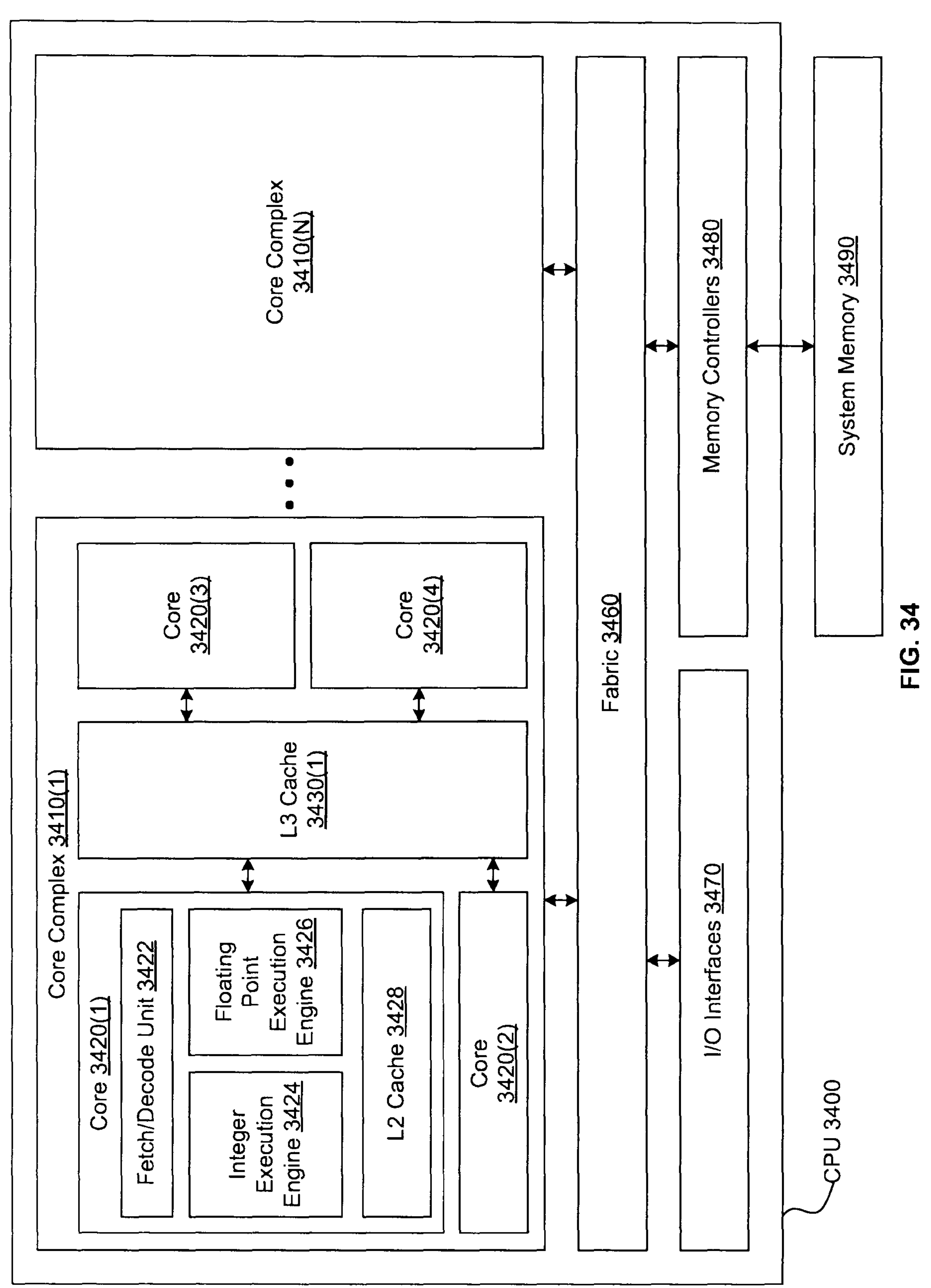
FIG. 34 illustrates a CPU, in accordance with at least one embodiment.

FIG. 34 illustrates a CPU 3400, in accordance with at least one embodiment. In at least one embodiment, FIG. 34 is to cause metrics data of one or more graphics processing units (GPUs) to be obtained from the one or more GPUs in an order from newest to oldest and/or otherwise perform operations described herein in connection with FIGS. 1-7. In at least one embodiment, CPU 3400 is developed by AMD Corporation of Santa Clara, CA. In at least one embodiment, CPU 3400 can be configured to execute an application program. In at least one embodiment, CPU 3400 is configured to execute main control software, such as an operating system. In at least one embodiment, CPU 3400 issues commands that control an operation of an external GPU (not shown). In at least one embodiment, CPU 3400 can be configured to execute host executable code derived from CUDA source code, and an external GPU can be configured to execute device executable code derived from such CUDA source code. In at least one embodiment, CPU 3400 includes, without limitation, any number of core complexes 3410, fabric 3460, I/O interfaces 3470, and memory controllers 3480.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular ISA. In at least one embodiment, each core 3420 is a CPU core.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420(*i*), where i is an integer representing a particular instance of core 3420, may access L2 cache 3428(*i*) included in core 3420(*i*). In at least one embodiment, each core 3420 included in core complex 3410(*j*), where j is an integer representing a particular instance of core complex 3410, is connected to other cores 3420 in core complex 3410(*j*) via L3 cache 3430(*j*) included in core complex 3410(*j*). In at least one embodiment, cores 3420 included in core complex 3410(*j*), where j is an integer representing a particular instance of core complex 3410, can access all of L3 cache 3430(*j*) included in core complex 3410(*j*). In at least one embodiment, L3 cache 3430 may include, without limitation, any number of slices.

In at least one embodiment, fabric 3460 is a system interconnect that facilitates data and control transmissions across core complexes 3410(1)-3410(N) (where N is an integer greater than zero), I/O interfaces 3470, and memory controllers 3480. In at least one embodiment, CPU 3400 may include, without limitation, any amount and type of system interconnect in addition to or instead of fabric 3460 that facilitates data and control transmissions across any number and type of directly or indirectly linked components that may be internal or external to CPU 3400. In at least one embodiment, I/O interfaces 3470 are representative of any number and type of I/O interfaces (e.g., PCI, PCI-X, PCIe, GBE, USB, etc.). In at least one embodiment, various types of peripheral devices are coupled to I/O interfaces 3470 In at least one embodiment, peripheral devices that are coupled to I/O interfaces 3470 may include, without limitation, displays, keyboards, mice, printers, scanners, joysticks or other types of game controllers, media recording devices, external storage devices, network interface cards, and so forth.

In at least one embodiment, memory controllers 3480 facilitate data transfers between CPU 3400 and a system memory 3490. In at least one embodiment, core complex 3410 and graphics complex 3440 share system memory 3490. In at least one embodiment, CPU 3400 implements a memory subsystem that includes, without limitation, any amount and type of memory controllers 3480 and memory devices that may be dedicated to one component or shared among multiple components. In at least one embodiment, CPU 3400 implements a cache subsystem that includes, without limitation, one or more cache memories (e.g., L2 caches 3428 and L3 caches 3430) that may each be private to or shared between any number of components (e.g., cores 3420 and core complexes 3410).

Figure 35:
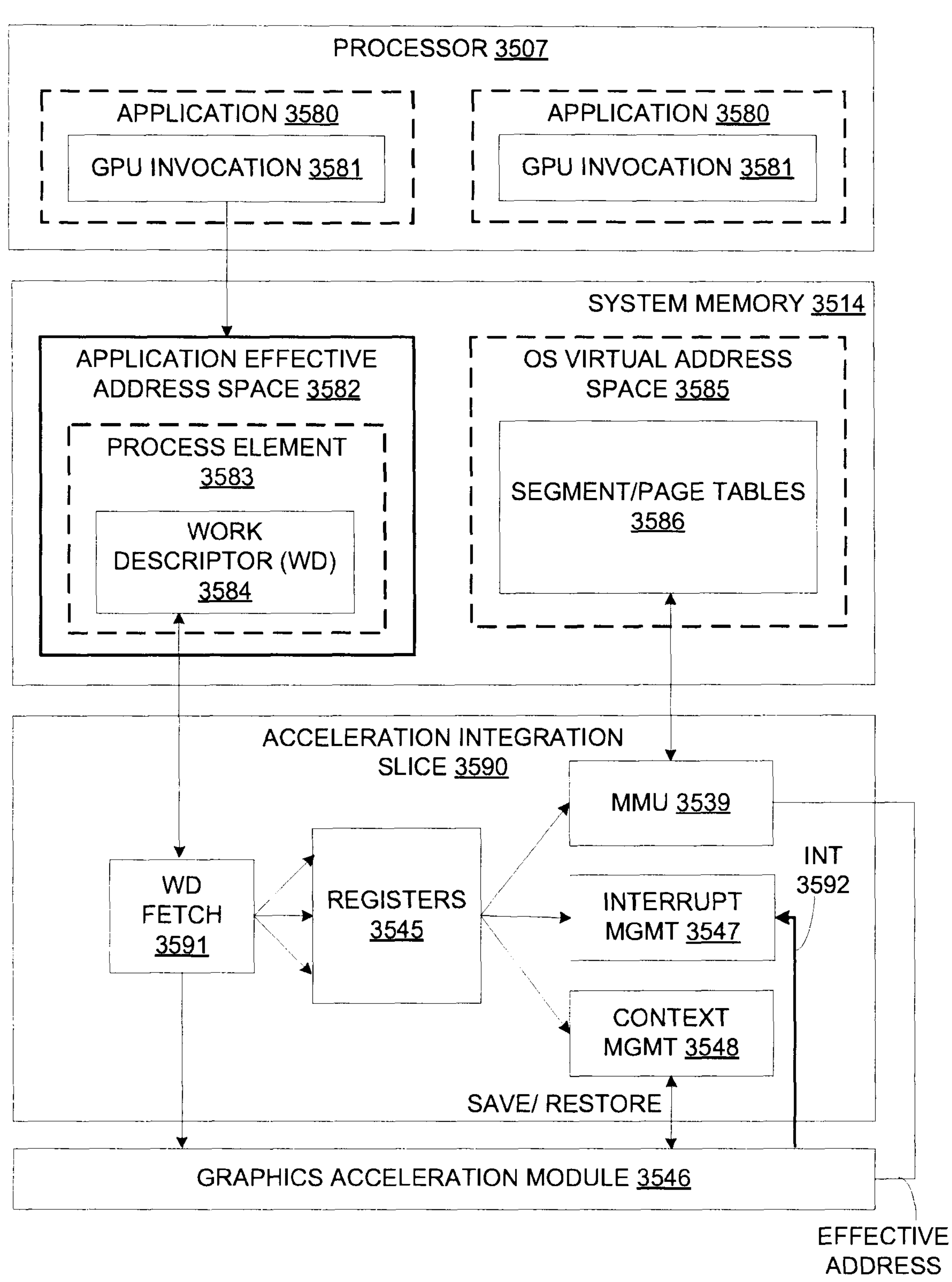
FIG. 35 illustrates an exemplary accelerator integration slice, in accordance with at least one embodiment.

FIG. 35 illustrates an exemplary accelerator integration slice 3590, in accordance with at least one embodiment. In at least one embodiment, FIG. 35 is to cause metrics data of one or more graphics processing units (GPUs) to be obtained from the one or more GPUs in an order from newest to oldest and/or otherwise perform operations described herein in connection with FIGS. 1-7. As used herein, a "slice" comprises a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each comprise a separate GPU. Alternatively, graphics processing engines may comprise different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 3582 within system memory 3514 stores process elements 3583. In one embodiment, process elements 3583 are stored in response to GPU invocations 3581 from applications 3580 executed on processor 3507. A process element 3583 contains process state for corresponding application 3580. A work descriptor ("WD") 3584 contained in process element 3583 can be a single job requested by an application or may contain a pointer to a queue of jobs. In at least one embodiment, WD 3584 is a pointer to a job request queue in application effective address space 3582.

Graphics acceleration module 3546 and/or individual graphics processing engines can be shared by all or a subset of processes in a system. In at least one embodiment, an infrastructure for setting up process state and sending WD 3584 to graphics acceleration module 3546 to start a job in a virtualized environment may be included.

In at least one embodiment, a dedicated-process programming model is implementation-specific. In this model, a single process owns graphics acceleration module 3546 or an individual graphics processing engine. Because graphics acceleration module 3546 is owned by a single process, a hypervisor initializes an accelerator integration circuit for an owning partition and an operating system initializes accelerator integration circuit for an owning process when graphics acceleration module 3546 is assigned.

In operation, a WD fetch unit 3591 in accelerator integration slice 3590 fetches next WD 3584 which includes an indication of work to be done by one or more graphics processing engines of graphics acceleration module 3546. Data from WD 3584 may be stored in registers 3545 and used by a memory management unit ("MMU") 3539, interrupt management circuit 3547 and/or context management circuit 3548 as illustrated. For example, one embodiment of MMU 3539 includes segment/page walk circuitry for accessing segment/page tables 3586 within OS virtual address space 3585. Interrupt management circuit 3547 may process interrupt events ("INT") 3592 received from graphics acceleration module 3546. When performing graphics operations, an effective address 3593 generated by a graphics processing engine is translated to a real address by MMU 3539.

In one embodiment, a same set of registers 3545 are duplicated for each graphics processing engine and/or graphics acceleration module 3546 and may be initialized by a hypervisor or operating system. Each of these duplicated registers may be included in accelerator integration slice 3590. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3584 is specific to a particular graphics acceleration module 3546 and/or a particular graphics processing engine. It contains all information required by a graphics processing engine to do work or it can be a pointer to a memory location where an application has set up a command queue of work to be completed.

Figure 36A:
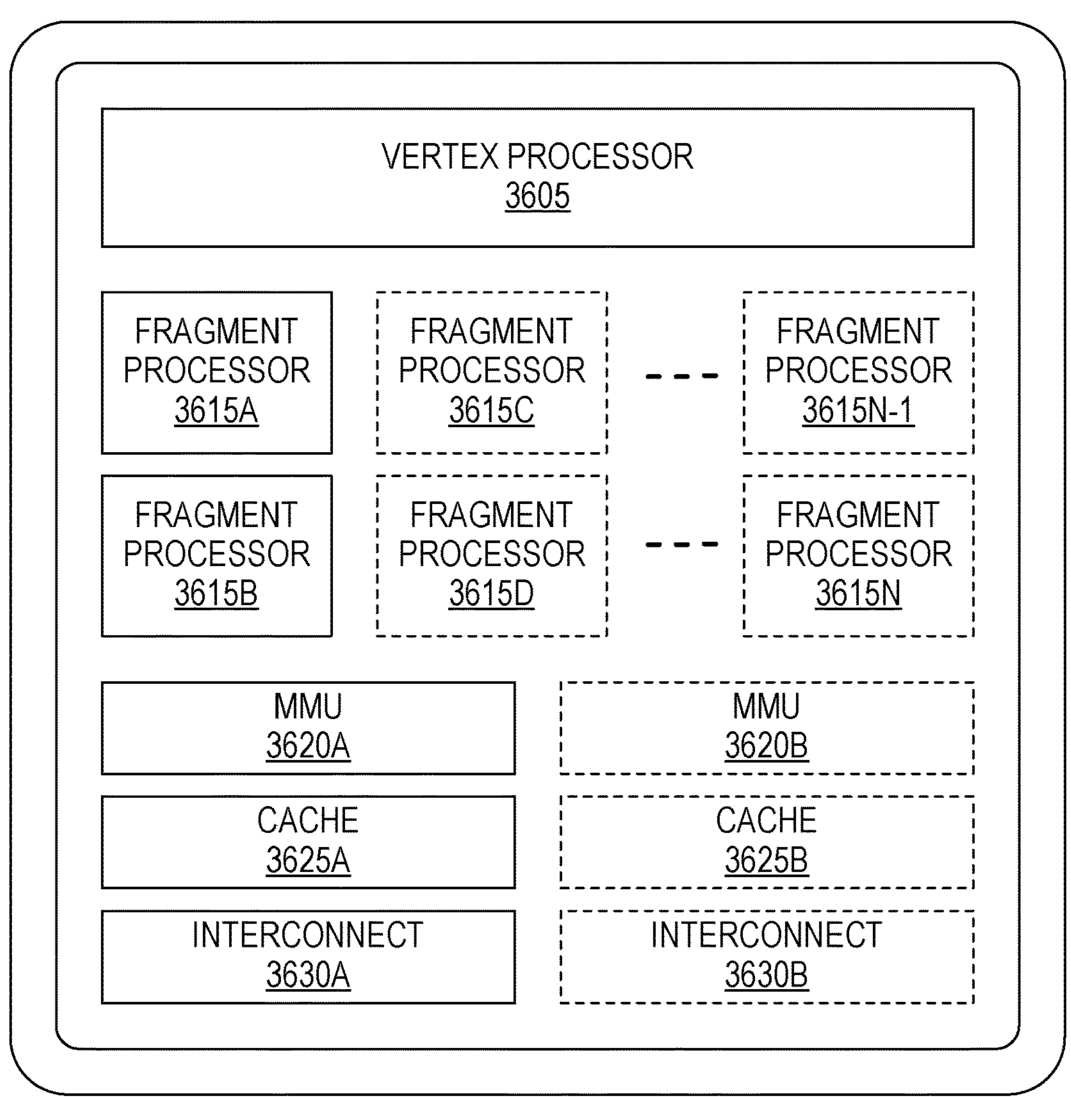
FIGS. 36A-36B illustrate exemplary graphics processors, in accordance with at least one embodiment.
Figure 36B:
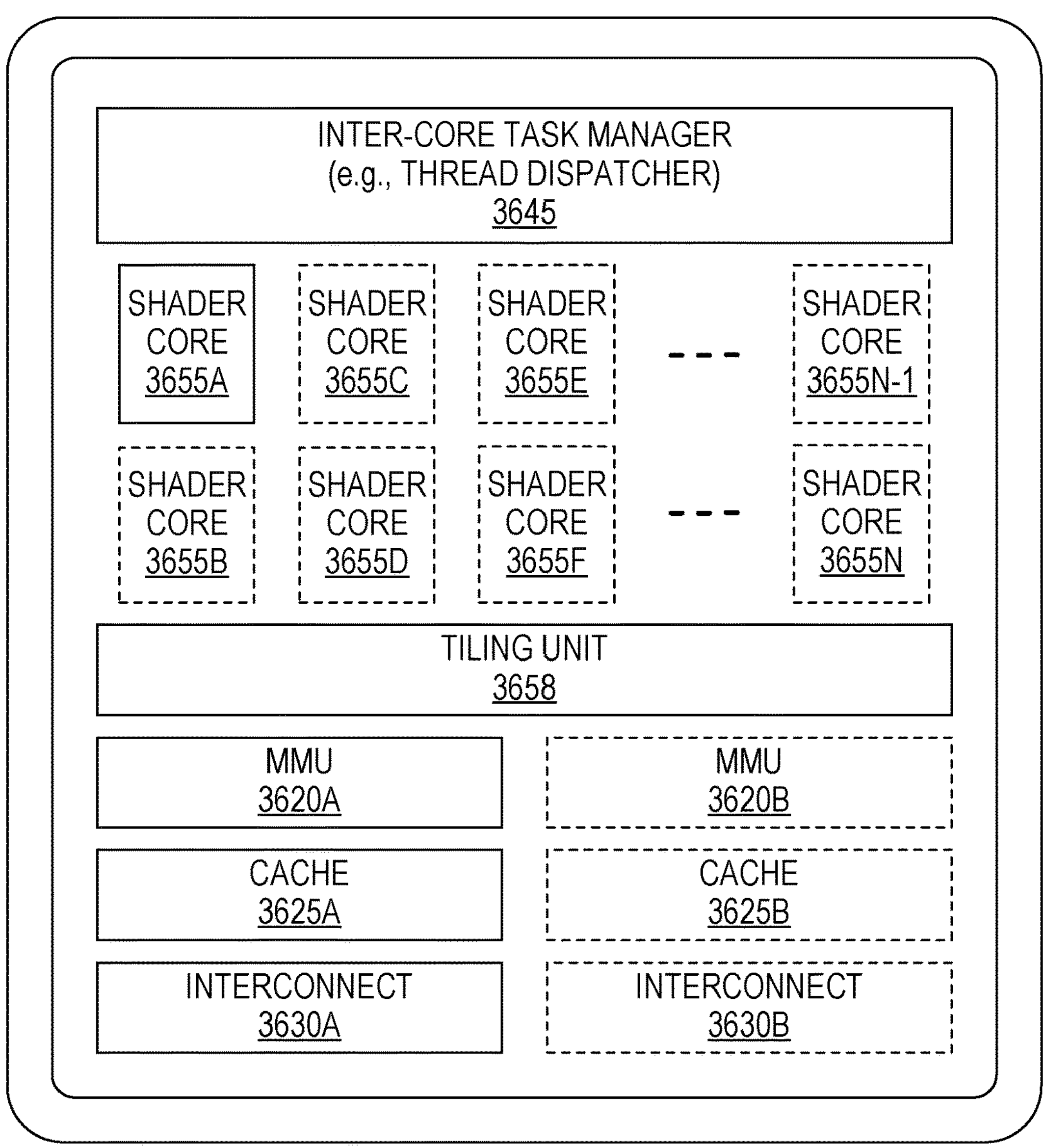

FIGS. 36A-36B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 36A illustrates an exemplary graphics processor 3610 of an SoC integrated circuit that may be fabricated using one or more IP cores, in accordance with at least one embodiment. FIG. 36B illustrates an additional exemplary graphics processor 3640 of an SoC integrated circuit that may be fabricated using one or more IP cores, in accordance with at least one embodiment. In at least one embodiment, FIGS. 36A and 36B are to cause metrics data of one or more graphics processing units (GPUs) to be obtained from the one or more GPUs in an order from newest to oldest and/or otherwise perform operations described herein in connection with FIGS. 1-7. In at least one embodiment, graphics processor 3610 of FIG. 36A is a low power graphics processor core. In at least one embodiment, graphics processor 3640 of FIG. 36B is a higher performance graphics processor core. In at least one embodiment, each of graphics processors 3610, 3640 can be variants of graphics processor 1210 of FIG. 12.

In at least one embodiment, graphics processor 3610 includes a vertex processor 3605 and one or more fragment processor(s) 3615A-3615N (e.g., 3615A, 3615B, 3615C, 3615D, through 3615N-1, and 3615N). In at least one embodiment, graphics processor 3610 can execute different shader programs via separate logic, such that vertex processor 3605 is optimized to execute operations for vertex shader programs, while one or more fragment processor(s) 3615A-3615N execute fragment (e.g., pixel) shading operations for fragment or pixel shader programs. In at least one embodiment, vertex processor 3605 performs a vertex processing stage of a 3D graphics pipeline and generates primitives and vertex data. In at least one embodiment, fragment processor(s) 3615A-3615N use primitive and vertex data generated by vertex processor 3605 to produce a framebuffer that is displayed on a display device. In at least one embodiment, fragment processor(s) 3615A-3615N are optimized to execute fragment shader programs as provided for in an OpenGL API, which may be used to perform similar operations as a pixel shader program as provided for in a Direct 3D API.

In at least one embodiment, graphics processor 3610 additionally includes one or more MMU(s) 3620A-3620B, cache(s) 3625A-3625B, and circuit interconnect(s) 3630A-3630B. In at least one embodiment, one or more MMU(s) 3620A-3620B provide for virtual to physical address mapping for graphics processor 3610, including for vertex processor 3605 and/or fragment processor(s) 3615A-3615N, which may reference vertex or image/texture data stored in memory, in addition to vertex or image/texture data stored in one or more cache(s) 3625A-3625B. In at least one embodiment, one or more MMU(s) 3620A-3620B may be synchronized with other MMUs within a system, including one or more MMUs associated with one or more application processor(s) 1205, image processors 1215, and/or video processors 1220 of FIG. 12, such that each processor 1205-1220 can participate in a shared or unified virtual memory system. In at least one embodiment, one or more circuit interconnect(s) 3630A-3630B enable graphics processor 3610 to interface with other IP cores within an SoC, either via an internal bus of an SoC or via a direct connection.

In at least one embodiment, graphics processor 3640 includes one or more MMU(s) 3620A-3620B, caches 3625A-3625B, and circuit interconnects 3630A-3630B of graphics processor 3610 of FIG. 36A. In at least one embodiment, graphics processor 3640 includes one or more shader core(s) 3655A-3655N (e.g., 3655A, 3655B, 3655C, 3655D, 3655E, 3655F, through 3655N-1, and 3655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3640 includes an inter-core task manager 3645, which acts as a thread dispatcher to dispatch execution threads to one or more shader cores 3655A-3655N and a tiling unit 3658 to accelerate tiling operations for tile-based rendering, in which rendering operations for a scene are subdivided in image space, for example to exploit local spatial coherence within a scene or to optimize use of internal caches.

Figure 37A:
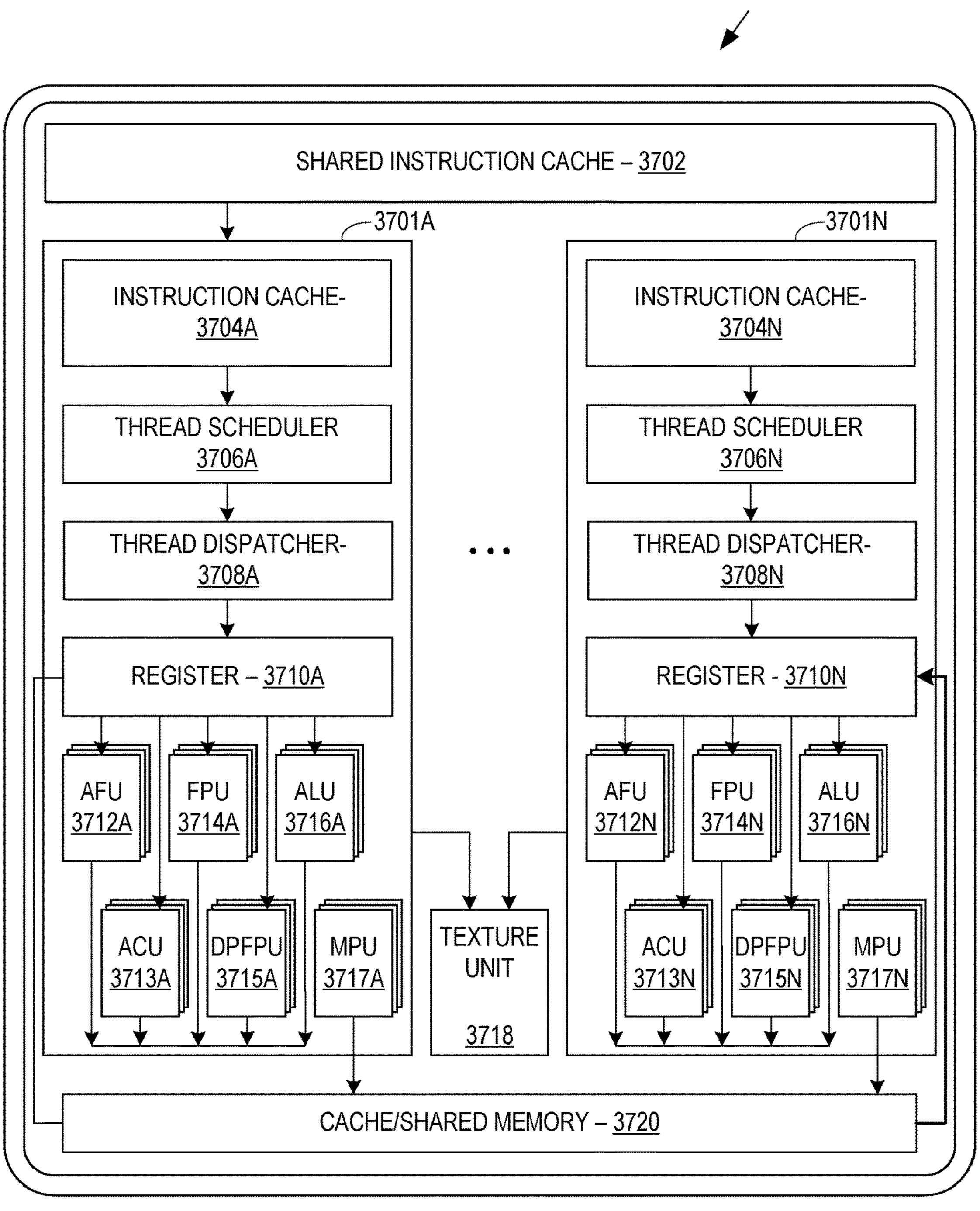
FIG. 37A illustrates a graphics core, in accordance with at least one embodiment.
Figure 37B:
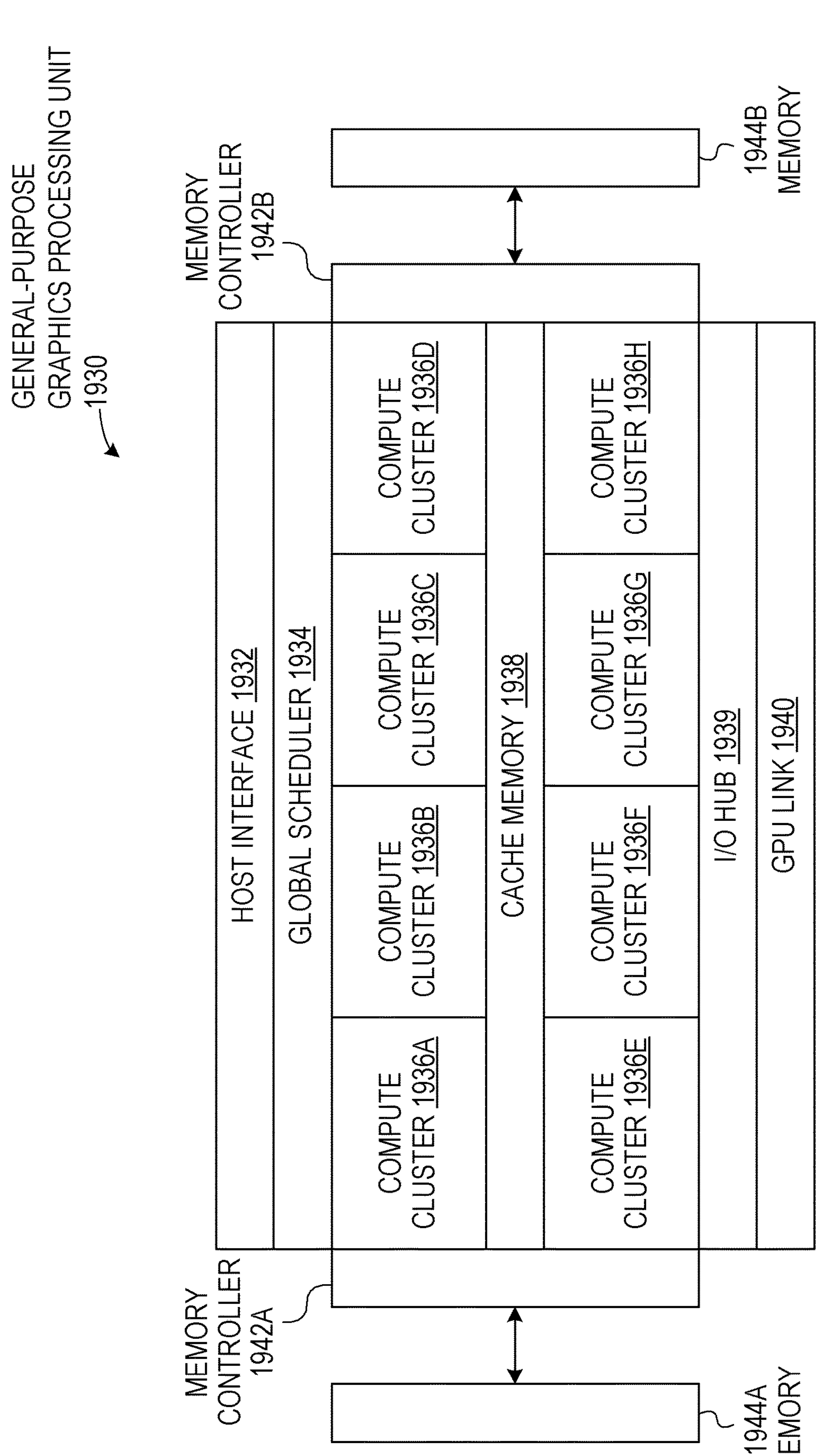
FIG. 37B illustrates a GPGPU, in accordance with at least one embodiment.

FIG. 37A illustrates a graphics core 3700, in accordance with at least one embodiment. In at least one embodiment, graphics core 3700 may be included within graphics processor 3110 of FIG. 31. In at least one embodiment, graphics core 3700 may be a unified shader core 3655A-3655N as in FIG. 36B. In at least one embodiment, FIGS. 37A and 37B are to cause metrics data of one or more graphics processing units (GPUs) to be obtained from the one or more GPUs in an order from newest to oldest and/or otherwise perform operations described herein in connection with FIGS. 1-7. In at least one embodiment, graphics core 3700 includes a shared instruction cache 3702, a texture unit 3718, and a cache/shared memory 3720 that are common to execution resources within graphics core 3700. In at least one embodiment, graphics core 3700 can include multiple slices 3701A-3701N or partition for each core, and a graphics processor can include multiple instances of graphics core 3700. Slices 3701A-3701N can include support logic including a local instruction cache 3704A-3704N, a thread scheduler 3706A-3706N, a thread dispatcher 3708A-3708N, and a set of registers 3710A-3710N. In at least one embodiment, slices 3701A-3701N can include a set of additional function units ("AFUs") 3712A-3712N, floating-point units ("FPUs") 3714A-3714N, integer arithmetic logic units ("ALUs") 3716-3716N, address computational units ("ACUs") 3713A-3713N, double-precision floating-point units ("DPFPUs") 3715A-3715N, and matrix processing units ("MPUs") 3717A-3717N.

In at least one embodiment, FPUs 3714A-3714N can perform single-precision (32-bit) and half-precision (16-bit) floating point operations, while DPFPUs 3715A-3715N perform double precision (64-bit) floating point operations. In at least one embodiment, ALUs 3716A-3716N can perform variable precision integer operations at 8-bit, 16-bit, and 32-bit precision, and can be configured for mixed precision operations. In at least one embodiment, MPUs 3717A-3717N can also be configured for mixed precision matrix operations, including half-precision floating point and 8-bit integer operations. In at least one embodiment, MPUs 3717-3717N can perform a variety of matrix operations to accelerate CUDA programs, including enabling support for accelerated general matrix to matrix multiplication ("GEMM"). In at least one embodiment, AFUs 3712A-3712N can perform additional logic operations not supported by floating-point or integer units, including trigonometric operations (e.g., Sine, Cosine, etc.).

FIG. 37B illustrates a general-purpose graphics processing unit ("GPGPU") 3730, in accordance with at least one embodiment. In at least one embodiment, GPGPU 3730 is highly-parallel and suitable for deployment on a multi-chip module. In at least one embodiment, GPGPU 3730 can be configured to enable highly-parallel compute operations to be performed by an array of GPUs. In at least one embodiment, GPGPU 3730 can be linked directly to other instances of GPGPU 3730 to create a multi-GPU cluster to improve execution time for CUDA programs. In at least one embodiment, GPGPU 3730 includes a host interface 3732 to enable a connection with a host processor. In at least one embodiment, host interface 3732 is a PCIe interface. In at least one embodiment, host interface 3732 can be a vendor specific communications interface or communications fabric. In at least one embodiment, GPGPU 3730 receives commands from a host processor and uses a global scheduler 3734 to distribute execution threads associated with those commands to a set of compute clusters 3736A-3736H. In at least one embodiment, compute clusters 3736A-3736H share a cache memory 3738. In at least one embodiment, cache memory 3738 can serve as a higher-level cache for cache memories within compute clusters 3736A-3736H.

In at least one embodiment, GPGPU 3730 includes memory 3744A-3744B coupled with compute clusters 3736A-3736H via a set of memory controllers 3742A-3742B. In at least one embodiment, memory 3744A-3744B can include various types of memory devices including DRAM or graphics random access memory, such as synchronous graphics random access memory ("SGRAM"), including graphics double data rate ("GDDR") memory.

In at least one embodiment, compute clusters 3736A-3736H each include a set of graphics cores, such as graphics core 3700 of FIG. 37A, which can include multiple types of integer and floating point logic units that can perform computational operations at a range of precisions including suited for computations associated with CUDA programs. For example, in at least one embodiment, at least a subset of floating point units in each of compute clusters 3736A-3736H can be configured to perform 16-bit or 32-bit floating point operations, while a different subset of floating point units can be configured to perform 64-bit floating point operations.

In at least one embodiment, multiple instances of GPGPU 3730 can be configured to operate as a compute cluster. In at least one embodiment, compute clusters 3736A-3736H may implement any technically feasible communication techniques for synchronization and data exchange. In at least one embodiment, multiple instances of GPGPU 3730 communicate over host interface 3732. In at least one embodiment, GPGPU 3730 includes an I/O hub 3739 that couples GPGPU 3730 with a GPU link 3740 that enables a direct connection to other instances of GPGPU 3730. In at least one embodiment, GPU link 3740 is coupled to a dedicated GPU-to-GPU bridge that enables communication and synchronization between multiple instances of GPGPU 3730. In at least one embodiment GPU link 3740 couples with a high speed interconnect to transmit and receive data to other GPGPUs 3730 or parallel processors. In at least one embodiment, multiple instances of GPGPU 3730 are located in separate data processing systems and communicate via a network device that is accessible via host interface 3732. In at least one embodiment GPU link 3740 can be configured to enable a connection to a host processor in addition to or as an alternative to host interface 3732. In at least one embodiment, GPGPU 3730 can be configured to execute a CUDA program.

Figure 38A:
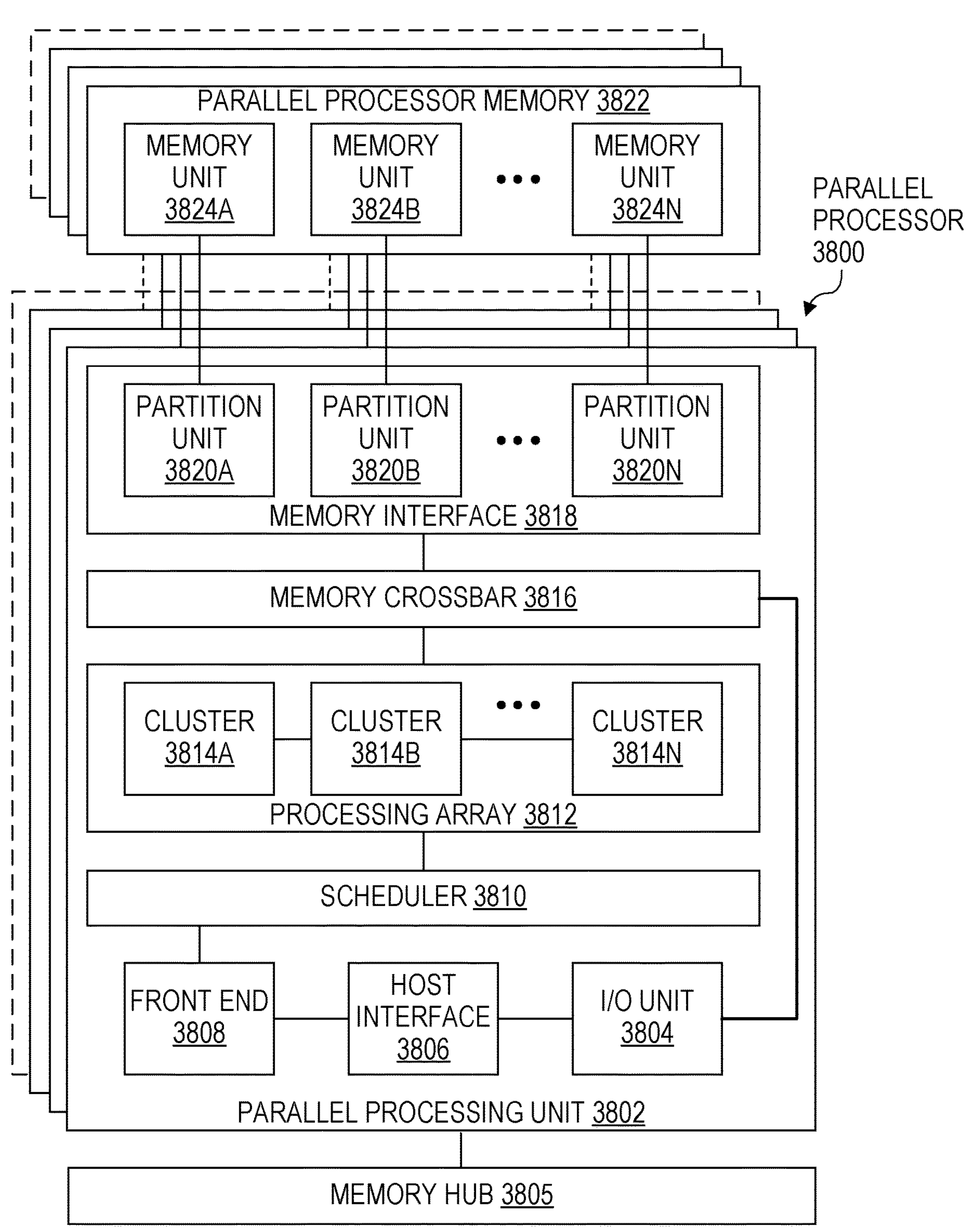
FIG. 38A illustrates a parallel processor, in accordance with at least one embodiment.

FIG. 38A illustrates a parallel processor 3800, in accordance with at least one embodiment. In at least one embodiment, various components of parallel processor 3800 may be implemented using one or more integrated circuit devices, such as programmable processors, application specific integrated circuits ("ASICs"), or FPGAs.

In at least one embodiment, parallel processor 3800 includes a parallel processing unit 3802. In at least one embodiment, parallel processing unit 3802 includes an I/O unit 3804 that enables communication with other devices, including other instances of parallel processing unit 3802. In at least one embodiment, I/O unit 3804 may be directly connected to other devices. In at least one embodiment, I/O unit 3804 connects with other devices via use of a hub or switch interface, such as memory hub 1305. In at least one embodiment, connections between memory hub 1305 and I/O unit 3804 form a communication link. In at least one embodiment, I/O unit 3804 connects with a host interface 3806 and a memory crossbar 3816, where host interface 3806 receives commands directed to performing processing operations and memory crossbar 3816 receives commands directed to performing memory operations.

In at least one embodiment, when host interface 3806 receives a command buffer via I/O unit 3804, host interface 3806 can direct work operations to perform those commands to a front end 3808. In at least one embodiment, front end 3808 couples with a scheduler 3810, which is configured to distribute commands or other work items to a processing array 3812. In at least one embodiment, scheduler 3810 ensures that processing array 3812 is properly configured and in a valid state before tasks are distributed to processing array 3812. In at least one embodiment, scheduler 3810 is implemented via firmware logic executing on a microcontroller. In at least one embodiment, microcontroller implemented scheduler 3810 is configurable to perform complex scheduling and work distribution operations at coarse and fine granularity, enabling rapid preemption and context switching of threads executing on processing array 3812. In at least one embodiment, host software can prove workloads for scheduling on processing array 3812 via one of multiple graphics processing doorbells. In at least one embodiment, workloads can then be automatically distributed across processing array 3812 by scheduler 3810 logic within a microcontroller including scheduler 3810.

In at least one embodiment, processing array 3812 can include up to "N" clusters (e.g., cluster 3814A, cluster 3814B, through cluster 3814N). In at least one embodiment, each cluster 3814A-3814N of processing array 3812 can execute a large number of concurrent threads. In at least one embodiment, scheduler 3810 can allocate work to clusters 3814A-3814N of processing array 3812 using various scheduling and/or work distribution algorithms, which may vary depending on a workload arising for each type of program or computation. In at least one embodiment, scheduling can be handled dynamically by scheduler 3810, or can be assisted in part by compiler logic during compilation of program logic configured for execution by processing array 3812. In at least one embodiment, different clusters 3814A-3814N of processing array 3812 can be allocated for processing different types of programs or for performing different types of computations.

In at least one embodiment, processing array 3812 can be configured to perform various types of parallel processing operations. In at least one embodiment, processing array 3812 is configured to perform general-purpose parallel compute operations. For example, in at least one embodiment, processing array 3812 can include logic to execute processing tasks including filtering of video and/or audio data, performing modeling operations, including physics operations, and performing data transformations.

In at least one embodiment, processing array 3812 is configured to perform parallel graphics processing operations. In at least one embodiment, processing array 3812 can include additional logic to support execution of such graphics processing operations, including, but not limited to texture sampling logic to perform texture operations, as well as tessellation logic and other vertex processing logic. In at least one embodiment, processing array 3812 can be configured to execute graphics processing related shader programs such as, but not limited to vertex shaders, tessellation shaders, geometry shaders, and pixel shaders. In at least one embodiment, parallel processing unit 3802 can transfer data from system memory via I/O unit 3804 for processing. In at least one embodiment, during processing, transferred data can be stored to on-chip memory (e.g., a parallel processor memory 3822) during processing, then written back to system memory.

In at least one embodiment, when parallel processing unit 3802 is used to perform graphics processing, scheduler 3810 can be configured to divide a processing workload into approximately equal sized tasks, to better enable distribution of graphics processing operations to multiple clusters 3814A-3814N of processing array 3812. In at least one embodiment, portions of processing array 3812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3814A-3814N may be stored in buffers to allow intermediate data to be transmitted between clusters 3814A-3814N for further processing.

In at least one embodiment, processing array 3812 can receive processing tasks to be executed via scheduler 3810, which receives commands defining processing tasks from front end 3808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3810 may be configured to fetch indices corresponding to tasks or may receive indices from front end 3808. In at least one embodiment, front end 3808 can be configured to ensure processing array 3812 is configured to a valid state before a workload specified by incoming command buffers (e.g., batch-buffers, push buffers, etc.) is initiated.

In at least one embodiment, each of one or more instances of parallel processing unit 3802 can couple with parallel processor memory 3822. In at least one embodiment, parallel processor memory 3822 can be accessed via memory crossbar 3816, which can receive memory requests from processing array 3812 as well as I/O unit 3804. In at least one embodiment, memory crossbar 3816 can access parallel processor memory 3822 via a memory interface 3818. In at least one embodiment, memory interface 3818 can include multiple partition units (e.g., a partition unit 3820A, partition unit 3820B, through partition unit 3820N) that can each couple to a portion (e.g., memory unit) of parallel processor memory 3822. In at least one embodiment, a number of partition units 3820A-3820N is configured to be equal to a number of memory units, such that a first partition unit 3820A has a corresponding first memory unit 3824A, a second partition unit 3820B has a corresponding memory unit 3824B, and an Nth partition unit 3820N has a corresponding Nth memory unit 3824N. In at least one embodiment, a number of partition units 3820A-3820N may not be equal to a number of memory devices.

In at least one embodiment, memory units 3824A-3824N can include various types of memory devices, including DRAM or graphics random access memory, such as SGRAM, including GDDR memory. In at least one embodiment, memory units 3824A-3824N may also include 3D stacked memory, including but not limited to high bandwidth memory ("HBM"). In at least one embodiment, render targets, such as frame buffers or texture maps may be stored across memory units 3824A-3824N, allowing partition units 3820A-3820N to write portions of each render target in parallel to efficiently use available bandwidth of parallel processor memory 3822. In at least one embodiment, a local instance of parallel processor memory 3822 may be excluded in favor of a unified memory design that utilizes system memory in conjunction with local cache memory.

In at least one embodiment, any one of clusters 3814A-3814N of processing array 3812 can process data that will be written to any of memory units 3824A-3824N within parallel processor memory 3822. In at least one embodiment, memory crossbar 3816 can be configured to transfer an output of each cluster 3814A-3814N to any partition unit 3820A-3820N or to another cluster 3814A-3814N, which can perform additional processing operations on an output. In at least one embodiment, each cluster 3814A-3814N can communicate with memory interface 3818 through memory crossbar 3816 to read from or write to various external memory devices. In at least one embodiment, memory crossbar 3816 has a connection to memory interface 3818 to communicate with I/O unit 3804, as well as a connection to a local instance of parallel processor memory 3822, enabling processing units within different clusters 3814A-3814N to communicate with system memory or other memory that is not local to parallel processing unit 3802. In at least one embodiment, memory crossbar 3816 can use virtual channels to separate traffic streams between clusters 3814A-3814N and partition units 3820A-3820N.

In at least one embodiment, multiple instances of parallel processing unit 3802 can be provided on a single add-in card, or multiple add-in cards can be interconnected. In at least one embodiment, different instances of parallel processing unit 3802 can be configured to interoperate even if different instances have different numbers of processing cores, different amounts of local parallel processor memory, and/or other configuration differences. For example, in at least one embodiment, some instances of parallel processing unit 3802 can include higher precision floating point units relative to other instances. In at least one embodiment, systems incorporating one or more instances of parallel processing unit 3802 or parallel processor 3800 can be implemented in a variety of configurations and form factors, including but not limited to desktop, laptop, or handheld personal computers, servers, workstations, game consoles, and/or embedded systems.

Figure 38B:
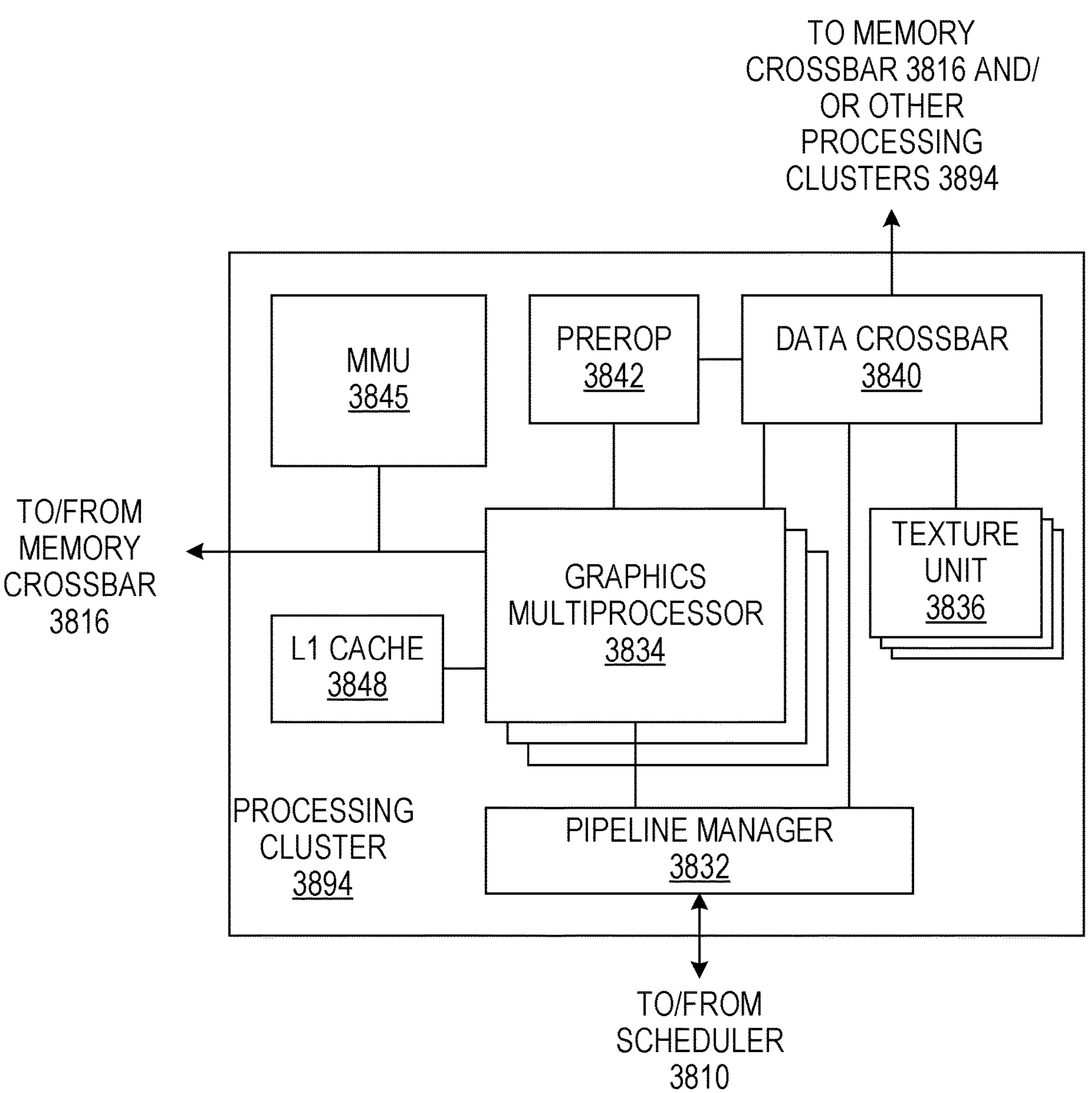
FIG. 38B illustrates a processing cluster, in accordance with at least one embodiment.

FIG. 38B illustrates a processing cluster 3894, in accordance with at least one embodiment. In at least one embodiment, processing cluster 3894 is included within a parallel processing unit. In at least one embodiment, FIGS. 38A and 38B are to cause metrics data of one or more graphics processing units (GPUs) to be obtained from the one or more GPUs in an order from newest to oldest and/or otherwise perform operations described herein in connection with FIGS. 1-7. In at least one embodiment, processing cluster 3894 is one of processing clusters 3814A-3814N of FIG. 38. In at least one embodiment, processing cluster 3894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3894.

In at least one embodiment, operation of processing cluster 3894 can be controlled via a pipeline manager 3832 that distributes processing tasks to SIMT parallel processors. In at least one embodiment, pipeline manager 3832 receives instructions from scheduler 3810 of FIG. 38 and manages execution of those instructions via a graphics multiprocessor 3834 and/or a texture unit 3836. In at least one embodiment, graphics multiprocessor 3834 is an exemplary instance of a SIMT parallel processor. However, in at least one embodiment, various types of SIMT parallel processors of differing architectures may be included within processing cluster 3894. In at least one embodiment, one or more instances of graphics multiprocessor 3834 can be included within processing cluster 3894. In at least one embodiment, graphics multiprocessor 3834 can process data and a data crossbar 3840 can be used to distribute processed data to one of multiple possible destinations, including other shader units. In at least one embodiment, pipeline manager 3832 can facilitate distribution of processed data by specifying destinations for processed data to be distributed via data crossbar 3840.

In at least one embodiment, each graphics multiprocessor 3834 within processing cluster 3894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3834. In at least one embodiment, a thread group may include fewer threads than a number of processing engines within graphics multiprocessor 3834. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3834. In at least one embodiment, when a thread group includes more threads than a number of processing engines within graphics multiprocessor 3834, processing can be performed over consecutive clock cycles. In at least one embodiment, multiple thread groups can be executed concurrently on graphics multiprocessor 3834.

In at least one embodiment, graphics multiprocessor 3834 includes an internal cache memory to perform load and store operations. In at least one embodiment, graphics multiprocessor 3834 can forego an internal cache and use a cache memory (e.g., L1 cache 3848) within processing cluster 3894. In at least one embodiment, each graphics multiprocessor 3834 also has access to Level 2 ("L2") caches within partition units (e.g., partition units 3820A-3820N of FIG. 38A) that are shared among all processing clusters 3894 and may be used to transfer data between threads. In at least one embodiment, graphics multiprocessor 3834 may also access off-chip global memory, which can include one or more of local parallel processor memory and/or system memory. In at least one embodiment, any memory external to parallel processing unit 3802 may be used as global memory. In at least one embodiment, processing cluster 3894 includes multiple instances of graphics multiprocessor 3834 that can share common instructions and data, which may be stored in L1 cache 3848.

In at least one embodiment, each processing cluster 3894 may include an MMU 3845 that is configured to map virtual addresses into physical addresses. In at least one embodiment, one or more instances of MMU 3845 may reside within memory interface 3818 of FIG. 38. In at least one embodiment, MMU 3845 includes a set of page table entries ("PTEs") used to map a virtual address to a physical address of a tile and optionally a cache line index. In at least one embodiment, MMU 3845 may include address translation lookaside buffers ("TLBs") or caches that may reside within graphics multiprocessor 3834 or L1 cache 3848 or processing cluster 3894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3894 may be configured such that each graphics multiprocessor 3834 is coupled to a texture unit 3836 for performing texture mapping operations, e.g., determining texture sample positions, reading texture data, and filtering texture data. In at least one embodiment, texture data is read from an internal texture L1 cache (not shown) or from an L1 cache within graphics multiprocessor 3834 and is fetched from an L2 cache, local parallel processor memory, or system memory, as needed. In at least one embodiment, each graphics multiprocessor 3834 outputs a processed task to data crossbar 3840 to provide a processed task to another processing cluster 3894 for further processing or to store a processed task in an L2 cache, a local parallel processor memory, or a system memory via memory crossbar 3816. In at least one embodiment, a pre-raster operations unit ("preROP") 3842 is configured to receive data from graphics multiprocessor 3834, direct data to ROP units, which may be located with partition units as described herein (e.g., partition units 3820A-3820N of FIG. 38). In at least one embodiment, PreROP 3842 can perform optimizations for color blending, organize pixel color data, and perform address translations.

Figure 38C:
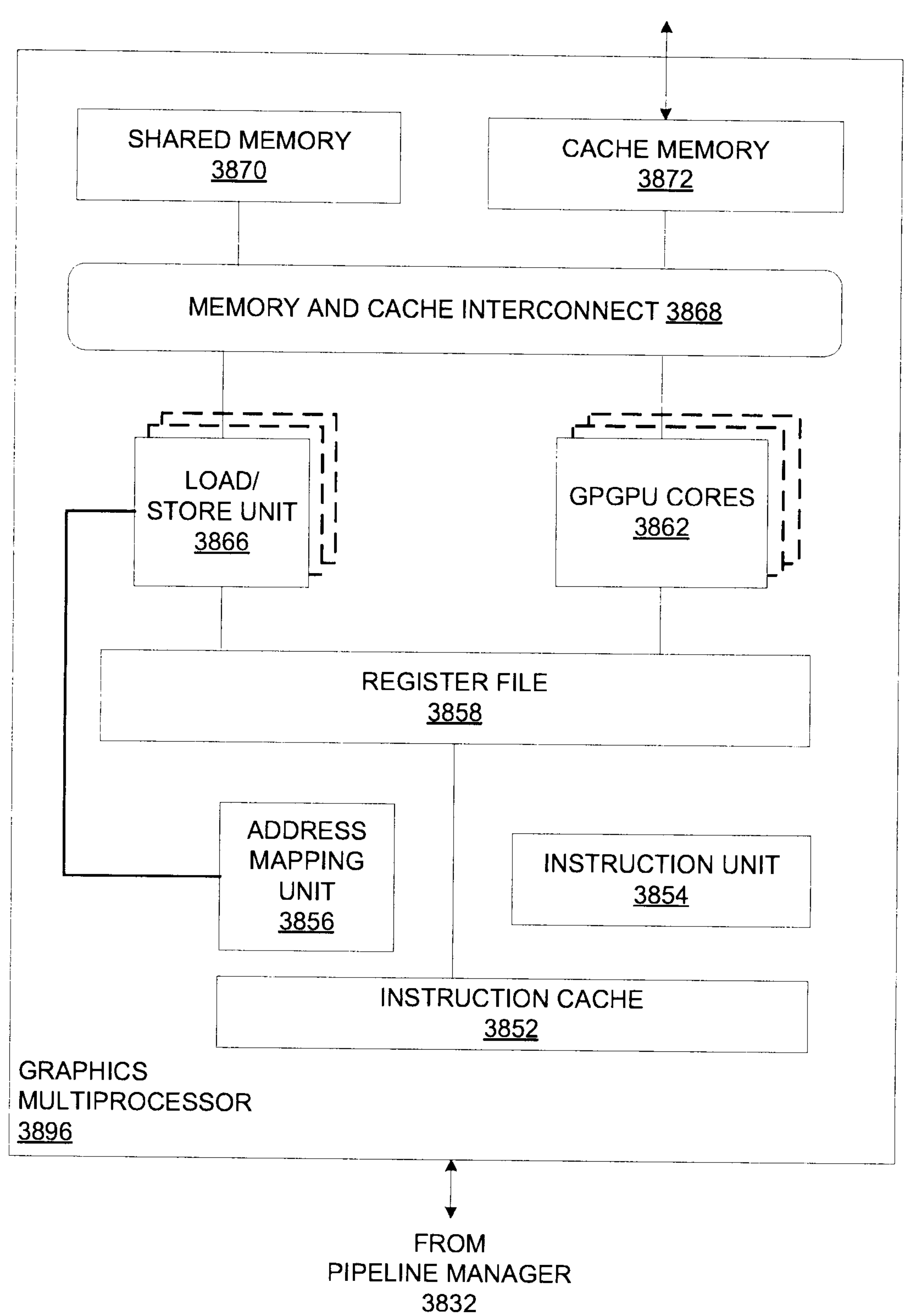
FIG. 38C illustrates a graphics multiprocessor, in accordance with at least one embodiment.

FIG. 38C illustrates a graphics multiprocessor 3896, in accordance with at least one embodiment. In at least one embodiment, graphics multiprocessor 3896 is graphics multiprocessor 3834 of FIG. 38B. In at least one embodiment, graphics multiprocessor 3896 couples with pipeline manager 3832 of processing cluster 3894. In at least one embodiment, graphics multiprocessor 3896 has an execution pipeline including but not limited to an instruction cache 3852, an instruction unit 3854, an address mapping unit 3856, a register file 3858, one or more GPGPU cores 3862, and one or more LSUs 3866. GPGPU cores 3862 and LSUs 3866 are coupled with cache memory 3872 and shared memory 3870 via a memory and cache interconnect 3868.

In at least one embodiment, instruction cache 3852 receives a stream of instructions to execute from pipeline manager 3832. In at least one embodiment, instructions are cached in instruction cache 3852 and dispatched for execution by instruction unit 3854. In at least one embodiment, instruction unit 3854 can dispatch instructions as thread groups (e.g., warps), with each thread of a thread group assigned to a different execution unit within GPGPU core 3862. In at least one embodiment, an instruction can access any of a local, shared, or global address space by specifying an address within a unified address space. In at least one embodiment, address mapping unit 3856 can be used to translate addresses in a unified address space into a distinct memory address that can be accessed by LSUs 3866.

In at least one embodiment, register file 3858 provides a set of registers for functional units of graphics multiprocessor 3896. In at least one embodiment, register file 3858 provides temporary storage for operands connected to data paths of functional units (e.g., GPGPU cores 3862, LSUs 3866) of graphics multiprocessor 3896. In at least one embodiment, register file 3858 is divided between each of functional units such that each functional unit is allocated a dedicated portion of register file 3858. In at least one embodiment, register file 3858 is divided between different thread groups being executed by graphics multiprocessor 3896.

In at least one embodiment, GPGPU cores 3862 can each include FPUs and/or integer ALUs that are used to execute instructions of graphics multiprocessor 3896. GPGPU cores 3862 can be similar in architecture or can differ in architecture. In at least one embodiment, a first portion of GPGPU cores 3862 include a single precision FPU and an integer ALU while a second portion of GPGPU cores 3862 include a double precision FPU. In at least one embodiment, FPUs can implement IEEE 754-2008 standard for floating point arithmetic or enable variable precision floating point arithmetic. In at least one embodiment, graphics multiprocessor 3896 can additionally include one or more fixed function or special function units to perform specific functions such as copy rectangle or pixel blending operations. In at least one embodiment one or more of GPGPU cores 3862 can also include fixed or special function logic.

In at least one embodiment, GPGPU cores 3862 include SIMD logic capable of performing a single instruction on multiple sets of data. In at least one embodiment GPGPU cores 3862 can physically execute SIMD4, SIMD8, and SIMD16 instructions and logically execute SIMD1, SIMD2, and SIMD32 instructions. In at least one embodiment, SIMD instructions for GPGPU cores 3862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3868 is an interconnect network that connects each functional unit of graphics multiprocessor 3896 to register file 3858 and to shared memory 3870. In at least one embodiment, memory and cache interconnect 3868 is a crossbar interconnect that allows LSU 3866 to implement load and store operations between shared memory 3870 and register file 3858. In at least one embodiment, register file 3858 can operate at a same frequency as GPGPU cores 3862, thus data transfer between GPGPU cores 3862 and register file 3858 is very low latency. In at least one embodiment, shared memory 3870 can be used to enable communication between threads that execute on functional units within graphics multiprocessor 3896. In at least one embodiment, cache memory 3872 can be used as a data cache for example, to cache texture data communicated between functional units and texture unit 3836. In at least one embodiment, shared memory 3870 can also be used as a program managed cached. In at least one embodiment, threads executing on GPGPU cores 3862 can programmatically store data within shared memory in addition to automatically cached data that is stored within cache memory 3872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

General Computing

The following figures set forth, without limitation, exemplary software constructs within general computing that can be used to implement at least one embodiment.

Figure 39:
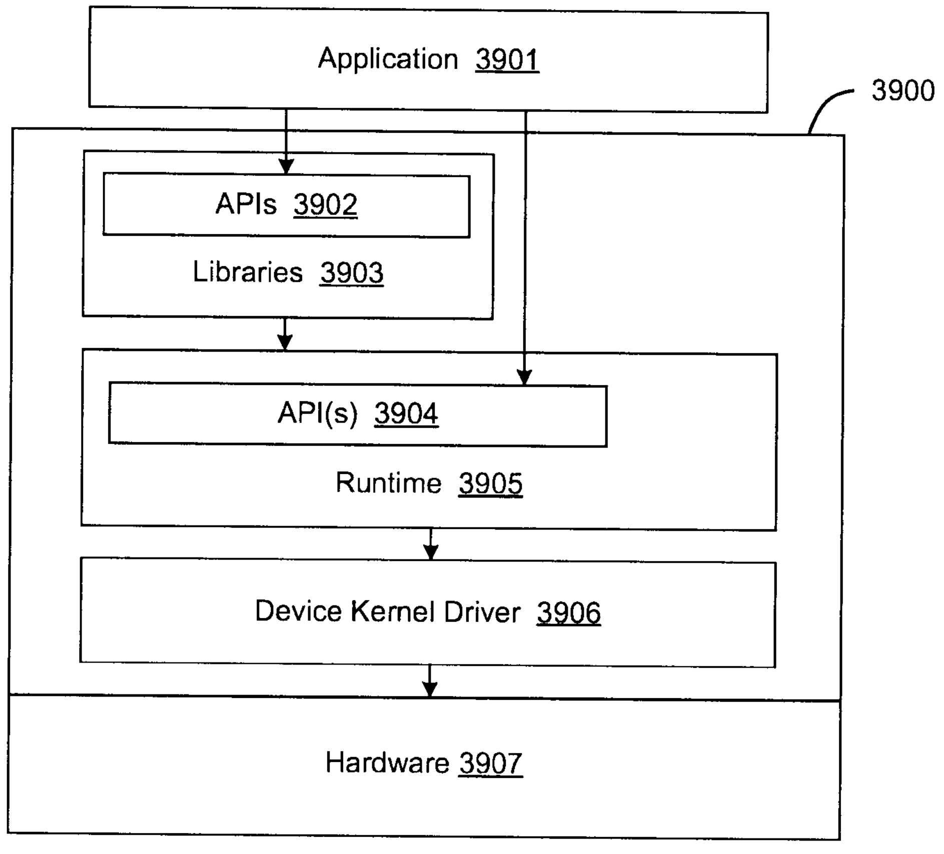
FIG. 39 illustrates a software stack of a programming platform, in accordance with at least one embodiment.

FIG. 39 illustrates a software stack of a programming platform, in accordance with at least one embodiment. In at least one embodiment, FIG. 39 is to cause metrics data of one or more graphics processing units (GPUs) to be obtained from the one or more GPUs in an order from newest to oldest and/or otherwise perform operations described herein in connection with FIGS. 1-7. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3900 of a programming platform provides an execution environment for an application 3901. In at least one embodiment, application 3901 may include any computer software capable of being launched on software stack 3900. In at least one embodiment, application 3901 may include, but is not limited to, an artificial intelligence ("AI")/machine learning ("ML") application, a high performance computing ("HPC") application, a virtual desktop infrastructure ("VDI"), or a data center workload.

In at least one embodiment, application 3901 and software stack 3900 run on hardware 3907. Hardware 3907 may include one or more GPUs, CPUs, FPGAs, AI engines, and/or other types of compute devices that support a programming platform, in at least one embodiment. In at least one embodiment, such as with CUDA, software stack 3900 may be vendor specific and compatible with only devices from particular vendor(s). In at least one embodiment, such as in with OpenCL, software stack 3900 may be used with devices from different vendors. In at least one embodiment, hardware 3907 includes a host connected to one more devices that can be accessed to perform computational tasks via application programming interface ("API") calls. A device within hardware 3907 may include, but is not limited to, a GPU, FPGA, AI engine, or other compute device (but may also include a CPU) and its memory, as opposed to a host within hardware 3907 that may include, but is not limited to, a CPU (but may also include a compute device) and its memory, in at least one embodiment.

In at least one embodiment, software stack 3900 of a programming platform includes, without limitation, a number of libraries 3903, a runtime 3905, and a device kernel driver 3906. Each of libraries 3903 may include data and programming code that can be used by computer programs and leveraged during software development, in at least one embodiment. In at least one embodiment, libraries 3903 may include, but are not limited to, pre-written code and subroutines, classes, values, type specifications, configuration data, documentation, help data, and/or message templates. In at least one embodiment, libraries 3903 include functions that are optimized for execution on one or more types of devices. In at least one embodiment, libraries 3903 may include, but are not limited to, functions for performing mathematical, deep learning, and/or other types of operations on devices. In at least one embodiment, libraries 4003 are associated with corresponding APIs 4002, which may include one or more APIs, that expose functions implemented in libraries 4003.

In at least one embodiment, application 3901 is written as source code that is compiled into executable code, as discussed in greater detail below in conjunction with FIG. 44. Executable code of application 3901 may run, at least in part, on an execution environment provided by software stack 3900, in at least one embodiment. In at least one embodiment, during execution of application 3901, code may be reached that needs to run on a device, as opposed to a host. In such a case, runtime 3905 may be called to load and launch requisite code on a device, in at least one embodiment. In at least one embodiment, runtime 3905 may include any technically feasible runtime system that is able to support execution of application S01.

In at least one embodiment, runtime 3905 is implemented as one or more runtime libraries associated with corresponding APIs, which are shown as API(s) 3904. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3904 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3906 is configured to facilitate communication with an underlying device. In at least one embodiment, device kernel driver 3906 may provide low-level functionalities upon which APIs, such as API(s) 3904, and/or other software relies. In at least one embodiment, device kernel driver 3906 may be configured to compile intermediate representation ("IR") code into binary code at runtime. For CUDA, device kernel driver 3906 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3906 to compile IR code at runtime.

Figure 40:
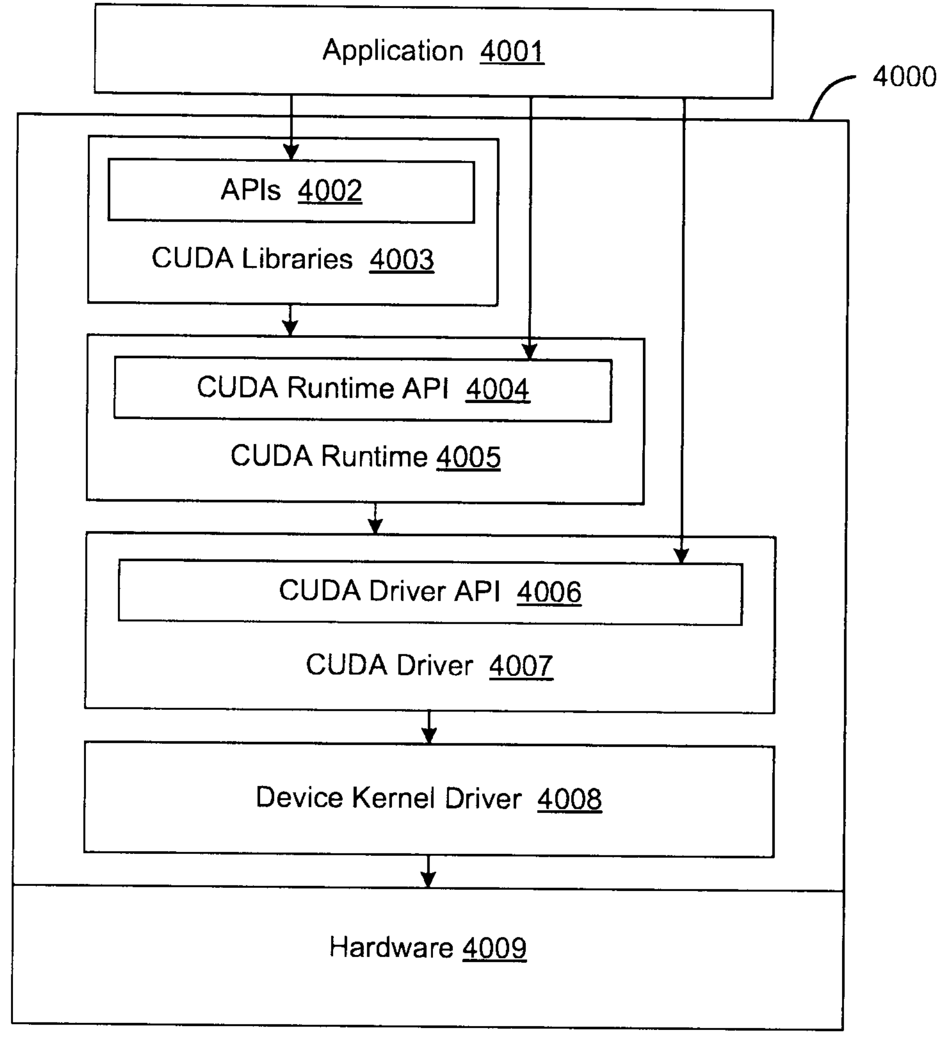
FIG. 40 illustrates a CUDA implementation of a software stack of FIG. 39, in accordance with at least one embodiment.

FIG. 40 illustrates a CUDA implementation of software stack 3900 of FIG. 39, in accordance with at least one embodiment. In at least one embodiment, FIG. 40 is to cause metrics data of one or more graphics processing units (GPUs) to be obtained from the one or more GPUs in an order from newest to oldest and/or otherwise perform operations described herein in connection with FIGS. 1-7. In at least one embodiment, a CUDA software stack 4000, on which an application 4001 may be launched, includes CUDA libraries 4003, a CUDA runtime 4005, a CUDA driver 4007, and a device kernel driver 4008. In at least one embodiment, CUDA software stack 4000 executes on hardware 4009, which may include a GPU that supports CUDA and is developed by NVIDIA Corporation of Santa Clara, CA.

In at least one embodiment, application 4001, CUDA runtime 4005, and device kernel driver 4008 may perform similar functionalities as application 3901, runtime 3905, and device kernel driver 3906, respectively, which are described above in conjunction with FIG. 39. In at least one embodiment, CUDA driver 4007 includes a library (libcuda.so) that implements a CUDA driver API 4006. Similar to a CUDA runtime API 4004 implemented by a CUDA runtime library (cudart), CUDA driver API 4006 may, without limitation, expose functions for memory management, execution control, device management, error handling, synchronization, and/or graphics interoperability, among other things, in at least one embodiment. In at least one embodiment, CUDA driver API 4006 differs from CUDA runtime API 4004 in that CUDA runtime API 4004 simplifies device code management by providing implicit initialization, context (analogous to a process) management, and module (analogous to dynamically loaded libraries) management. In contrast to high-level CUDA runtime API 4004, CUDA driver API 4006 is a low-level API providing more fine-grained control of a device, particularly with respect to contexts and module loading, in at least one embodiment. In at least one embodiment, CUDA driver API 4006 may expose functions for context management that are not exposed by CUDA runtime API 4004. In at least one embodiment, CUDA driver API 4006 is also language-independent and supports, e.g., OpenCL in addition to CUDA runtime API 4004. Further, in at least one embodiment, development libraries, including CUDA runtime 4005, may be considered as separate from driver components, including user-mode CUDA driver 4007 and kernel-mode device driver 4008 (also sometimes referred to as a "display" driver).

In at least one embodiment, CUDA libraries 4003 may include, but are not limited to, mathematical libraries, deep learning libraries, parallel algorithm libraries, and/or signal/image/video processing libraries, which parallel computing applications such as application 4001 may utilize. In at least one embodiment, CUDA libraries 4003 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4003 may include deep learning libraries such as a cuDNN library of primitives for deep neural networks and a TensorRT platform for high-performance deep learning inference, among others.

Figure 41:
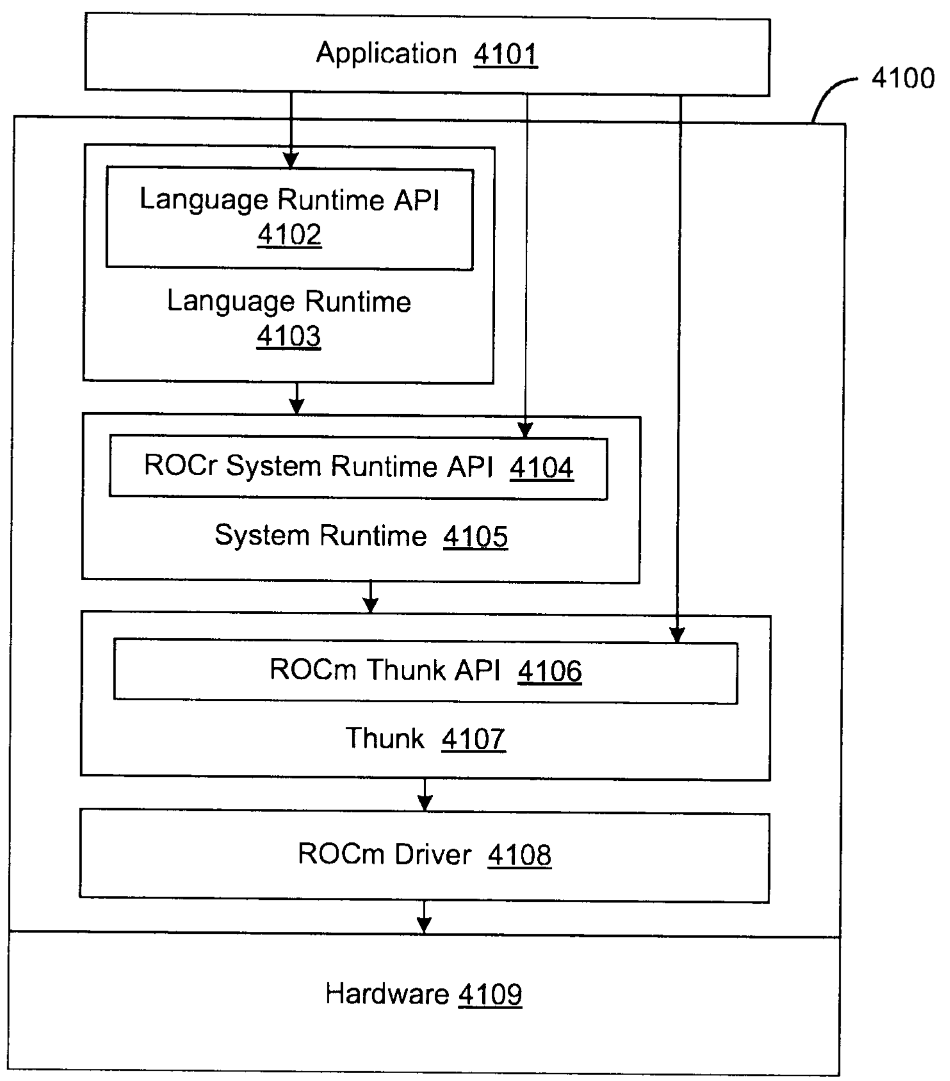
FIG. 41 illustrates a ROCm implementation of a software stack of FIG. 39, in accordance with at least one embodiment.

FIG. 41 illustrates a ROCm implementation of software stack 3900 of FIG. 39, in accordance with at least one embodiment. In at least one embodiment, FIG. 41 is to cause metrics data of one or more graphics processing units (GPUs) to be obtained from the one or more GPUs in an order from newest to oldest and/or otherwise perform operations described herein in connection with FIGS. 1-7. In at least one embodiment, a ROCm software stack 4100, on which an application 4101 may be launched, includes a language runtime 4103, a system runtime 4105, a thunk 4107, a ROCm kernel driver 4108, and a device kernel driver 4109. In at least one embodiment, ROCm software stack 4100 executes on hardware 4110, which may include a GPU that supports ROCm and is developed by AMD Corporation of Santa Clara, CA.

In at least one embodiment, application 4101 may perform similar functionalities as application 3901 discussed above in conjunction with FIG. 39. In addition, language runtime 4103 and system runtime 4105 may perform similar functionalities as runtime 3905 discussed above in conjunction with FIG. 39, in at least one embodiment. In at least one embodiment, language runtime 4103 and system runtime 4105 differ in that system runtime 4105 is a language-independent runtime that implements a ROCr system runtime API 4104 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4105, language runtime 4103 is an implementation of a language-specific runtime API 4102 layered on top of ROCr system runtime API 4104, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4004 discussed above in conjunction with FIG. 40, such as functions for memory management, execution control, device management, error handling, and synchronization, among other things.

In at least one embodiment, thunk (ROCt) 4107 is an interface that can be used to interact with underlying ROCm driver 4108. In at least one embodiment, ROCm driver 4108 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 3906 discussed above in conjunction with FIG. 39. In at least one embodiment, HAS kernel driver is a driver permitting different types of processors to share system resources more effectively via hardware features.

In at least one embodiment, various libraries (not shown) may be included in ROCm software stack 4100 above language runtime 4103 and provide functionality similarity to CUDA libraries 4003, discussed above in conjunction with FIG. 40. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 42:
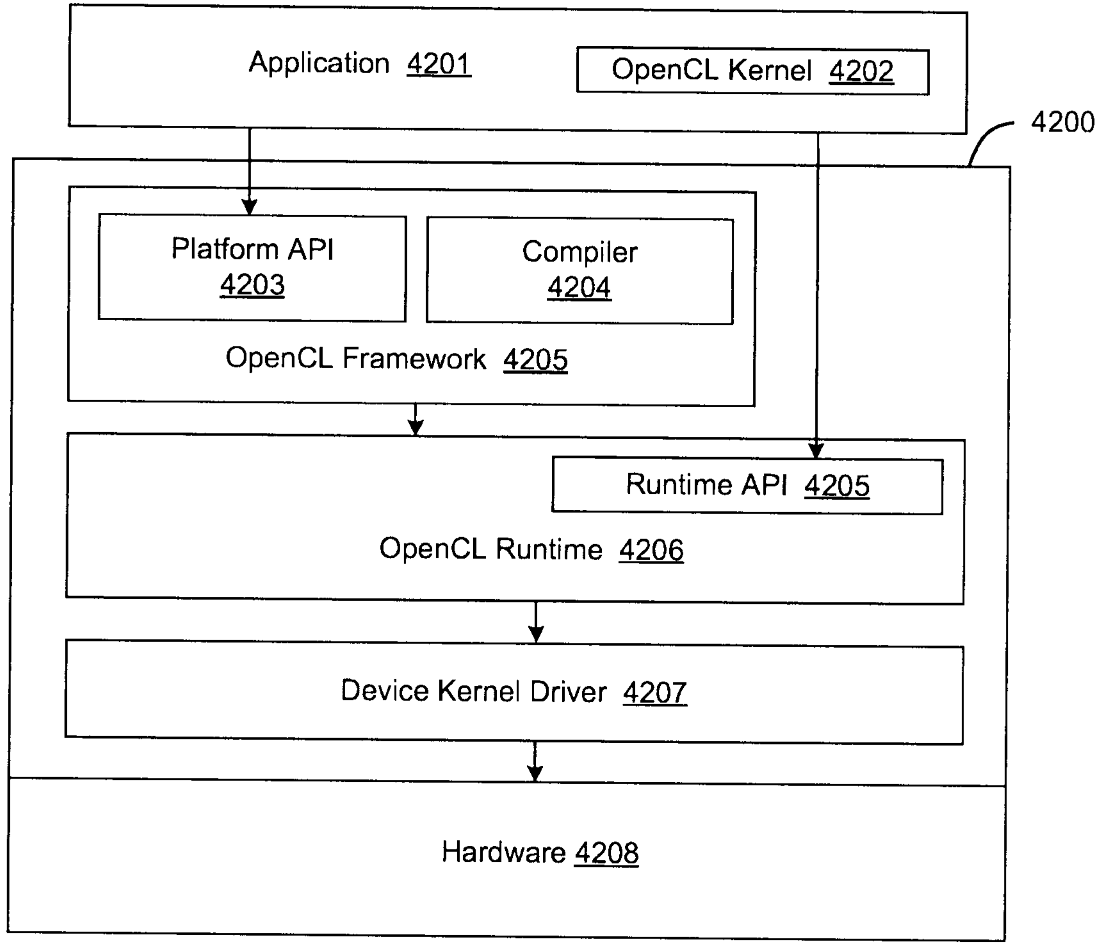
FIG. 42 illustrates an OpenCL implementation of a software stack of FIG. 39, in accordance with at least one embodiment.

FIG. 42 illustrates an OpenCL implementation of software stack 3900 of FIG. 39, in accordance with at least one embodiment. In at least one embodiment, FIG. 42 is to cause metrics data of one or more graphics processing units (GPUs) to be obtained from the one or more GPUs in an order from newest to oldest and/or otherwise perform operations described herein in connection with FIGS. 1-7. In at least one embodiment, an OpenCL software stack 4200, on which an application 4201 may be launched, includes an OpenCL framework 4205, an OpenCL runtime 4206, and a driver 4207. In at least one embodiment, OpenCL software stack 4200 executes on hardware 4009 that is not vendor-specific. As OpenCL is supported by devices developed by different vendors, specific OpenCL drivers may be required to interoperate with hardware from such vendors, in at least one embodiment.

In at least one embodiment, application 4201, OpenCL runtime 4206, device kernel driver 4207, and hardware 4208 may perform similar functionalities as application 3901, runtime 3905, device kernel driver 3906, and hardware 3907, respectively, that are discussed above in conjunction with FIG. 39. In at least one embodiment, application 4201 further includes an OpenCL kernel 4202 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4203 and runtime API 4205. In at least one embodiment, runtime API 4205 uses contexts to manage execution of kernels on devices. In at least one embodiment, each identified device may be associated with a respective context, which runtime API 4205 may use to manage command queues, program objects, and kernel objects, share memory objects, among other things, for that device. In at least one embodiment, platform API 4203 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4204 is also included in OpenCL framework 4205. Source code may be compiled offline prior to executing an application or online during execution of an application, in at least one embodiment. In contrast to CUDA and ROCm, OpenCL applications in at least one embodiment may be compiled online by compiler 4204, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 43:
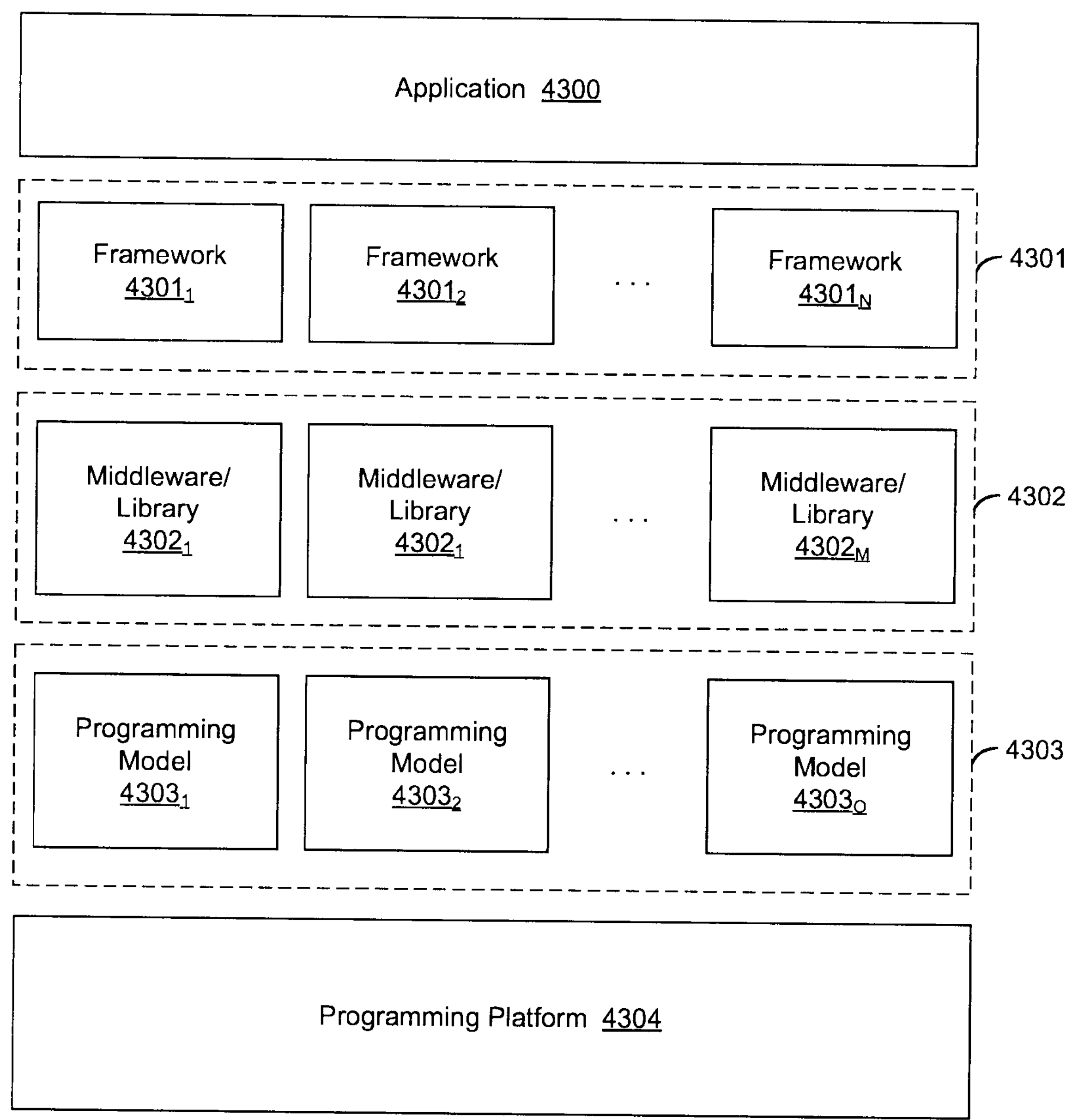
FIG. 43 illustrates software that is supported by a programming platform, in accordance with at least one embodiment.

FIG. 43 illustrates software that is supported by a programming platform, in accordance with at least one embodiment. In at least one embodiment, FIG. 43 is to cause metrics data of one or more graphics processing units (GPUs) to be obtained from the one or more GPUs in an order from newest to oldest and/or otherwise perform operations described herein in connection with FIGS. 1-7. In at least one embodiment, a programming platform 4304 is configured to support various programming models 4303, middlewares and/or libraries 4302, and frameworks 4301 that an application 4300 may rely upon. In at least one embodiment, application 4300 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4304 may be one of a CUDA, ROCm, or OpenCL platform described above in conjunction with FIG. 40, FIG. 41, and FIG. 42, respectively. In at least one embodiment, programming platform 4304 supports multiple programming models 4303, which are abstractions of an underlying computing system permitting expressions of algorithms and data structures. Programming models 4303 may expose features of underlying hardware in order to improve performance, in at least one embodiment. In at least one embodiment, programming models 4303 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4302 provide implementations of abstractions of programming models 4304. In at least one embodiment, such libraries include data and programming code that may be used by computer programs and leveraged during software development. In at least one embodiment, such middlewares include software that provides services to applications beyond those available from programming platform 4304. In at least one embodiment, libraries and/or middlewares 4302 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4302 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4301 depend on libraries and/or middlewares 4302. In at least one embodiment, each of application frameworks 4301 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 44:
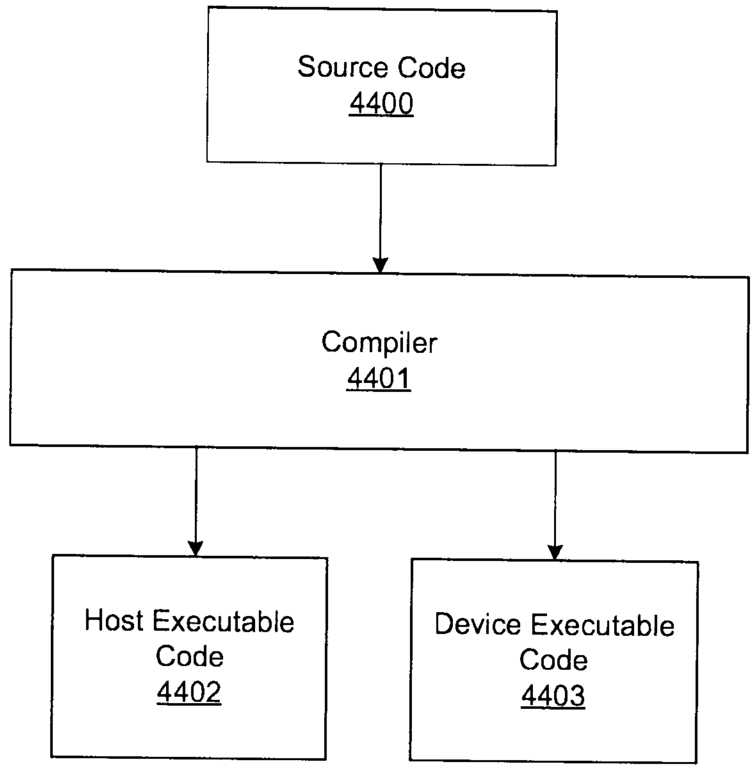
FIG. 44 illustrates compiling code to execute on programming platforms of FIGS. 39-42, in accordance with at least one embodiment.

FIG. 44 illustrates compiling code to execute on one of programming platforms of FIGS. 39-42, in accordance with at least one embodiment. In at least one embodiment, FIG. 44 is to cause metrics data of one or more graphics processing units (GPUs) to be obtained from the one or more GPUs in an order from newest to oldest and/or otherwise perform operations described herein in connection with FIGS. 1-7. In at least one embodiment, a compiler 4401 receives source code 4400 that includes both host code as well as device code. In at least one embodiment, complier 4401 is configured to convert source code 4400 into host executable code 4402 for execution on a host and device executable code 4403 for execution on a device. In at least one embodiment, source code 4400 may either be compiled offline prior to execution of an application, or online during execution of an application.

In at least one embodiment, source code 4400 may include code in any programming language supported by compiler 4401, such as C++, C, Fortran, etc. In at least one embodiment, source code 4400 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4400 may include multiple source code files, rather than a single-source file, into which host code and device code are separated.

In at least one embodiment, compiler 4401 is configured to compile source code 4400 into host executable code 4402 for execution on a host and device executable code 4403 for execution on a device. In at least one embodiment, compiler 4401 performs operations including parsing source code 4400 into an abstract system tree (AST), performing optimizations, and generating executable code. In at least one embodiment in which source code 4400 includes a single-source file, compiler 4401 may separate device code from host code in such a single-source file, compile device code and host code into device executable code 4403 and host executable code 4402, respectively, and link device executable code 4403 and host executable code 4402 together in a single file, as discussed in greater detail below with respect to FIG. 33.

In at least one embodiment, host executable code 4402 and device executable code 4403 may be in any suitable format, such as binary code and/or IR code. In a case of CUDA, host executable code 4402 may include native object code and device executable code 4403 may include code in PTX intermediate representation, in at least one embodiment. In a case of ROCm, both host executable code 4402 and device executable code 4403 may include target binary code, in at least one embodiment.

At least one embodiment of the disclosure can be described in view of the following clauses:

Clause 1 includes a processor comprising: one or more circuits to cause metrics data of one or more graphics processing units (GPUs) to be obtained from the one or more GPUs in an order from newest to oldest.

Clause 2 includes the processor of clause 1, wherein the one or more circuits are to cause metrics data of one or more GPUs to be obtained at a destination that is external to the one or more GPUs in the order from newest to oldest.

Clause 3 includes the processor of clause 1, wherein: the metrics data is stored in a storage and is associated with one or more timestamps; and the one or more circuits are to cause metrics data of one or more GPUs to be obtained in the order of newest to oldest based at least in part on the one or more timestamps.

Clause 4 includes the processor of clause 1, wherein the metrics data is to be obtained from one or more addresses and is stored in a storage that is local with respect to the one or more GPUs.

Clause 5 includes the processor of clause 1, wherein as a result of an identification of a backlog in storage, provide metrics data from the backlog to an external destination.

Clause 6 includes the processor of clause 1, wherein: the one or more circuits further is to obtain a token from a first source that is external to the one or more GPUs; as a result of the token being provided to a storage that is remote with respect to the one or more GPUs, the one or more circuits further is to write the metrics data to a second storage that is remote with respect to the one or more GPUs.

Clause 7 includes a computer-implemented method, comprising: causing metrics data of one or more graphics processing units (GPUs) to be obtained from the one or more GPUs in an order from newest to oldest.

Clause 8 includes the computer-implemented method of clause 7, wherein the metrics data of the one or more GPUs is obtained in the order from newest to oldest from the one or more GPUs by a storage of an analytics service that is remote with respect to the one or more GPUs.

Clause 9 includes the computer-implemented method of clause 7, wherein the metrics data is stored with timestamps at a storage that is local with respect to the one or more GPUs.

Clause 10 includes the computer-implemented method of clause 9, further comprising generating the order of metrics data from newest to oldest based at least in part on the one or more timestamps.

Clause 11 includes the computer-implemented method of clause 9, wherein the metrics data includes individual metrics values with corresponding timestamps that indicate when a metric value was stored at the storage.

Clause 12 includes the computer-implemented method of clause 9, further comprising, selecting a metric from a plurality of metrics in the storage based at least in part on a timestamp of the metric.

Clause 13 includes the computer-implemented method of clause 7, further comprising: obtaining a token from a source that is external to the one or more GPUs; and as a result of the token being provided to a destination that is external with respect to the one or more GPUs, cause the metrics data to be provided to the destination in the order from newest to oldest.

Clause 14 includes a system comprising: one or more processors to cause metrics data of one or more graphics processing units (GPUs) to be obtained from the one or more GPUs in an order from newest to oldest.

Clause 15 includes the system of clause 14, wherein the metrics data is indicative of a training rate of a computer program to train a neural network being performed by the one or more GPUs.

Clause 16 includes the system of clause 14, wherein the one or more processors is further to cause metrics data of one or more GPUs to be provided to a destination that is external with respect to the one or more GPUs in the order from newest to oldest.

Clause 17 includes the system of clause 16, wherein the one or more processors is further to cause metrics data of one or more GPUs to be provided to the destination in the order from newest to oldest based at least in part on the one or more timestamps.

Clause 18 includes the system of clause 16, wherein the destination is a storage of an analytics service that is external with respect to the one or more GPUs.

Clause 19 includes the system of clause 14, wherein the metrics data indicates an amount of utilization of the one or more GPUs.

Clause 20 includes the system of clause 14, wherein as a result of an identification of a backlog in a storage, provide additional metrics data from the backlog to an external destination in an order of newest to oldest based on one or more timestamps associated with the additional metrics data.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

At least one embodiment of the disclosure can be described in view of the following clauses:

Clause 1 includes a processor comprising: one or more circuits to cause metrics data of one or more graphics processing units (GPUs) to be obtained from the one or more GPUs in an order from newest to oldest.

Clause 2 includes the processor of clause 1, wherein the one or more circuits are to cause metrics data of one or more GPUs to be obtained at a destination that is external to the one or more GPUs in the order from newest to oldest.

Clause 3 includes the processor of clause 1, wherein: the metrics data is stored in a storage and is associated with one or more timestamps; and the one or more circuits are to cause metrics data of one or more GPUs to be obtained in the order of newest to oldest based at least in part on the one or more timestamps.

Clause 4 includes the processor of clause 1, wherein the metrics data is to be obtained from one or more addresses and is stored in a storage that is local with respect to the one or more GPUs.

Clause 5 includes the processor of clause 1, wherein as a result of an identification of a backlog in storage, provide metrics data from the backlog to an external destination.

Clause 6 includes the processor of clause 1, wherein: the one or more circuits further is to obtain a token from a first source that is external to the one or more GPUs; as a result of the token being provided to a storage that is remote with respect to the one or more GPUs, the one or more circuits further is to write the metrics data to a second storage that is remote with respect to the one or more GPUs.

Clause 7 includes a computer-implemented method, comprising: causing metrics data of one or more graphics processing units (GPUs) to be obtained from the one or more GPUs in an order from newest to oldest.

Clause 8 includes the computer-implemented method of clause 7, wherein the metrics data of the one or more GPUs is obtained in the order from newest to oldest from the one or more GPUs by a storage of an analytics service that is remote with respect to the one or more GPUs.

Clause 9 includes the computer-implemented method of clause 7, wherein the metrics data is stored with timestamps at a storage that is local with respect to the one or more GPUs.

Clause 10 includes the computer-implemented method of clause 9, further comprising generating the order of metrics data from newest to oldest based at least in part on the one or more timestamps.

Clause 11 includes the computer-implemented method of clause 9, wherein the metrics data includes individual metrics values with corresponding timestamps that indicate when a metric value was stored at the storage.

Clause 12 includes the computer-implemented method of clause 9, further comprising, selecting a metric from a plurality of metrics in the storage based at least in part on a timestamp of the metric.

Clause 13 includes the computer-implemented method of clause 7, further comprising: obtaining a token from a source that is external to the one or more GPUs; and as a result of the token being provided to a destination that is external with respect to the one or more GPUs, cause the metrics data to be provided to the destination in the order from newest to oldest.

Clause 14 includes a system comprising: one or more processors to cause metrics data of one or more graphics processing units (GPUs) to be obtained from the one or more GPUs in an order from newest to oldest.

Clause 15 includes the system of clause 14, wherein the metrics data is indicative of a training rate of a computer program to train a neural network being performed by the one or more GPUs.

Clause 16 includes the system of clause 14, wherein the one or more processors is further to cause metrics data of one or more GPUs to be provided to a destination that is external with respect to the one or more GPUs in the order from newest to oldest.

Clause 17 includes the system of clause 16, wherein the one or more processors is further to cause metrics data of one or more GPUs to be provided to the destination in the order from newest to oldest based at least in part on the one or more timestamps.

Clause 18 includes the system of clause 16, wherein the destination is a storage of an analytics service that is external with respect to the one or more GPUs.

Clause 19 includes the system of clause 14, wherein the metrics data indicates an amount of utilization of the one or more GPUs.

Clause 20 includes the system of clause 14, wherein as a result of an identification of a backlog in a storage, provide additional metrics data from the backlog to an external destination in an order of newest to oldest based on one or more timestamps associated with the additional metrics data.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising: one or more circuits to cause metrics data of one or more graphics processing units (GPUs) to be obtained from the one or more GPUs in an order from newest to oldest, wherein to cause the metrics data of the one or more GPUs to be obtained, the one or more circuits:

identify a backlog of the metrics data that failed to be obtained;

initiate a backfill process to cause the backlog of metrics data to be obtained;

detect a new portion of the metrics data identified as real-time metrics of the one or more GPUs; and cause the new portion of the metrics data to be obtained before continuing the backfill process to cause the backlog of the metrics data to be obtained.

2. The processor of claim 1, wherein the one or more circuits are to cause the metrics data of the one or more GPUs to be obtained at a destination that is external to the one or more GPUs in the order from newest to oldest.

3. The processor of claim 1, wherein:

the metrics data is stored in a storage and is associated with one or more timestamps; and wherein the order of newest to oldest is based at least in part on the one or more timestamps.

4. The processor of claim 1, wherein the metrics data is to be obtained from one or more addresses and is stored in a storage that is local with respect to the one or more GPUs.

5. The processor of claim 1, wherein the one or more circuits are further to cause, providing metrics data from the backlog to an external destination according to the order of newest to oldest.

6. The processor of claim 1, wherein:

the one or more circuits further is to obtain a token from a first source that is external to the one or more GPUs;

as a result of the token being provided to a storage that is remote with respect to the one or more GPUs, the one or more circuits further is to write the metrics data to a second storage that is remote with respect to the one or more GPUs.

7. A computer-implemented method, comprising:

causing metrics data of one or more graphics processing units (GPUs) to be obtained from the one or more GPUs in an order from newest to oldest, comprising:

identifying a backlog of the metrics data that failed to be obtained;

initiating a backfill process to cause the backlog of metrics data to be obtained;

detecting a new portion of the metrics data identified as real-time metrics of the one or more GPUs; and causing the new portion of the metrics data to be obtained before continuing the backfill process to cause the backlog of the metrics data to be obtained.

8. The computer-implemented method of claim 7, wherein the metrics data of the one or more GPUs is obtained in the order from newest to oldest from the one or more GPUs by a storage of an analytics service that is remote with respect to the one or more GPUs.

9. The computer-implemented method of claim 7, wherein the metrics data is stored with timestamps at a storage that is local with respect to the one or more GPUs.

10. The computer-implemented method of claim 9, further comprising generating the order of metrics data from newest to oldest based at least in part on the one or more timestamps.

11. The computer-implemented method of claim 9, wherein the metrics data includes individual metrics values with corresponding timestamps that indicate when a metric value was stored at the storage.

12. The computer-implemented method of claim 9, further comprising, selecting a metric from a plurality of metrics in the storage based at least in part on a timestamp of the metric.

13. The computer-implemented method of claim 7, further comprising:

obtaining a token from a source that is external to the one or more GPUs; and as a result of the token being provided to a destination that is external with respect to the one or more GPUs, cause the metrics data to be provided to the destination in the order from newest to oldest.

14. A system comprising:

one or more processors to cause metrics data of one or more graphics processing units (GPUs) to be obtained from the one or more GPUs in an order from newest to oldest, wherein to cause the metrics data of the one or more GPUs to be obtained, the one or more processors:

identify a backlog of the metrics data that failed to be obtained;

initiate a backfill process to cause the backlog of metrics data to be obtained;

detect a new portion of the metrics data identified as real-time metrics of the one or more GPUs; and cause the new portion of the metrics data to be obtained before continuing the backfill process to cause the backlog of the metrics data to be obtained.

15. The system of claim 14, wherein the metrics data is indicative of a training rate of a computer program to train a neural network being performed by the one or more GPUs.

16. The system of claim 14, wherein the one or more processors is further to cause metrics data of one or more GPUs to be provided to a destination that is external with respect to the one or more GPUs in the order from newest to oldest.

17. The system of claim 16, wherein the one or more processors is further to cause metrics data of one or more GPUs to be provided to the destination in the order from newest to oldest based at least in part on the one or more timestamps.

18. The system of claim 16, wherein the destination is a storage of an analytics service that is external with respect to the one or more GPUs.

19. The system of claim 14, wherein the metrics data indicates an amount of utilization of the one or more GPUs.

20. The system of claim 14, wherein the one or more processors provide additional metrics data from the backlog to an external destination in an order of newest to oldest based on one or more timestamps associated with the additional metrics data.

* * * * *